(12) United States Patent
Hirai

(10) Patent No.: US 11,394,849 B2
(45) Date of Patent: Jul. 19, 2022

(54) IMAGE CAPTURE APPARATUS AND CONTROL METHOD THEREOF

(71) Applicant: CANON KABUSHIKI KAISHA, Tokyo (JP)

(72) Inventor: Yuichi Hirai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/321,241

(22) Filed: May 14, 2021

(65) Prior Publication Data

US 2021/0368062 A1 Nov. 25, 2021

(30) Foreign Application Priority Data

May 19, 2020 (JP) .............................. JP2020-087607
Feb. 15, 2021 (JP) .............................. JP2021-022047

(51) Int. Cl.
*H04N 1/32* (2006.01)
*H04N 5/232* (2006.01)
*H04N 5/225* (2006.01)

(52) U.S. Cl.
CPC ..... *H04N 1/32358* (2013.01); *H04N 5/22525* (2018.08); *H04N 5/23216* (2013.01); *H04N 5/23241* (2013.01); *H04N 2201/0084* (2013.01); *H04N 2201/3287* (2013.01)

(58) Field of Classification Search
CPC ........... H04N 5/23241; H04N 5/23245; H04N 5/23216; H04N 5/232; H04N 5/22525; H04N 1/32358; H04N 2201/0084; H04N 2201/3287

USPC .................................................. 348/231.99
See application file for complete search history.

(56) References Cited

U.S. PATENT DOCUMENTS

| | | | | |
|---|---|---|---|---|
| 9,396,756 B2* | 7/2016 | Sakakibara | ........ | G11B 27/3027 |
| 9,413,921 B2* | 8/2016 | Matsumoto | ........ | H04N 5/23245 |
| 9,462,182 B2* | 10/2016 | Togita | ................ | H04N 5/23218 |
| 10,491,854 B2* | 11/2019 | Togita | .................. | H04N 19/146 |
| 10,681,313 B1* | 6/2020 | Day | ..................... | G06V 40/172 |
| 10,768,076 B1* | 9/2020 | Oostendorp | ....... | G05B 23/0245 |
| 11,082,698 B2* | 8/2021 | Mochizuki | ........... | H04N 19/136 |
| 2014/0132803 A1* | 5/2014 | Hirai | ..................... | H04N 5/772 |
| | | | | 348/231.99 |
| 2015/0269966 A1* | 9/2015 | Sakakibara | ............ | H04N 5/772 |
| | | | | 386/356 |

(Continued)

FOREIGN PATENT DOCUMENTS

JP 2013-197608 A 9/2013

*Primary Examiner* — Pritham D Prabhakher
(74) *Attorney, Agent, or Firm* — Canon U.S.A., Inc. IP Division

(57) ABSTRACT

An apparatus comprises an image processing circuit capable of applying development processing to RAW data obtained by a sensor. The apparatus has a non-development mode and a development mode as operation modes, the non-development mode being a mode in which the apparatus records the RAW data into a storage device without applying the development processing to the RAW data, and the development mode being a mode in which the apparatus applies the development processing to a plurality of the RAW data recorded into the storage device during when the apparatus operated in the non-development mode. The apparatus operates in the non-development mode or the development mode in accordance with a setting.

18 Claims, 36 Drawing Sheets

(56) References Cited

U.S. PATENT DOCUMENTS

| | | | | |
|---|---|---|---|---|
| 2015/0281573 | A1* | 10/2015 | Sasaki | H04N 9/8205 |
| | | | | 348/231.99 |
| 2017/0359471 | A1* | 12/2017 | Kadoi | H04N 5/23216 |
| 2018/0139407 | A1* | 5/2018 | Togita | H04N 19/146 |
| 2018/0152800 | A1* | 5/2018 | Cai | H04R 31/003 |
| 2020/0195931 | A1* | 6/2020 | Mochizuki | H04N 19/154 |

* cited by examiner

FIG. 9A

| | | | | | | | | | | |
|---|---|---|---|---|---|---|---|---|---|---|
| 📷 | AF | ▷ | 🔧 | | | | | | | |
| 1 | 2 | 3 | 4 | 5 | 6 | 7 | 8 | 9 | 10 | NON-DEVELOPMENT MODE |

| | |
|---|---|
| DPRAW SETTINGS | NOT SET |
| SHOOTING TIME INTERVAL | 2 SEC |
| RELEASE WITHOUT CARD | ON |
| AUTO-RATING | ON |
| RATING DETERMINATION BASIS | |

FIG. 9B

| | | | | | | | | | | |
|---|---|---|---|---|---|---|---|---|---|---|
| 📷 | AF | ▷ | 🔧 | | | | | | | |
| 1 | 2 | 3 | 4 | 5 | 6 | 7 | 8 | 9 | 10 | DEVELOPMENT MODE |

| | |
|---|---|
| RATING-BASED DEVELOPMENT | OFF |
| LOWER LIMIT RATE FOR DEVELOPMENT | 8 |
| UPPER LIMIT OF THE NUMBER FOR BATCH DEVELOPMENT | 999 |
| RATING-BASED DEVELOPMENT DURING POWER OFF | ON |
| LOWER LIMIT RATE DURING POWER OFF | 9 |
| UPPER LIMIT OF THE NUMBER OF IMAGES TO BE DEVELOPED DURING POWER OFF | 100 |

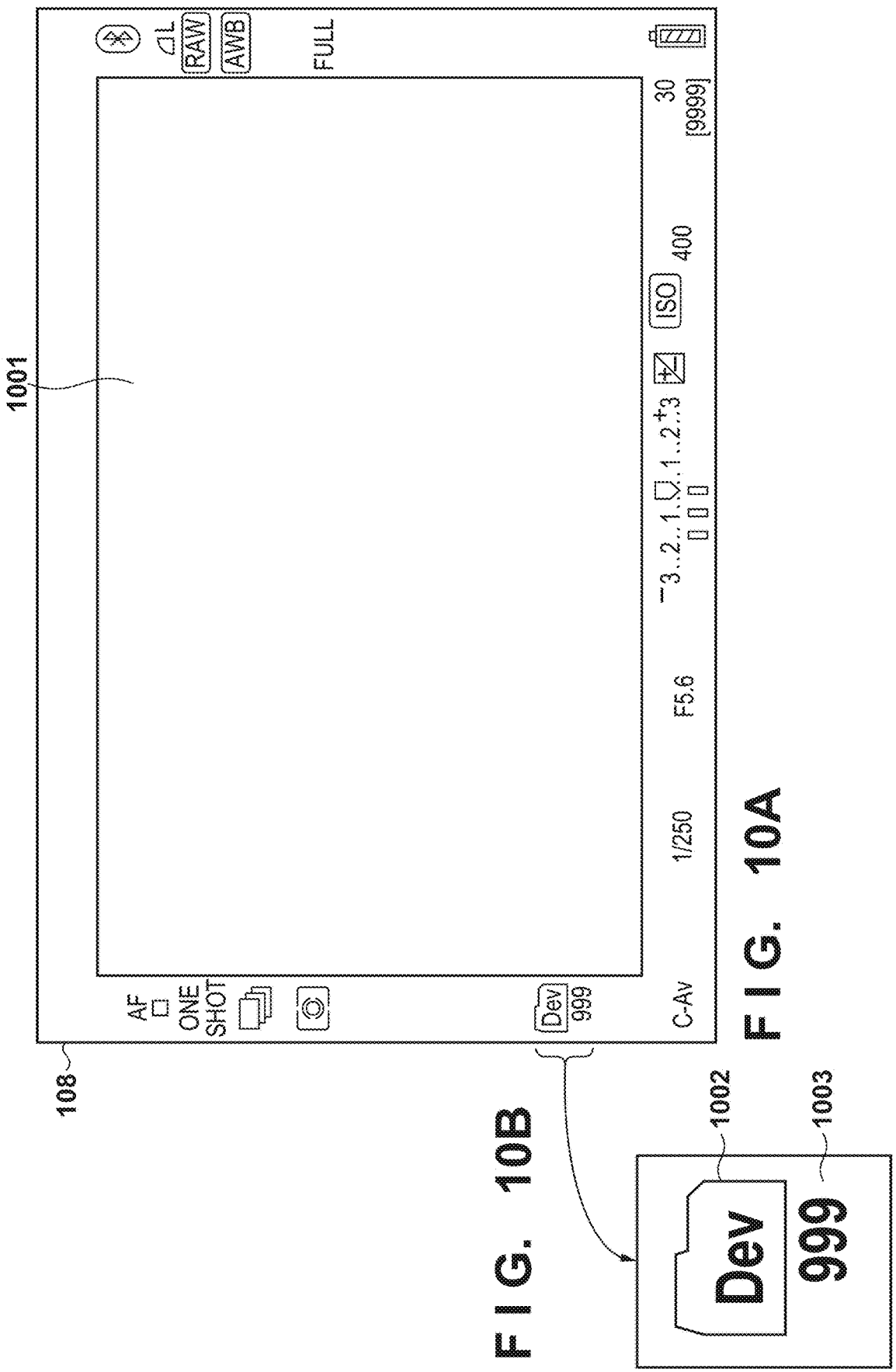

FIG. 13A

| | | |
|---|---|---|
| 1  2  3  4  5  6 | | SET UP3 |
| VIDEO TYPE | | NTSC |
| TOUCH OPERATION | | NORMAL |
| BEEP | | ON |
| BATTERY INFO | | |
| SENSOR CLEANING | | |
| HDMI OUTPUT | | OFF |
| HDMI OUTPUT RESOLUTION | | AUTO |

FIG. 13B

| | | |
|---|---|---|
| 1  2  3  4  5  6 | | SET UP3 |
| VIDEO TYPE | | NTSC |
| TOUCH OPERATION | | NORMAL |
| BEEP | | ON |
| BATTERY INFO | | |
| SENSOR CLEANING | | |
| HDMI OUTPUT | | ON |
| HDMI OUTPUT RESOLUTION | | AUTO |

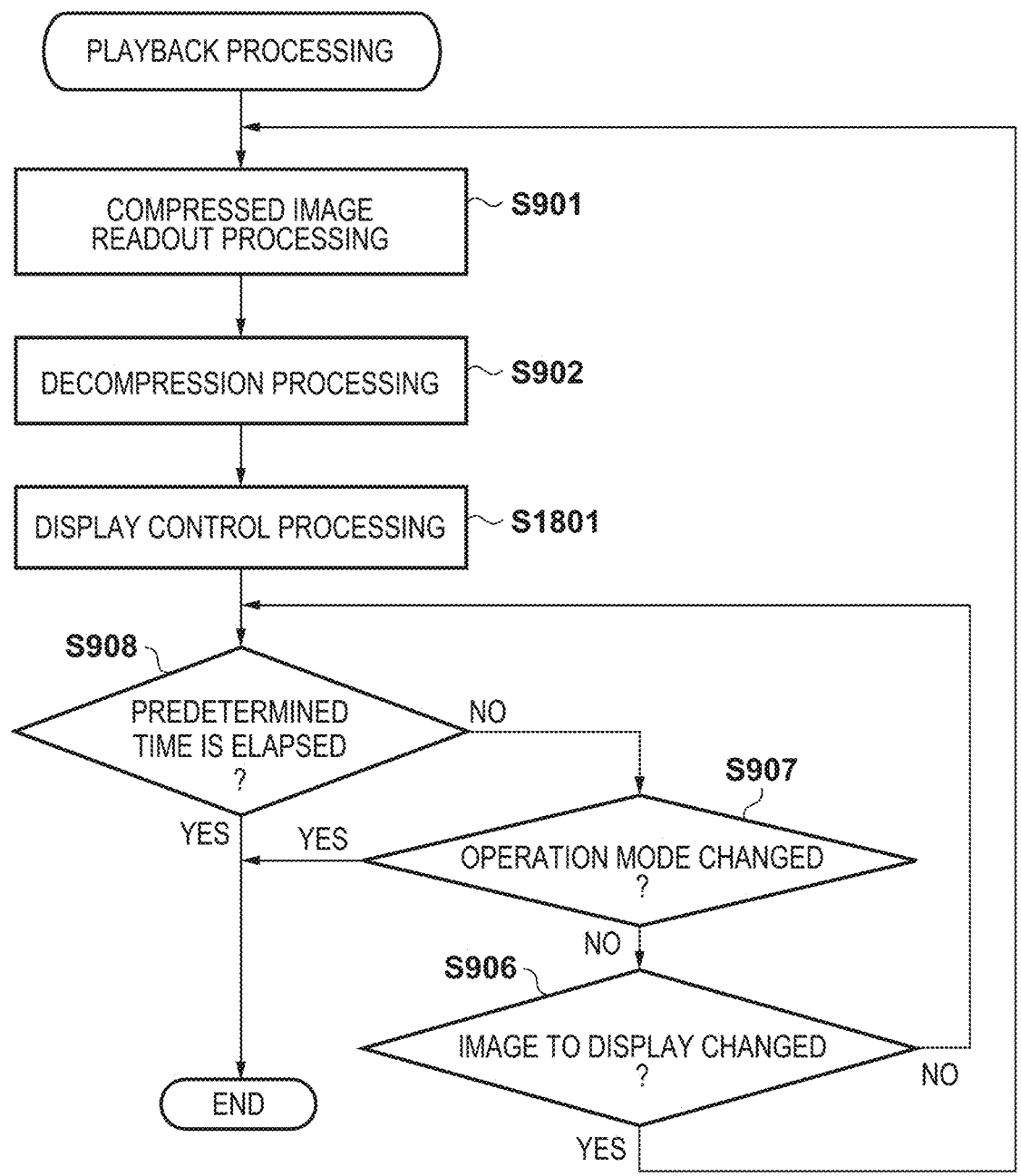

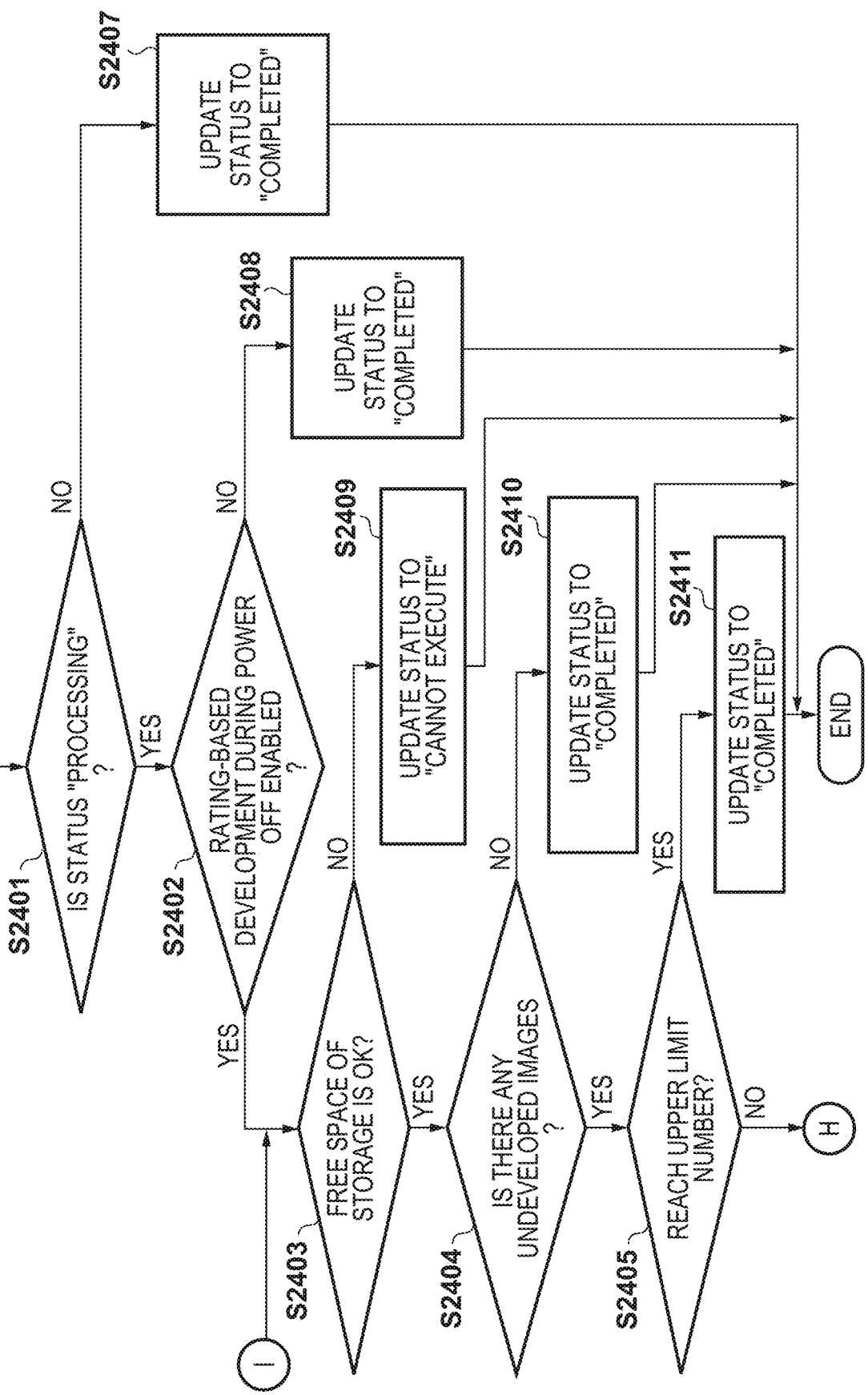

IMAGE CAPTURE APPARATUS AND CONTROL METHOD THEREOF

BACKGROUND OF THE DISCLOSURE

Field of the Disclosure

The aspect of the embodiments relates to an image capture apparatus and a control method thereof.

Description of the Related Art

In image capture apparatuses which use solid-state image sensors, image processing known as development processing to captured image data is applied. Increases in the numbers of pixels in an image sensor, increases in shooting rates, and the like have led to an increase in the load of image processing. The shooting interval is therefore limited by the image processing speed.

Japanese Patent Laid-Open No. 2013-197608 (Document 1) discloses an image capture apparatus that uses a front engine to handle shooting operations and a back engine to handle image processing. In Document 1, the transmission data rate from the front engine to the back engine is reduced using a buffer provided in the front engine, in order to compensate a difference between the data rates of a captured image and the image processing.

However, even with the configuration described in Document 1, new shots cannot be taken once the buffer in the front engine is filled with data. As such, if, for example, the configuration of Document 1 is used to enable electronic shutter-based high-speed continuous shooting, it is necessary to provide the front engine with a high-capacity buffer, which is unrealistic in terms of mounting area and costs.

SUMMARY OF THE DISCLOSURE

According to an aspect of the embodiments, there is provided an apparatus comprising: a sensor; an image processing circuit for applying development processing to RAW data obtained by the sensor; and one or more processors that execute a program stored in a memory and thereby function as a control unit configured to control operation of the apparatus, wherein the apparatus has a non-development mode and a development mode as operation modes, the non-development mode being a mode in which the apparatus records the RAW data into a storage device without applying the development processing to the RAW data, and the development mode being a mode in which the apparatus automatically applies the development processing to a plurality of the RAW data recorded into the storage device during when the apparatus operated in the non-development mode, and wherein the control unit causes the apparatus to operate in the non-development mode or the development mode in accordance with which operation mode is set to the apparatus.

According to another aspect of the embodiments, there is provided a method for an apparatus, the apparatus including a sensor and an image processing circuit for applying development processing to RAW data obtained by the sensor, the method comprising: causing, in accordance with which operation mode is set to the apparatus, the apparatus to operate either in: a non-development mode in which the apparatus records the RAW data into a storage device without applying the development processing to the RAW data, or a development mode in which the apparatus applies the development processing to a plurality of the RAW data recorded into the storage device during when the apparatus operated in the non-development mode.

According to another aspect of the embodiments, there is provided a non-transitory computer-readable medium storing a program for causing a computer of an apparatus to execute a method for an apparatus, the apparatus including a sensor and an image processing circuit for applying development processing to RAW data obtained by the sensor, the method comprising: causing, in accordance with which operation mode is set to the apparatus, the apparatus to operate either in: a non-development mode in which the apparatus records the RAW data into a storage device without applying the development processing to the RAW data, or a development mode in which the apparatus applies the development processing to a plurality of the RAW data recorded into the storage device during when the apparatus operated in the non-development mode.

Further features of the disclosure will become apparent from the following description of exemplary embodiments (with reference to the attached drawings).

BRIEF DESCRIPTION OF THE DRAWINGS

FIGS. 9A and 9B are diagrams illustrating examples of a rating setting screen according to an embodiment.

FIGS. 10A and 10B are diagrams illustrating an example of an EVF display according to an embodiment.

FIGS. 13A and 13B are diagrams illustrating an example of a setting screen for an external output function according to the first embodiment.

FIG. 20 is a flowchart illustrating playback output processing according to the first embodiment.

FIGS. 22A and 22B are flowcharts illustrating rating-based development processing when the power is off, according to the first embodiment.

DESCRIPTION OF THE EMBODIMENTS

Figure 1A:
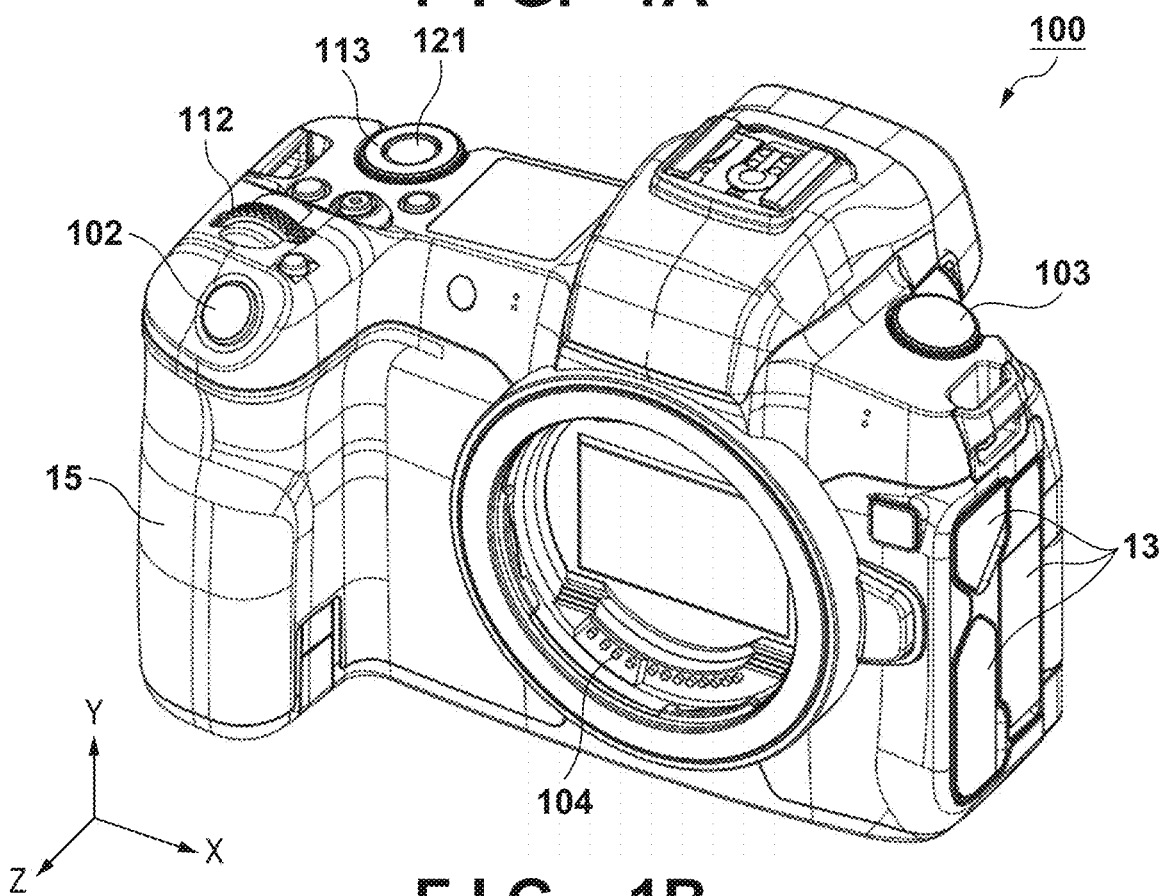
FIGS. 1A and 1B are diagrams illustrating an example of the external appearance of a digital camera serving as an example of an image capture apparatus according to an embodiment.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

Note that the following embodiments will describe a case where the aspect of the embodiments is applied in a digital camera. However, the aspect of the embodiments can be applied in any electronic device having an image capture function. Examples of such an electronic device include digital video cameras, computer devices (personal computers, tablet computers, media players, PDAs, and the like), mobile phones, smartphones, game consoles, robots, drones, and dashboard cameras. These are merely examples, however, and the aspect of the embodiments can be applied in other electronic devices as well.

Definitions of terms used in the following descriptions will be given next.

"Image" refers to an image which is visually perceived when "image data" is displayed or printed. This may be a still image or a moving image.

"Display image data" refers to image data expected to be used for display (including intermediate data during generation). Of the display image data, image data expected to be used for live view (LV) may be referred to as "LV image data". "Live view (LV) display" refers to display operations for causing a display device to function as a viewfinder of the camera. The live view display is basically executed by shooting a moving image and displaying the obtained moving image continuously or at low latency. Display image data generated from recorded image data may be referred to as "playback image data".

"Recording image data" refers to image data expected to be recorded into a recording medium (including intermediate data during generation). The recording image data is ultimately incorporated into part of a specific data structure and recorded into the recording medium in a data file format.

"Data file" is a data structure corresponding to a single unit to be managed in a file system. A data file including recording image data is called an "image data file" or an "image file".

"RAW data" refers to data which has been read out from an image sensor but to which image processing typically called "development processing" has not yet been applied. Although there is no set definition for "development processing", when the image sensor includes color filters with a specific plurality of colors arranged in a regular pattern, a state in which each piece of data has information corresponding to a single color of the color filter can be considered to be RAW data. Processing such as sorting, encoding, decoding, and the like may be applied to the RAW data.

Note that the foregoing are general definitions, and when definitions different from the foregoing are given in the following descriptions, the definitions in the following descriptions shall apply.

First Embodiment

Figure 1B:
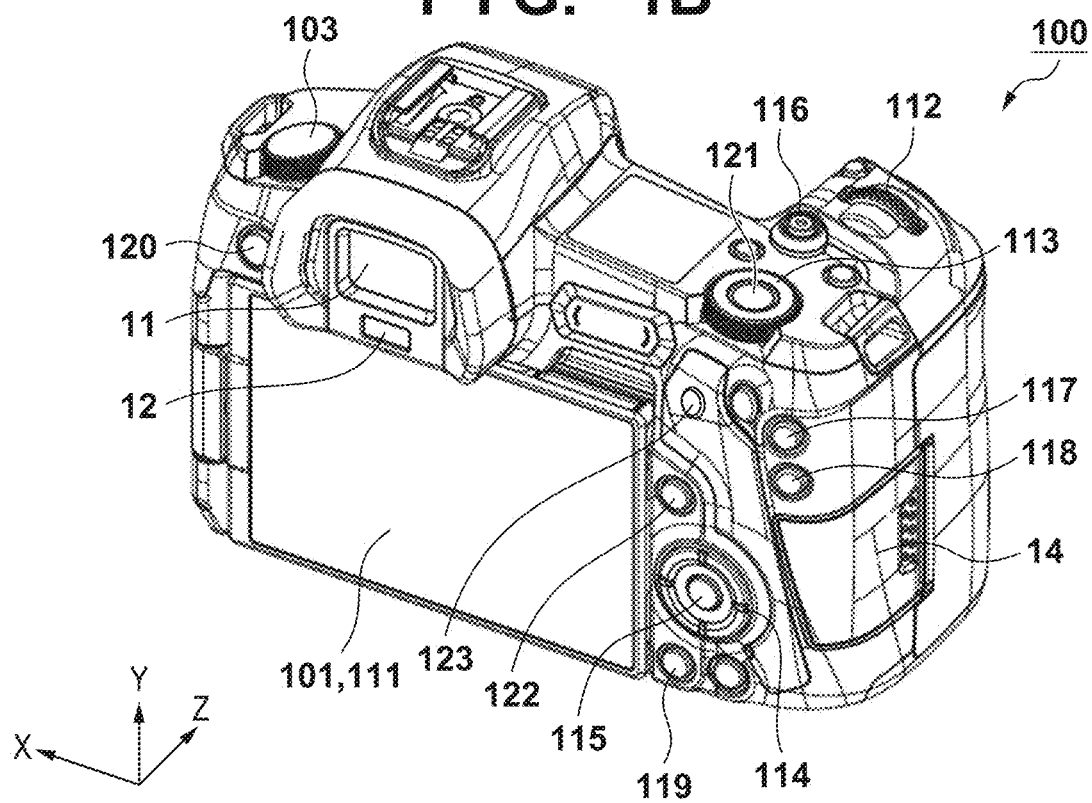

FIGS. 1A and 1B are perspective views illustrating an example of the external appearance of a digital camera 100 serving as an example of an image capture apparatus according to the aspect of the embodiments. The digital camera 100 is, for example, a mirrorless interchangeable-lens camera. FIG. 1A is a front perspective view of the digital camera 100. FIG. 1B is a rear perspective view of the digital camera 100.

A display unit 101 is provided on a rear surface of the camera, and displays images, various types of information, and the like. The display unit 101 is a touch screen including a touch panel 111, and is capable of detecting touch operations made on a display surface (operation service).

A shutter button 102 is an operation member for inputting a shooting preparation instruction and a shooting instruction for a still image.

A power switch 103 is an operation member for switching the power of the digital camera 100 on and off.

"Operation unit 110" is a collective name for a variety of input devices provided on the outer surface of a housing of the digital camera 100. The operation unit 110 includes the touch panel 111, a main dial 112, a sub dial 113, a directional key 114, and a set button 115. The operation unit 110 also includes a moving image button 116, an AE lock button 117, an enlarge button 118, a playback button 119, a menu button 120, a mode change switch 121, and an info button 122. The operation unit 110 includes the shutter button 102 and the power switch 103. The functions assigned to the operation members included in the operation unit 110 may be fixed, or may be changed dynamically. In the following, the functions assigned to the shutter button 102 and the power switch 103 will be described as fixed, and the shutter button 102 and the power switch 103 will be described as separate configurations from the operation unit 110, for the sake of convenience.

The main dial 112 can be rotated, and supplies, for example, instructions to change setting values such as shutter speed and aperture. The main dial 112 also supplies an instruction to change a display magnification when an enlarged mode (described later) is on. The sub dial 113 can be rotated, and supplies, for example, an instruction to move a selection frame, cycle through images, and the like. The directional key 114 includes a circular member, and indicates a position where the circular member has been pressed (up, down, left, or right). The directional key 114 supplies, for example, an instruction to move in the direction corresponding to the pressed position.

The set button 115 is provided in the center of the circular member of the directional key 114, and supplies, for example, an instruction to accept the item selected when the button was pressed. The moving image button 116 supplies instructions for starting and stopping moving image shooting (recording). The AE lock button 117, when pressed in a shooting standby state, supplies an instruction to lock the exposure state to the setting active when the button was pressed. The enlarge button 118 supplies instructions to turn the enlarged mode on and off in the live view display when in the shooting mode. In playback mode, the enlarge button 118 supplies instructions to turn the enlarged mode on and off for a playback image.

The playback button 119 supplies an instruction to switch to the playback mode when pressed during the shooting mode, and supplies an instruction to switch to the shooting mode when pressed during the playback mode. When switched to the playback mode, the newest image among the images recorded in a recording medium 200 is displayed in the display unit 101.

The menu button 120 supplies an instruction to display a menu screen. A user can change setting values of the digital camera 100 by using the directional key 114, the set button 115, and the like to operate the menu screen displayed in the display unit 101 in response to the menu button 120 being pressed. The mode change switch 121 supplies an instruction to switch the operation mode of the digital camera 100. It is assumed that the operation mode includes at least a still image shooting mode, a moving image shooting mode, a non-development mode, a playback mode, and a development mode. Note that each of the still image shooting mode, the moving image shooting mode, and the playback mode may have multiple additional modes.

The info button 122 is an operation member for switching a combination of the type, number, and the like of information displayed in the display unit 101 and the like.

A terminal group 104 is provided for the digital camera 100 to communicate with a lens unit (interchangeable lens) and adapters (a mount converter, a teleconverter, and the like) attached to a lens mount, and to supply power to those items. A corresponding group of terminals (described later) is also provided in the lens or adapter, and when the lens or adapter is mounted to the digital camera 100, both groups of terminals come into contact with each other and electrically connect the lens or adapter to the digital camera 100.

An eyepiece unit 11 is provided for viewing an EVF 108 (FIG. 2), which is located inside the digital camera 100. An eye detection unit 12 that detects a proximate object is provided in the eyepiece unit 11. For example, power consumption can be suppressed by turning the display unit 101 off when the eye detection unit 12 detects an object.

A retractable terminal cover 13 protects a terminal (not shown) for connecting the digital camera 100 to an external device. A retractable lid 14 protects a slot where a recording medium such as a memory card can be inserted and removed. A grip part 15 is formed in a shape that makes it easy for the user to hold the digital camera 100.

Figure 2:
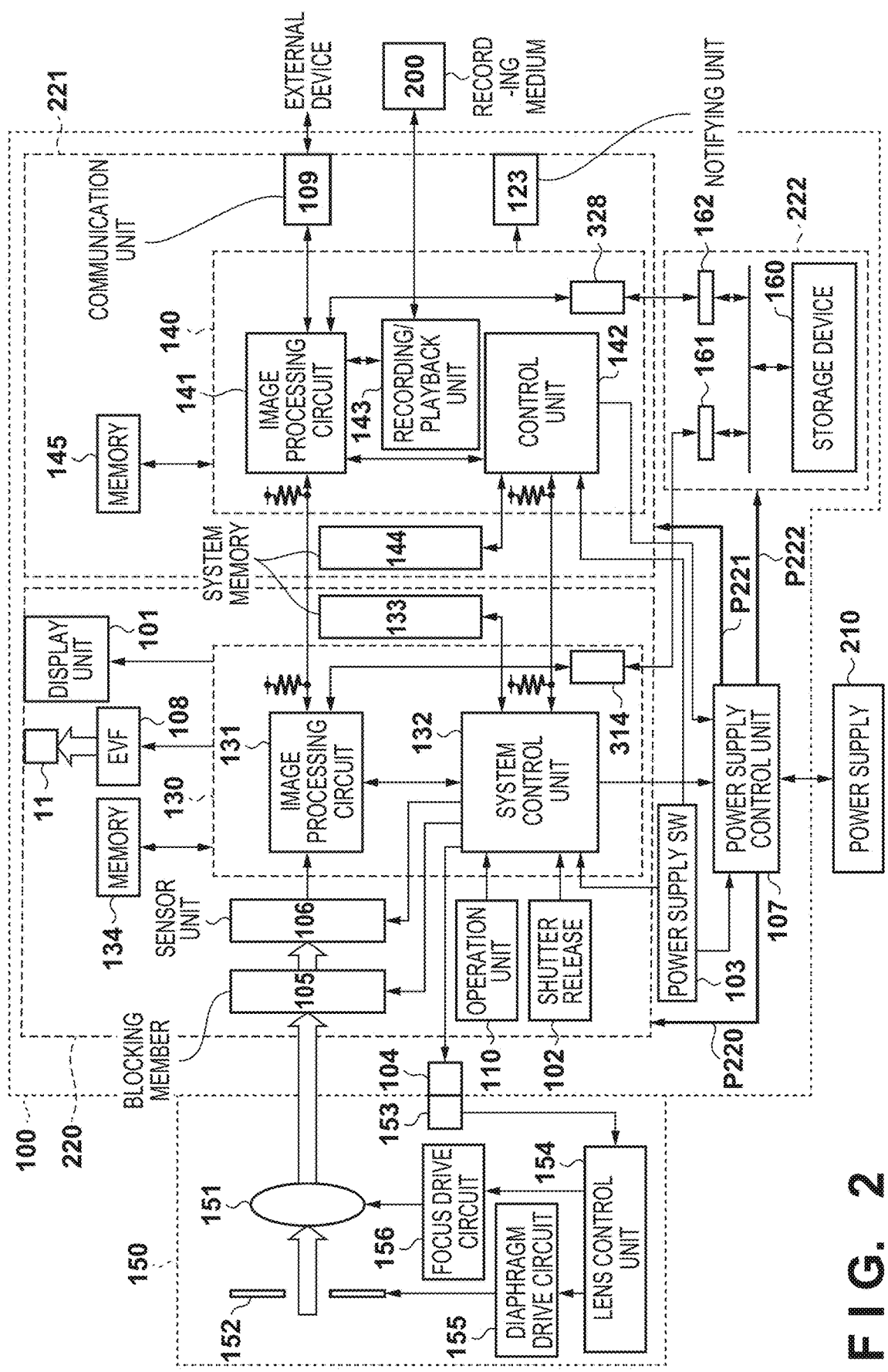
FIG. 2 is a block diagram illustrating an example of the functional configuration of the digital camera illustrated in FIGS. 1A and 1B, and a lens unit.

FIG. 2 is a block diagram illustrating an example of the functional configuration of the digital camera 100 with a lens unit 150 attached. Items illustrated in FIGS. 1A and 1B are given the same reference signs as in FIGS. 1A and 1B. The lens unit 150 is an interchangeable lens of the digital camera 100. A lens 151 typically includes a plurality of lenses, including a fixed lens and a mobile lens, but is illustrated here as a single lens for the sake of convenience. The mobile lens includes, for example, a focusing lens, an anti-vibration lens, and a magnification lens.

A terminal group 153 is provided in a mount part of the lens unit 150. The terminal group 153 is configured so as to make contact with the terminal group 104 when the lens unit 150 is attached to the digital camera 100. The lens unit 150 operates using power supplied from the digital camera 100 through the terminal groups 153 and 104, and also communicates with the digital camera 100 through the terminal groups 153 and 104.

A lens control unit 154 includes a CPU, ROM, and RAM, for example, and controls operations of the lens unit 150 by loading a program which is stored in the ROM into the RAM and executing the program. The lens control unit 154 communicates with a system control unit 132 (described later) through the terminal groups 153 and 104, and controls the operations of the lens unit 150 according to instructions from the system control unit 132. The ROM may hold optical characteristic information of the lens unit 150. The optical characteristic information may be used to generate correction parameters in an optical correction unit 304, a RAW development unit 322, and the like, which will be described later.

An aperture drive circuit 155 includes an actuator and the like that drive an aperture stop 152 provided in the lens unit 150. The aperture drive circuit 155 drives the aperture stop 152 under the control of the lens control unit 154.

A focus drive circuit 156 includes a motor, actuator, or the like that drives the focusing lens in the lens unit 150. The focus drive circuit 156 drives the focusing lens under the control of the lens control unit 154. The focus drive circuit 156 also obtains position information of the focusing lens and communicates that information to the lens control unit 154.

A light-blocking member 105 opens and closes under the control of the system control unit 132, and blocks light from a sensor unit 106 when in a closed state. Note that a focal plane shutter may be provided instead of the light-blocking member 105. The light-blocking member 105 may be a light-blocking plate that closes when capturing dark images in order to correct a dark current component, and is kept open at other times. Note that the light-blocking member 105 may be closed to protect the sensor surface when images are not being captured.

The sensor unit 106 includes an image sensor and an A/D conversion circuit. The image sensor is a CMOS image sensor, for example. The image sensor includes a plurality of pixels (photoelectric conversion units) arranged two-dimensionally, and converts an optical image formed on an image capturing surface into a pixel signal group (an analog image signal). The A/D conversion circuit converts the analog image signal into a digital signal (RAW data) and outputs the digital signal. Note that the image sensor may be configured such that a single microlens is shared by a plurality of photoelectric conversion units. In this case, phase difference-based autofocus can be performed on the basis of signals obtained from the image sensor.

Figure 3:
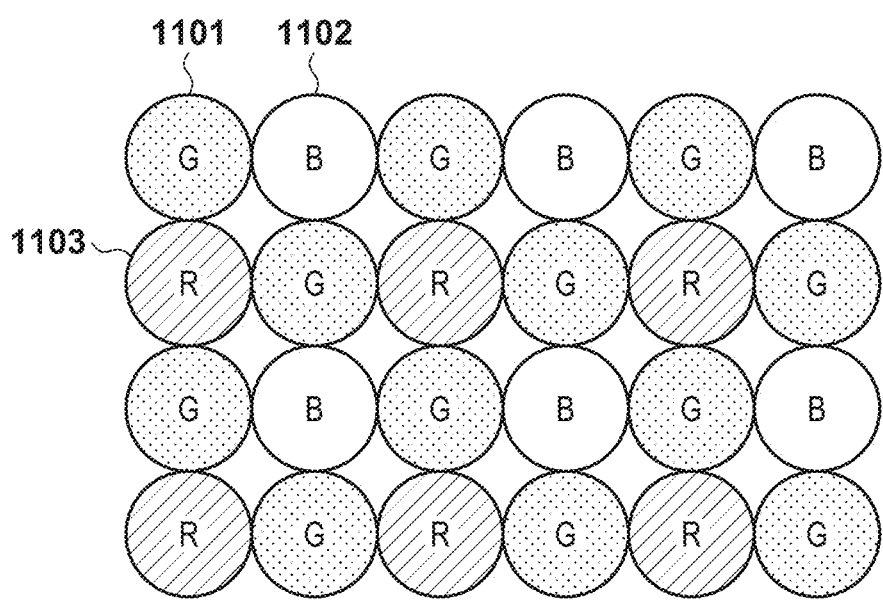
FIG. 3 is a diagram illustrating an example of color filters provided in an image sensor of a sensor unit.

FIG. 3 illustrates the color arrangement of the color filters arranged on the image sensor. In the present embodiment, a red (R) filter 1103, a green (G) filter 1101, and a blue (B) filter 1102 are color filters in a primary color Bayer array, repeating in units of four pixels (two vertical pixels and two horizontal pixels). In the following, a pixel provided with the red filter 1103 will be called a "red pixel" or an "R pixel". The same applies to the blue filter and the green filter. Note that a green filter adjacent to a blue filter in the horizontal direction may be identified by "G1", and a green filter adjacent to a red filter in the horizontal direction by "G0". The individual pieces of data constituting the RAW data have values corresponding to one color component among R, G, and B.

The present embodiment assumes that the image sensor has a number of pixels corresponding to what is known as "4K" or "8K". The 4K resolution is 3,840 pixels wide×2,160 pixels high (approximately 8 million pixels), and 8K resolution is 7,680 pixels wide×4,320 pixels high (approximately 33 million pixels). It is also assumed that the sensor unit 106 is capable of outputting 4K or 8K resolution image data at a framerate of 60 or 120 frames per second.

A front engine 130 includes an image processing circuit 131 that processes image data obtained from the sensor unit 106, and the system control unit 132 that controls the operations of the digital camera 100 and the lens unit 150. The front engine 130 may be configured as a single semiconductor integrated circuit package, for example. Additionally, the configuration may be such that the image processing circuit 131 and the system control unit 132 are mounted on the same semiconductor chip, or the image processing circuit 131 and the system control unit 132 are mounted on different semiconductor chips and enclosed in the same package. The system control unit 132 includes a CPU, and controls the operations of the various units by loading a program, which is stored in ROM included in system memory 133, into RAM included in the system memory 133, and executing the program.

The image processing circuit 131 included in the front engine 130 mainly handles image data reduction processing (resolution reduction) and image processing performed on reduced image data. The image processing includes, for example, display image data generation processing, detection processing, evaluation value calculation processing, and the like. The detection processing includes detecting a feature region (e.g., a face region or a human body region) or movement in such a region, processing for recognizing a person, or the like. The evaluation value calculation processing includes generating signals, evaluation values, and the like used in automatic focus detection (AF), calculating evaluation values used in automatic exposure control (AE), and the like. Note that these are examples of typical processing performed by the image processing circuit 131, and other processing may be executed as well.

Here, the display image data generated by the image processing circuit 131 is image data for a live view display carried out in at least one of the display unit 101 and the EVF 108 (live view image data). "Live view display" is a function that continuously captures a moving image based on the current shooting conditions and displays the captured moving image to make it possible to confirm the shooting range and shooting conditions. Note that the EVF 108 is a display device which is disposed within the housing of the digital camera 100 and which can be observed from outside the housing through the eyepiece unit 11. Although it is assumed here that the EVF 108 and the display unit 101 have the same resolution, the resolution of the display unit 101, which is typically larger than the EVF 108, may be higher.

The display image data may be output to an external device via a communication unit 109. The display image data output to the external device may differ from the display image data used by the EVF 108, the display unit 101, and so on. In this case, the display image data output to the external device is generated by a main engine 140.

The front engine 130 executes startup control of the main engine 140 in accordance with the operation mode of the digital camera 100. The front engine 130 and the main engine 140 are physically separate semiconductor integrated circuits.

The system memory 133 includes non-volatile memory (ROM) and volatile memory (RAM). Programs executed by the system control unit 132, setting values of the digital camera 100, GUI image data such as icons displayed along with menu screens and live view images, and the like are stored in the ROM. The RAM is used to load programs executed by the system control unit 132, store variable values and the like used when programs are executed, and so on.

Memory 134 is used to store image data to be processed by the image processing circuit 131, image data being processed, processed image data, and the like. The memory 134 is DRAM (Dynamic Random Access Memory), for example. Note that the RAM of the system memory 133 may be used to store image data.

The main engine 140 is configured as a separate semiconductor package from the front engine 130. The main engine 140 includes an image processing circuit 141, a recording/playback unit 143, and a control unit 142 that controls the operations of the main engine 140. The main engine 140 may be a single-chip integrated circuit, or a plurality of chips may be enclosed in the same package. The image processing circuit 141 can apply image processing to unreduced image data obtained from the front engine 130, image data recorded in a storage device 160, and the like.

The recording/playback unit 143 records the image data processed by the image processing circuit 141 into the recording medium 200, reads out data recorded in the recording medium 200 and outputs that data to the image processing circuit 141, and the like. The recording medium 200 may be a memory card, a magnetic disk, or the like, for example. When the digital camera 100 is operating in the playback mode, the image data read from the recording medium 200 and processed by the image processing circuit 141 is displayed in the display unit 101 through the front engine 130. When external output is enabled, the image data read from the recording medium 200 by the recording/playback unit 143 and processed by the image processing circuit 141 is output to an external device via the communication unit 109. Note that the digital camera 100 uses the storage device 160, which is a storage device capable of faster recording than the recording medium 200, to record image data during shooting. The recording medium 200 is used as a destination for copying or moving image files recorded in the storage device 160.

System memory 144 includes non-volatile memory (ROM) and volatile memory (RAM). Programs to be executed by the control unit 142, parameters, and the like are stored in the ROM. The RAM is used to load programs executed by the control unit 142, store variable values and the like used when programs are executed, and so on.

Memory 145 is used to store image data to be processed by the image processing circuit 141, image data being processed, processed image data, and the like. The memory 145 is DRAM, for example.

The storage device 160 is a storage device for recording image data and/or image files to which image processing has been applied by the image processing circuit 131 and the image processing circuit 141. The storage device 160 is a storage device capable of high-speed recording, for example, a Solid State Drive (SSD) which uses semiconductor non-volatile memory. There are no limits on the configuration of the storage device 160, and DRAM, MRAM (Magnetoresistive Random Access Memory), or the like may be used as cache memory to improve the access speed. The storage device 160 can selectively establish and break electrical connections with the front engine 130 and the main engine 140 via two isolators 161 and 162 connected to a bus.

When the storage device 160 has established a connection with the front engine 130, the storage device 160 is accessed via a file processing unit 314 (described later). On the other hand, when the storage device 160 has established a connection with the main engine 140, the storage device 160 is accessed via a file processing unit 328 (described later).

A power supply control unit 107 is constituted by a battery detection circuit, a DC-DC converter, switch circuits for switching the blocks to which power is supplied (first to third power supply domains 220 to 222, indicated by the broken lines in FIG. 2), and so on. The power supply control unit 107 has individual power supply lines P220 to P222 to perform independent power supply control for the first to third power supply domains 220 to 222. Each of the power supply lines P220 to P222 is illustrated as a single wire for the sake of convenience. In practice, however, each of the power supply lines P220 to P222 may be a plurality of power supply lines, depending on the power supply method, drive voltage, and the like.

The power supply control unit 107 detects the type of a power supply 210 (e.g., AC adapter or battery), whether the power supply 210 is connected, and the remaining power in the power supply 210 (if a battery). The power supply control unit 107 controls the DC-DC converter on the basis of these detection results and instructions from the system control unit 132, and supplies the required power to various units, including the front engine 130 and the main engine 140, for the required period. The power supply control unit 107 also supplies power to the recording medium 200, the lens unit 150, and the like. In addition, the power supply control unit 107 limits the power supplied to the main engine 140 in the shooting standby state, in which images are not recorded, limits the power supplied to the display unit 101 in response to the eye detection unit 12 detecting the proximity of an object, and so on.

For example, the power supply control unit 107 can limit the power supplied to the main engine 140 in the shooting standby state, in which image data is not recorded into the recording medium 200. In this case, the isolator 162 cuts off the electrical connection between the main engine 140 and the storage device 160. Such operations of the isolator 162 may be controlled by the power supply control unit 107 through a signal line (not shown). When power is not supplied to the third power supply domain 222, the isolators 161 and 162 included in the third power supply domain 222 cut off the electrical connections between the respective engines and the storage device 160.

The second power supply domain 221 is not used in the shooting mode in which RAW data obtained by high-speed continuous shooting is sequentially recorded into the storage device 160 without performing the development processing (the non-development mode). Accordingly, the power supply control unit 107 can stop the supply of power to the second power supply domain 221.

In the development mode, in which RAW data recorded into the storage device 160 in the non-development mode is developed, the power supply control unit 107 can stop the supply of power to the first power supply domain 220 by using a notifying unit 123, which belongs to the second power supply domain 221, to make a notification about the development processing. Alternatively, the power supply control unit 107 can stop the supply of power to the first power supply domain 220, with the exception of part of the front engine 130 and part of the operation unit 110.

The boundaries of whether or not power is supplied within each power domain are, for example, the isolators 161 and 162, in the third power supply domain 222. If the connection interface between the front engine 130 and the main engine 140 is pulled up at an input end, input terminals of one power domain will not become unstable even when power is not supplied to another of the power domains, which makes it possible to avoid malfunctions.

The power supply 210 is at least one of a primary battery such as an alkali battery, a lithium battery, or the like, a secondary battery such as a NiCd battery, a NiMH battery, a Li battery, or the like, or an AC adapter. Both the AC adapter and the battery can be connected to and disconnected from the digital camera 100.

The communication unit 109 is a wireless or wired communication interface, and the digital camera 100 performs data communication with an external device through the communication unit 109. The communication unit 109 may have a plurality of communication interfaces that comply with standards. Typical examples of standards with which the communication interface of the communication unit 109 complies include, but are not limited to, USB, HDMI (registered trademark), wireless LAN, Bluetooth (registered trademark), NFC (Near Field Communication), and the like. The communication unit 109 may also have a GPS receiver and a mobile phone network transmitter/receiver. The communication unit 109 can transmit images captured by the digital camera 100 (including LV images), image files recorded in the recording medium 200, and the like to an external device. The communication unit 109 can also receive information for controlling the digital camera 100, image data, and the like from an external device.

Upon detecting that the mode change switch 121 of the operation unit 110 has been pressed, the system control unit 132 makes the operation mode pertaining to shooting changeable. When operation of the main dial 112, the sub dial 113, or the like is detected in this state, the system control unit 132 switches the operation mode to the still image shooting mode, a user-set custom shooting mode, or the non-development mode. In addition to the operation mode pertaining to shooting, the same operation can be used to switch to the development mode, which is an operation mode related to developing. Changing to an operation mode selected in a state where the operation mode can be changed may be executed in response to, for example, pressing of the set button 115 or the mode change switch 121 being detected.

The shutter button 102 includes a switch that turns on in a half-pressed state (SW1) and a switch that turns on in a fully-pressed state (SW2). The system control unit 132 recognizes SW1 turning on as the input of a shooting preparation instruction, and recognizes SW2 turning on as the input of a still image shooting instruction. The system control unit 132 executes shooting preparation operations, such as AF (autofocus) processing, AE (automatic exposure) processing, and the like in response to the input of the shooting preparation instruction. Additionally, the system control unit 132 executes a series of operations, including driving the aperture stop, reading out image data from the sensor unit 106, performing image processing in the main engine 140, and recording image data into the recording medium 200, in response to the input of the still image shooting instruction. When a focal plane shutter (a mechanical shutter) is provided instead of the light-blocking member 105, the system control unit 132 also controls the driving of the shutter in response to the input of the still image shooting instruction. Note that the system control unit 132 releases limits on the supply of power to the main engine 140 in response to the input of the shooting preparation instruction or the still image shooting instruction.

In the shooting standby state, moving images are continuously shot for the purpose of LV display. The AF processing, AE processing, and the like are also executed when these moving images are shot. However, the details of the processing are different from the AF processing, the AE processing, and the like performed for shooting a still image in response to the shooting preparation instruction. Likewise, still image shooting performed in response to shooting instruction differs from the RAW data obtained through shooting moving images for the purpose of LV display in terms of the control of the sensor unit 106 during shooting and the properties of the RAW data (shading properties and the like).

Figure 4A:
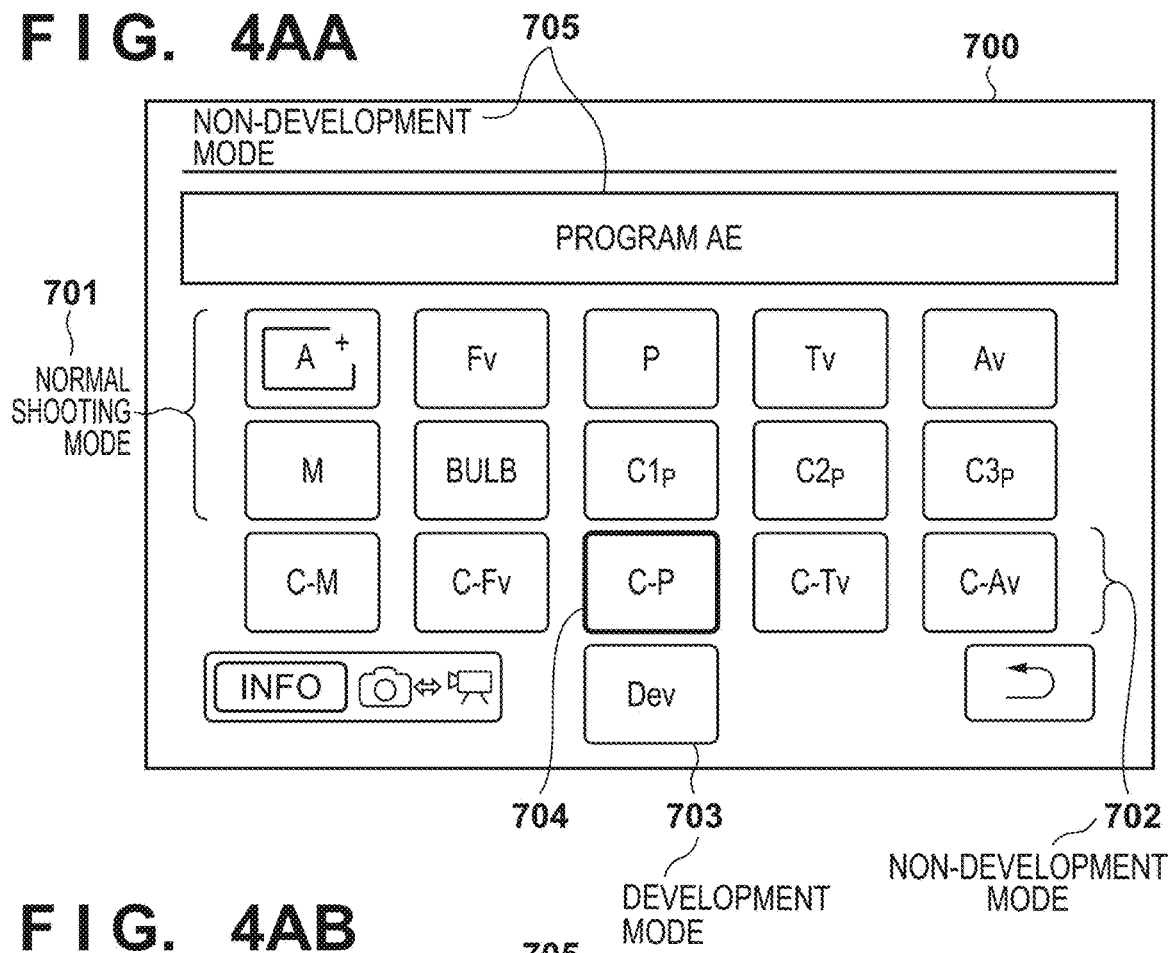
FIGS. 4AA and 4AB are diagrams illustrating an example of an operation mode setting screen according to an embodiment.
Figure 4A:
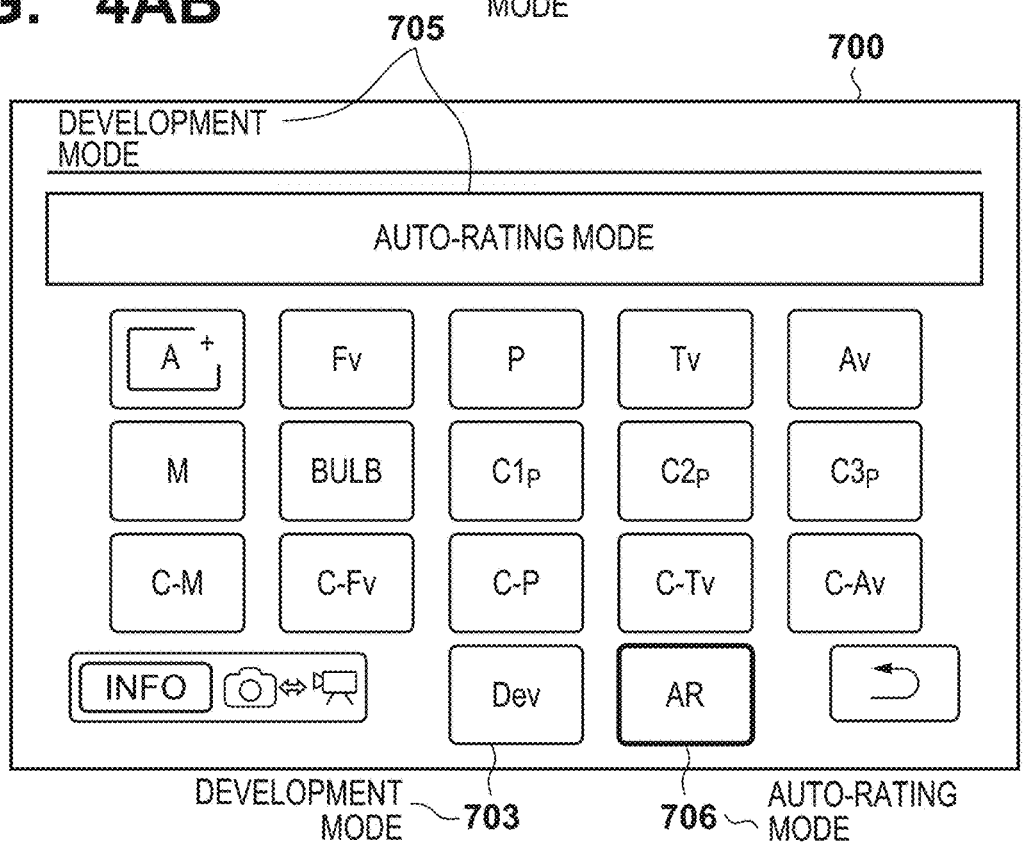

FIGS. 4AA and 4AB are diagrams illustrating an example of a mode selection screen 700 in the digital camera 100. Upon detecting that the mode change switch 121 has been pressed, the system control unit 132 reads out GUI data for the mode selection screen 700 from the ROM of the system memory 133. Then, the system control unit 132 supplies the GUI data to the image processing circuit 131 and causes the mode selection screen 700 to be displayed in the display unit 101. Other GUI screens are also displayed in the display unit 101 through the same operations.

Icons 701 and 702, which indicate a plurality of shooting modes that can be set, as well as an icon 703, which indicates the development mode, are displayed, as user interface elements or GUI elements, in a selectable manner in the mode selection screen 700. The shooting mode icons include the icons 701, which indicate shooting modes belonging to the normal shooting mode, and the icons 702, which indicate shooting modes belonging to the non-development modes. The following modes can be given as examples of normal shooting modes. These are an auto scene judgment mode (A), a flexible AE shooting mode (Fv), a program AE mode (P), a shutter speed priority mode (Tv), an aperture priority mode (Av), a manual mode (M), a bulb shooting mode (BULB), and custom modes (C1, C2, and C3). The flexible AE shooting mode (Fv) is a shooting mode that enables control equivalent to the four shooting modes of P, Tv, Av, and M. The custom modes are shooting modes which can be registered by a user.

The following modes can be given as examples of non-development modes a manual mode (C-M), a flexible AE shooting mode (C-Fv), a program AE mode (C-P), a shutter speed priority mode (C-Tv), and an aperture priority mode (C-Av). These modes are the same as the normal shooting modes of the same names, aside from the fact that the RAW data obtained through shooting is recorded without being subjected to development processing.

The development mode (Dev) is a mode in which the digital camera 100 automatically develops undeveloped RAW data which has been shot in the non-development mode and recorded into the storage device 160. That is, undeveloped RAW data is RAW data to which the development processing has not been applied.

FIG. 4AA illustrates a state in which the icon for the program AE mode in the non-development modes (C-P) is selected. As such, "non-development mode" and "program AE" are displayed in a display field 705 for "mode type" and "mode details", respectively, at the top of the mode selection screen 700.

Note that FIG. 4AA illustrates an example of the display of the mode selection screen 700 when auto-rating (described later) is executed automatically during shooting in a non-development mode.

On the other hand, FIG. 4AB illustrates an example of the display of the mode selection screen 700 when auto-rating is not executed automatically during shooting. In this case, an icon (AR) 706, indicating an auto-rating mode, is displayed as one of the development modes.

The auto-rating mode is a mode in which rating is executed for RAW data which has been recorded without auto-rating having been executed automatically during shooting in the non-development mode. However, the configuration may be such that auto-rating is executed automatically before development processing performed in the development mode. The auto-rating mode is unnecessary in such a case.

In FIGS. 4AA and 4AB, the icons 701 for shooting modes belonging to the normal shooting mode, the icons 702 for shooting modes belonging to the non-development mode, and the icon 703 for the development mode are displayed side by side so as to be part of a single group of choices. However, it is not necessary for all of the icons 701 to 703 to be displayed at once. For example, some of the icons 701 to 703 may be displayed, and the icons that are not displayed may be displayed by scrolling the screen.

Figure 4B:
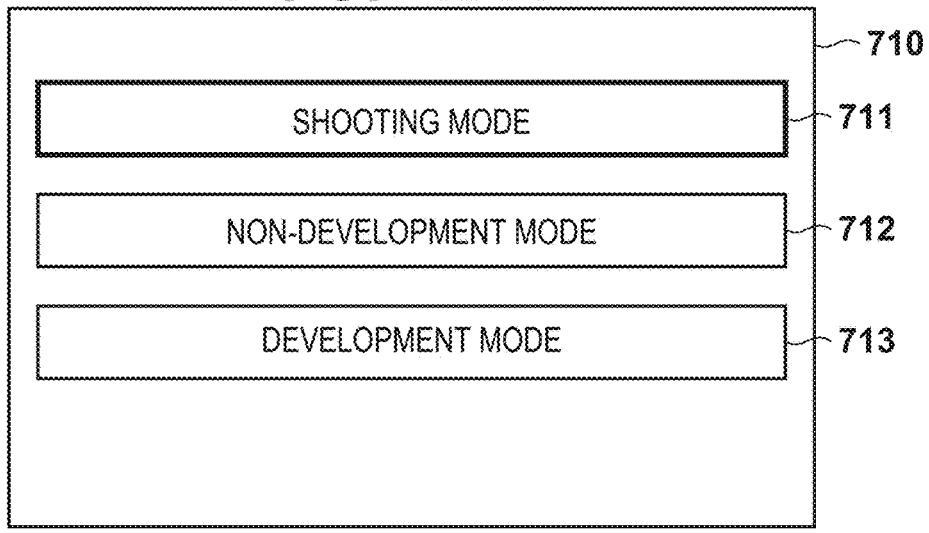
FIGS. 4BA to 4BC are diagrams illustrating another example of an operation mode setting screen according to an embodiment.
Figure 4B:
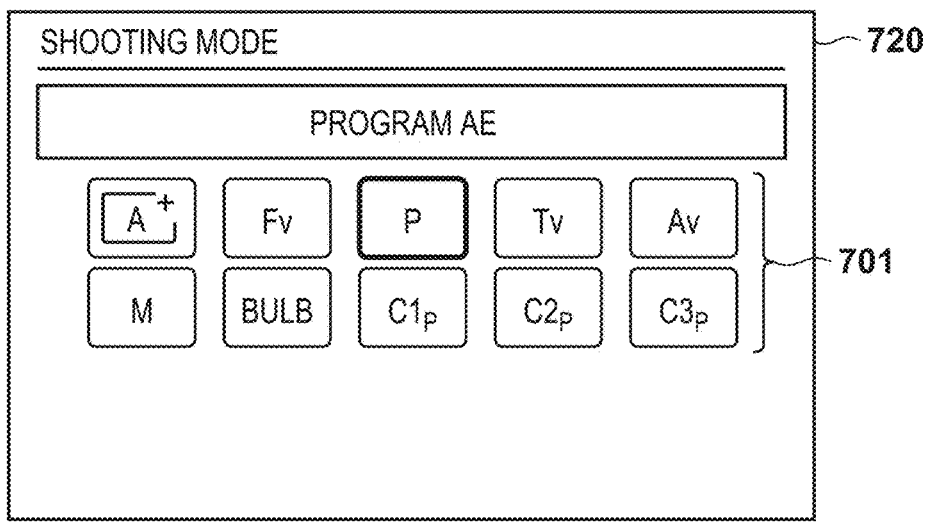
Figure 4B:
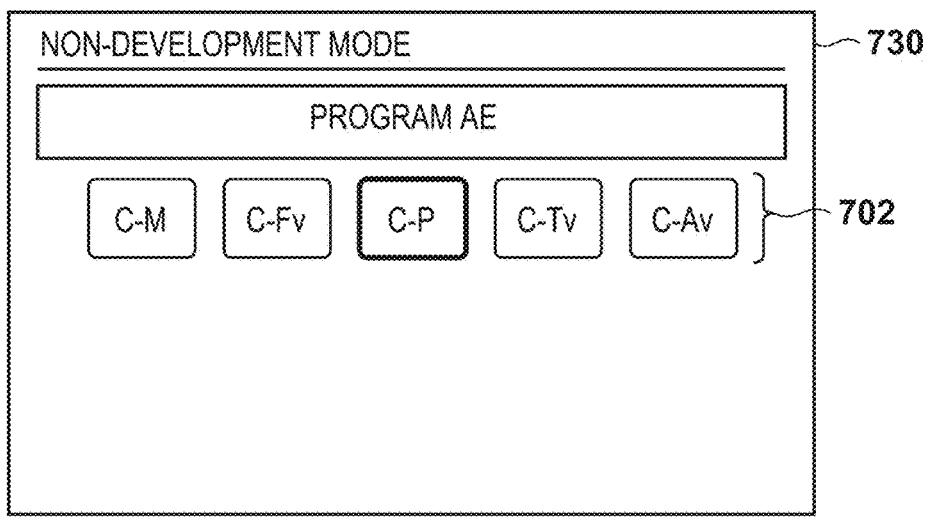

The group of choices including the icons 701 and the group of choices including the icons 702 can also be displayed exclusively. For example, the system control unit 132 first displays a mode selection screen 710 having mode buttons 711 to 713 in the display unit 101, as illustrated in FIG. 4BA. The mode selection screen 710 is a screen that allows the user to select a mode.

In the mode selection screen 710, the mode buttons 711 to 713 correspond to the normal shooting mode, a shooting mode pertaining to the non-development mode, and the development mode, respectively. Upon detecting that the mode button 711 has been selected, the system control unit 132 displays a setting screen 720, including the icons 701 indicating shooting modes belonging to the normal shooting modes, in the display unit 101, as illustrated in FIG. 4BB. Likewise, upon detecting that the mode button 712 has been selected, the system control unit 132 displays the icons 702, indicating shooting modes belonging to the non-development modes, in the display unit 101, as illustrated in FIG. 4BC.

However, with a configuration such as that illustrated in FIGS. 4BA to 4BC, the setting screen 720 displaying the icons 701 of the shooting modes belonging to the normal shooting modes will be displayed more frequently. As a result, the user may forget the existence of the icons 702 of the shooting modes belonging to the non-development modes. Therefore, as illustrated in FIGS. 4AA and 4AB, by displaying the icons 701 of the shooting modes belonging to the normal shooting modes and the icons 702 of the shooting modes belonging to the non-development modes side by side, the user can be made aware of the existence of the icons 702 of shooting modes belonging to the non-development modes.

Note that the mode selection screens 700, 710, 720, and 730 illustrated in FIGS. 4AA to 4BC are examples, and the specific types of modes displayed and the display format (arrangement, appearance, name, and so on) may be changed. The names of the operation modes are also merely examples.

Figure 5A:
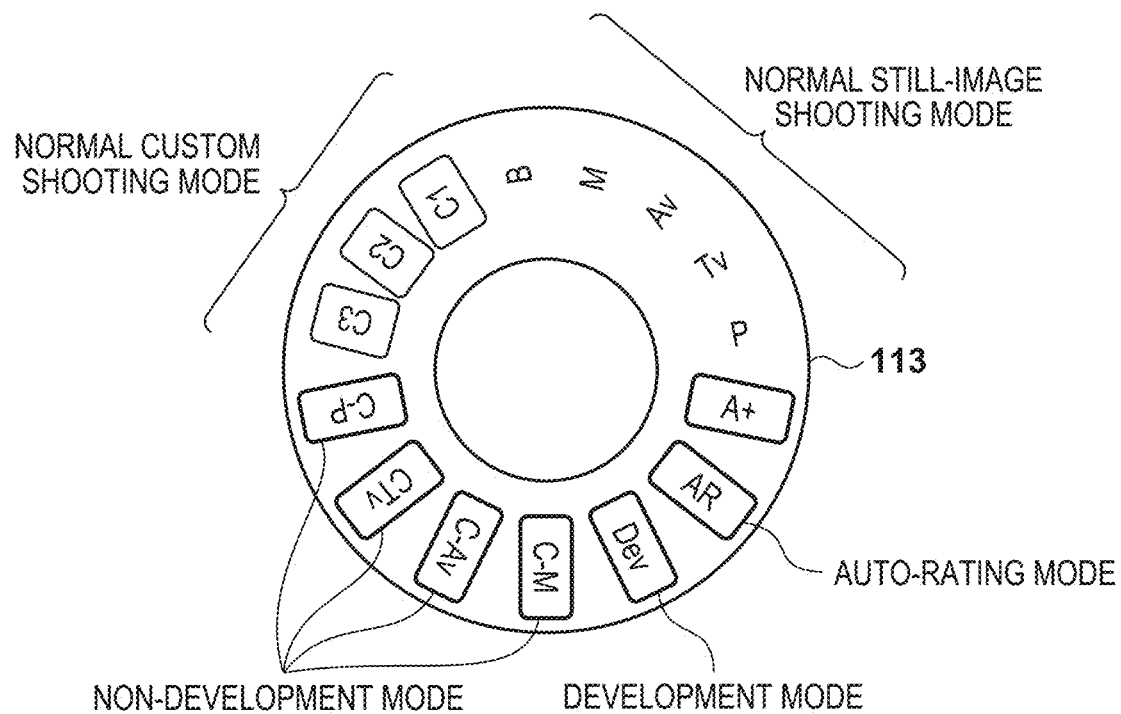
FIGS. 5A and 5B are diagrams illustrating an example of operation mode setting members according to an embodiment.
Figure 5B:
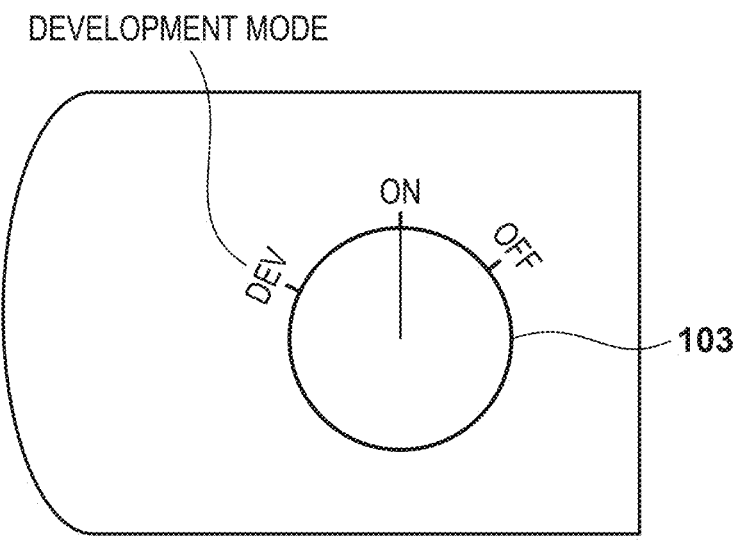

FIGS. 5A and 5B illustrate examples of a configuration in which the operation mode is directly selected (switched) using an operation member, without using a GUI such as the mode selection screen 700. The names of the operation modes indicated as user interface elements on the operation member are the same as those given with reference to FIGS. 4AA to 4BC.

FIG. 5A illustrates an example in which the sub dial 113 is used as the operation member. When the mode selection screen 700 is used, the mode selection (switching) requires at least an operation for displaying the mode selection screen 700 and an operation for selecting the desired mode from the mode selection screen 700. On the other hand, in the example where the sub dial 113 is used, the mode can be switched simply by rotating the sub dial 113 to select the desired mode. In FIG. 5A, the sub dial 113 can be used to directly select any of the modes which can be selected through the mode selection screen 700 illustrated in FIG. 4AB, with the exception of the flexible shooting modes (Fv and C-Fv). Note that instead of the sub dial 113, a slider may be provided as an operation member for selecting the operation mode, or the mode may be selected in response to the operation of the mode change switch 121 as described above.

FIG. 5B illustrates a configuration in which the power switch 103 is used to select the development mode among the above-described operation modes. In this example, when the development mode (Dev) is selected using the power switch 103, the system control unit 132 is instructed to turn the power on in the development mode. Accordingly, the system control unit 132 can control the power supply control unit 107 to not supply power to the first power supply domain 220, which is not used in the development mode, from the time when the power of the digital camera 100 is turned on.

The configuration and operations of the digital camera 100 will be described in further detail next.

Figure 6A:
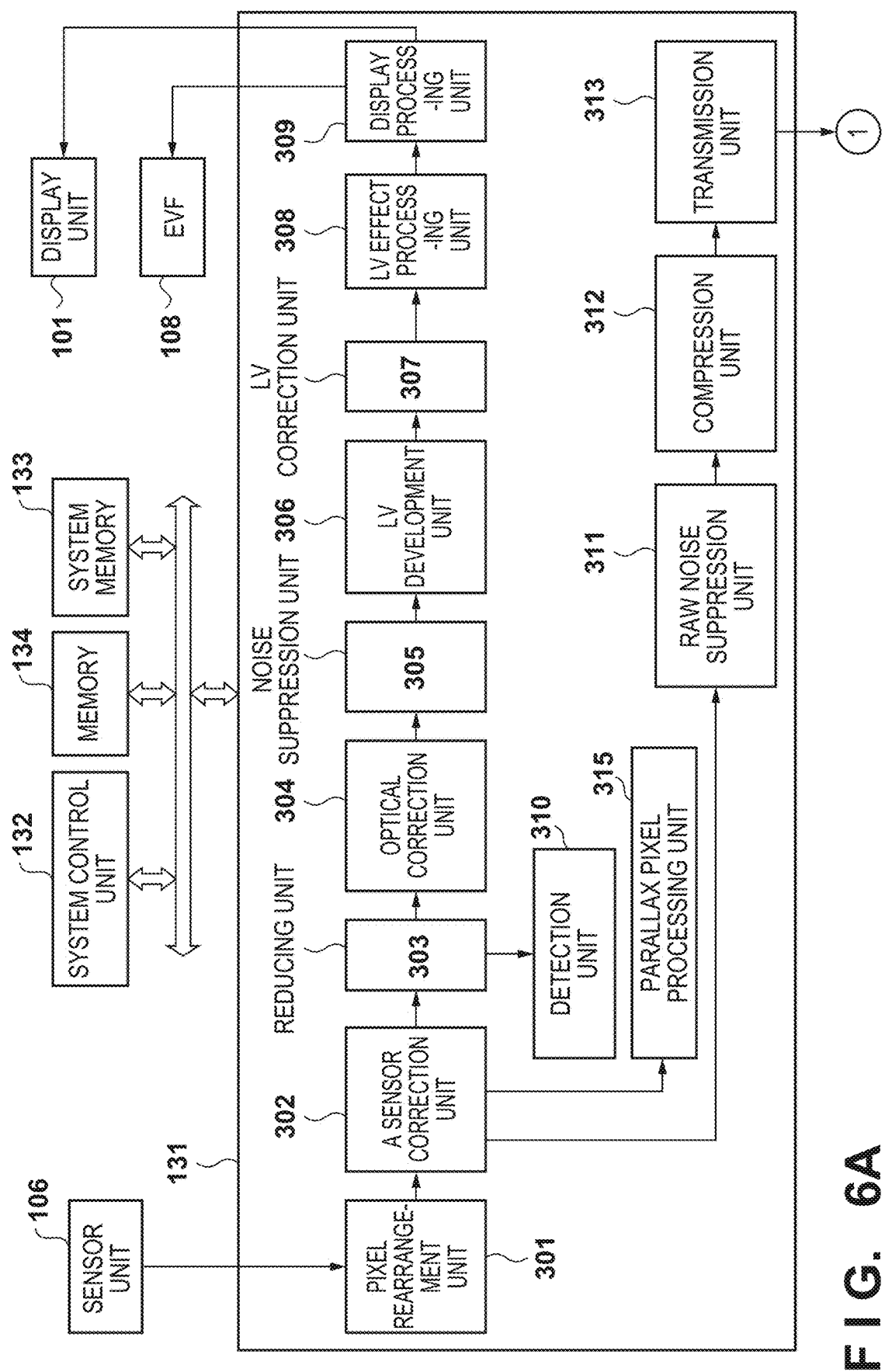
FIGS. 6A and 6B are block diagrams illustrating an example of the functional configurations of a front engine and a main engine according to an embodiment.
Figure 6B:
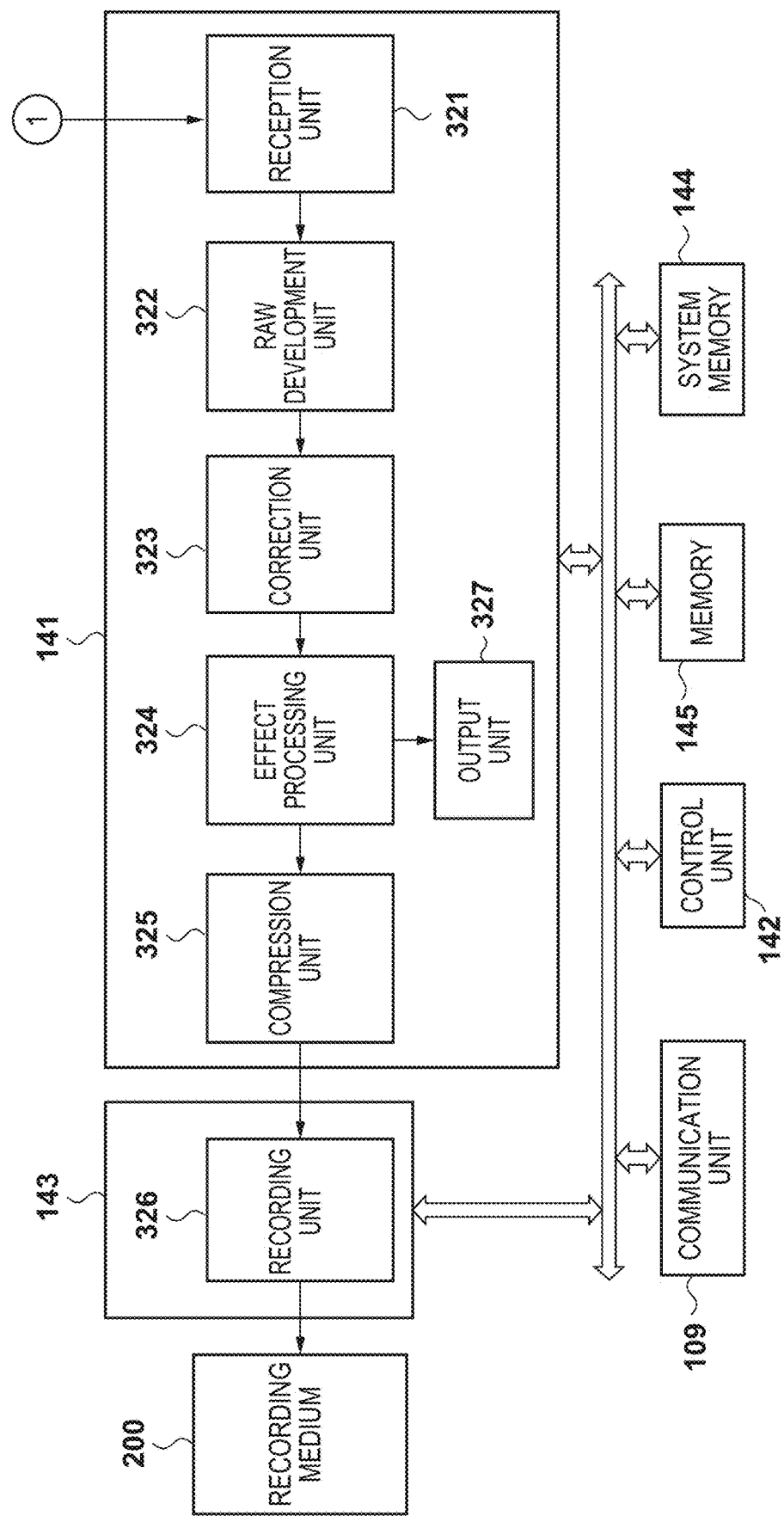

FIGS. 6A and 6B are block diagrams illustrating an example of the functional configurations of the front engine 130 and the main engine 140. Note that the function blocks of the image processing circuits 131 and 141 can be realized by dedicated hardware circuits, or by one or more CPUs of an image processing circuit executing programs. Additionally, the transfer of data between function blocks may be direct transfer from one function block to another function block, or may be indirect transfer in which data written by one function block into the memory 134 or 145 is read out to another function block. Although FIGS. 6A and 6B assume that an image file is recorded into the recording medium 200, the image file may be recorded into the storage device 160.

First, operations of the digital camera 100 in the still image shooting mode will be described with reference to FIGS. 6A and 6B. When the digital camera 100 is operating in the still image shooting mode and the live view display is enabled, the live view display is performed in a state of standing by for the input of the shooting preparation instruction or the shooting instruction (the shooting standby state). The live view display is achieved by continuously performing the operations from shooting a moving image to displaying the obtained moving image at low latency.

In the shooting standby state, the system control unit 132 controls the sensor unit 106 to shoot a moving image. The focal distance of the lens 151, the exposure conditions, and so on during the moving image shooting can be implemented as appropriate on the basis of evaluation values obtained by the image processing circuit 131. When controlling the focus of the lens 151 through image plane phase-detection AF, the system control unit 132 controls operations for readout from the sensor unit 106 so that a parallax image pair is obtained.

The sensor unit 106 outputs A/D-converted RAW data at a predetermined framerate. The following will describe processing performed for one frame's worth of RAW data.

The RAW data is input to the image processing circuit 131 of the front engine 130. The image processing circuit 131 has a first path for performing data processing for generating display image data, detection processing, and the like, and a second path for performing data processing for generating recording image data. Note that when image plane phase-detection AF is performed, a path for processing the parallax image may be provided as well.

The first path will be described first.

A pixel rearrangement unit 301 rearranges the RAW data input in raster scan order from the sensor unit 106 into a two-dimensional matrix so that the arrangement of pixel data corresponds to the pixel arrangement of the image sensor. The pixel rearrangement unit 301 may temporarily store, in the memory 134, a plurality of lines of data that are being rearranged. The pixel rearrangement unit 301 may include buffer memory.

The RAW data is image data that has one color component value for each pixel. In the present embodiment, the image sensor includes color filters in a primary color Bayer array, and thus the pixel data constituting the RAW data has either a red color component, a green color component, or a blue color component. In the present specification, "RAW data" is defined as image data in which each piece of pixel data has a single color component. "RAW data" can also be thought of as image data from before the application of synchronization processing or demosaicing processing, which complements the color component values so that each piece of image data has three color components. Therefore, processing that does not affect the number of color components per piece of pixel data, such as data compression processing, may be applied to the RAW data. In the example of FIGS. 6A and 6B, the image data from up to the point of input to an LV development unit 306, the RAW development unit 322, or the like is RAW data, and the image data output by the LV development unit 306, the RAW development unit 322, or the like is not RAW data.

An order of the pixel rearrangement unit 301 and a sensor correction unit 302 may be reversed when, for example, in one embodiments, the RAW data is processed in the order in which that RAW data is read out in the sensor correction unit 302.

The sensor correction unit 302 performs correction processing (sensor correction processing), based on the properties of the image sensor, on the RAW data. For example, the sensor correction processing corrects for variations in the photoelectric conversion efficiency (sensitivity) of the plurality of photoelectric conversion units included in the image sensor. The sensor correction unit 302 corrects the pixel values of the RAW data on the basis of the correction parameters stored in the system memory 133 or the like in advance. The sensor correction processing may include defective pixel correction processing. The defective pixel correction processing may be processing that interpolates the value of a pixel registered as a defective pixel using the values of surrounding normal pixels, or that subtracts a predetermined offset value. Some or all of the defective pixel correction processing may be performed as part of the development processing.

The RAW data corrected by the sensor correction unit 302 is supplied to a reducing unit 303, a parallax pixel processing unit 315, and a RAW noise suppression unit 311. The supply destination may be changed dynamically according to the operating state, such as not supplying the RAW data to the RAW noise suppression unit 311 when in the shooting standby state.

The reducing unit 303 reduces (reduces the resolution of) the RAW data and generates reduced RAW data in order to efficiently perform the display image data generation processing, the detection processing, and the like. The reducing unit 303 reduces high-resolution RAW data, such as a 4K or 8K, to, for example, an HD resolution (equivalent to 2 million pixels). HD resolution is, for example, 1,920 horizontal pixels×1,080 vertical pixels. The reducing unit 303 may reduce the RAW data to match a display resolution of the display unit 101 or the resolution of a display region of the live view image. The reduced RAW data is supplied to the optical correction unit 304 and a detection unit 310.

Display image data is generated from the reduced RAW data by units from the optical correction unit 304 to a display processing unit 309. Additionally, on the basis of the reduced RAW data, the detection unit 310 calculates evaluation values used for contrast AF, AE, and the like, detects and tracks feature amount regions, recognizes objects and scenes, calculates the magnitude of motion blur, and the like.

First, the processing performed by the units from the optical correction unit 304 to the display processing unit 309, which generates the display image data (the live view image data), will be described.

The optical correction unit 304 applies correction processing pertaining to the optical properties of the lens 151 and the like (optical correction processing) to the reduced RAW data. The optical correction processing is, for example, processing that corrects the effects of a drop in light intensity in peripheral areas due to aberrations in the lens 151.

A noise suppression unit 305 applies noise reduction processing to the reduced RAW data output from the optical correction unit 304. The noise reduction processing is typically referred to as noise reduction (NR). The noise reduction processing can be realized by, for example, moving average filter processing, median filter processing, or the like.

The LV development unit 306 applies development processing (LV development processing) to the reduced RAW data output from the noise suppression unit 305. The LV development processing has a lower processing load and lower resource load (communication bandwidth with the memory 134 and the like) than the development processing applied by the RAW development unit 322 of the main engine 140. Specifically, the number of taps in the filter processing is less than that in the development processing by the RAW development unit 322, the precision of operations such as multiplication is lower, and so on, but these are only examples. The LV development processing includes demosaicing or color interpolation processing, and generates image data in which each pixel has information of all color components (R, G, and B). In the present embodiment, image data obtained by applying the LV development processing to the reduced RAW data is used as the display image data.

An LV correction unit 307 applies correction processing such as distortion correction, enlargement processing, and reduction processing to the display image data. The LV correction unit 307 executes the enlargement processing or reduction processing so that the resolution of the display image data matches the resolution of the display device (the display unit 101 and the EVF 108) or the display region where the live view image is displayed. Note that the enlargement processing or reduction processing is performed when necessary. Different resolutions may be used for the display unit 101 and the EVF 108.

An LV effect processing unit 308 applies effect processing, which provides a predetermined display effect, to the corrected display image data. The effect processing includes, for example, color conversion to a sepia tone or black and white, processing for applying a mosaic or painting effect, and the like. If no effect processing is required, the LV effect processing unit 308 outputs the input display image data as-is.

The display processing unit 309 displays the display image data output by the LV effect processing unit 308 in the display unit 101 and the EVF 108. The display processing unit 309 applies input/output correction, gamma correction, white balance correction, and the like to the display image data. The display processing unit 309 also composites image data of assist information onto the display image data. Examples of the assist information include, but are not limited to, numerical values, images such as icons, and the like that indicate the current settings, frame-shaped images that indicate a detected feature region, focus detection region (AF region), and the like. The display processing unit 309 outputs the display image data, onto which the image data of the assist information has been composited as needed, to the display unit 101 or the EVF 108.

The display unit 101 and the EVF 108 display the input display image data. One frame of the live view image is displayed in the display unit 101 and the EVF 108 as a result of the above-described series of processes. The live view display is performed in the display unit 101 and the EVF 108 by executing the same processing at a predetermined framerate.

Operations performed by the detection unit 310 will be described next. The detection unit 310 applies predetermined processing to the reduced RAW data, and calculates various evaluation values, detects and tracks feature regions, and the like. The evaluation values include, for example, evaluation values for contrast AF, AE, and white balance adjustment. These evaluation values are used as appropriate by the system control unit 132 and the like.

The reduced RAW data may be gain-adjusted before being input to the LV development unit 306 using the evaluation values calculated by the detection unit 310. The evaluation values calculated by the detection unit 310 may be used for the evaluation values, of the evaluation values obtained for the recording image data, which are the same as those calculated by the detection unit 310 from the reduced RAW data.

The detection unit 310 also has a function for detecting, for example, a face region, a body region, and the like of a person as a feature region. The detection unit 310 may be provided with a trained neural network, and may output a result of executing image recognition through feature point extraction. The detection unit 310 stores information indicating the size, position within the image, and so on of the detected feature region in, for example, the memory 134. The detection unit 310 may generate a histogram of integrated pixel values, brightness levels, and/or color levels for all or part of the image data.

Using the information of the feature region stored in the memory 134 and feature information of a specific person registered in advance, the system control unit 132 may recognize a person in the feature region, use a recognition result in authentication processing, and the like. Additionally, the system control unit 132 may use the feature region as a focus detection region, determine the exposure conditions so that the feature region has an appropriate brightness, and so on.

Note that the evaluation values calculated by the detection unit 310, the information of the detected feature region, and so on may be output to the display processing unit 309 as part of the above-described assist information, and may be composited and displayed with the LV image.

The parallax pixel processing unit 315 finds a defocus amount of the lens 151 on the basis of the principles of phase detection AF when it is possible to obtain a parallax image pair from the RAW data output by the sensor unit 106. For example, a parallax image pair can be obtained from the RAW data output by the sensor unit 106 when the image sensor is provided with pixels for AF, when pixels provided in the image sensor are configured so that a single microlens is shared by a plurality of photoelectric conversion regions, or the like. The operations of the parallax pixel processing unit 315 are publicly known as a method for calculating a defocus amount in image plane phase-detection AF, and will therefore not be described in detail here. The defocus amount found by the parallax pixel processing unit 315 is converted, by the system control unit 132, into a drive amount and a drive direction of the focusing lens in the lens 151, and is used for AF operations.

The second path through which data processing for generating the recording image data is performed will be described next.

The RAW noise suppression unit 311 reduces noise in the RAW data output by the sensor correction unit 302. The RAW noise suppression unit 311 can execute the same type of noise reduction processing as the noise suppression unit 305.

A compression unit 312 applies publicly-known data compression (coding) processing to the RAW data output by the RAW noise suppression unit 311. The compression unit 312 can apply data compression processing that combines, for example, a wavelet transform, quantization, and entropy coding (differential coding or the like). The compression (coding) processing applied by the compression unit 312 may use a lossy method or a lossless method. However, when applying lossy compression processing, a method or setting is used to ensure that a loss in quality of the RAW data resulting from the compression processing is sufficiently low. Compressed RAW data generated by the compression unit 312 may be stored temporarily in the memory 134, the storage device 160, or the like before being transmitted to the main engine 140. However, when the storage device 160 is an SSD, there is a limit to the number of times data can be written thereto, and it is therefore desirable to avoid using the storage device 160 for temporary storage aside from cases where the framerate or the continuous shooting speed is high.

In the "still image shooting mode" described with reference to FIGS. 6A and 6B, the digital camera 100 according to the present embodiment transmits the compressed RAW data from a transmission unit 313 of the front engine 130 to a reception unit 321 of the main engine 140. In the "non-development mode", which will be described later with reference to FIG. 8, the compressed RAW data is transmitted from the file processing unit 314 of the front engine 130 to the storage device 160.

The transmission unit 313 transmits the compressed RAW data to the reception unit 321 of the main engine 140. Using the memory 134 as a transmission buffer makes it possible to dynamically adjust the data rate of the input to the main engine 140. For example, a transfer speed between the transmission unit 313 and the reception unit 321 can be made slower than the compressed RAW data generation rate in accordance with the progress of the processing performed by the main engine 140. However, the performance of the speed adjustment depends on the free space in the memory 134. In particular, when shooting using a rolling shutter, in one embodiment, the RAW data at a high speed is read in order to suppress distortion in images of moving objects. On the other hand, from the perspective of costs and power consumption, it is difficult to increase the processing capabilities of the main engine 140 so as to be capable of handling the output data rate of the front engine 130. As such, using the memory 134 as a transmission buffer is useful. Note that the compression unit 312 may use the memory 134 as an output buffer, instead of the transmission unit 313. Additionally, the storage device 160 may be used as a buffer for the compressed RAW data.

The image processing circuit 141 of the main engine 140 generates the recording image data by applying, to the RAW data obtained from the front engine 130, development processing that has a higher level of quality than the front engine 130. The image processing circuit 141 can also apply development processing to the RAW data recorded in the storage device 160. Additionally, the recording/playback unit 143 records the recording image data generated by the image processing circuit 141 into the storage device 160, the recording medium 200, or the like.

The reception unit 321 receives the compressed RAW data from the transmission unit 313 and decompresses the RAW data. The decompression processing applied by the reception unit 321 corresponds to the coding processing applied by the compression unit 312.

The RAW development unit 322 generates the recording image data by applying the development processing to the decompressed RAW data. The RAW development unit 322 performs de-Bayer processing (demosaicing), i.e., color interpolation processing, on the RAW data so that each pixel has RGB color components. The RGB components may also be converted into a luminance component and color difference components. Furthermore, the RAW development unit 322 applies processing for removing noise, correcting optical distortion, and the like. The development processing executed by the RAW development unit 322 is of higher quality than the development processing executed by the LV development unit 306. Specifically, development processing that uses algorithms and operations that produce higher quality images is applied. This is because the recorded image data is displayed on a large screen, printed, or the like, and thus requires a higher quality than the moving images displayed in the display unit 101, the EVF 108, or the like. Even among recorded image data, still image data requires higher quality than moving image data. Therefore, the RAW development unit 322 requires more circuitry and computing resources than the LV development unit 306, and thus requires more power as well.

A correction unit 323 executes correction processing such as distortion correction, enlargement processing, reduction processing, noise suppression processing, and the like on the image data on which the development processing has been executed. When shooting and recording processing is executed, the correction unit 323 executes distortion correction and noise suppression processing on the recording image data on which the development processing has been executed. Additionally, when executing live view output processing for outputting image data to an external device as a live view image via the communication unit 109, enlargement processing or reduction processing for output to a display device is executed in addition to the distortion correction and the noise suppression processing.

An effect processing unit 324 applies effect processing (black and white conversion, color adjustment, and the like) to the image data to obtain a predetermined display effect when displaying the live view in an external device, and outputs the resulting data to a compression unit 325 and an output unit 327. Whether or not to apply the effect processing to the image data output to the compression unit 325 may be configured to be selectable or not selectable.

The output unit 327 outputs the image data, which has been output from the effect processing unit 324, to the external device via the communication unit 109. When performing the live view display in an external device, the output unit 327 performs input/output correction, gamma correction, white balance correction, and the like on the display image data output from the effect processing unit 324 (the LV image data). Additionally, the output unit 327 composites an image indicating the assist information to be displayed with the LV image data onto the LV image data. The assist information is the same as the information described with reference to the display processing unit 309, and will therefore not be described here. The output unit 327 outputs the composited LV image data to the external device via the communication unit 109. Note that when performing playback processing in the external device, the output unit 327 executes the same processing, aside from the assist information being different.

The compression unit 325 applies data compression processing to the image data. The compression processing applied by the compression unit 325 may be coding processing compliant with a publicly-known standard. The compression unit 325 can, for example, apply JPEG or HEIF format coding processing for still image data, and MPEG2, H264, or H265 format coding processing for moving image data.

A recording unit 326 of the recording/playback unit 143 records a data file containing the coded image data generated by the compression unit 325 into the recording medium 200 using, for example, a method compliant with DCF (Design rule for Camera File system).

In this manner, with the digital camera 100 according to the present embodiment, image processing pertaining to the live view display in the display unit 101 and the EVF 108 can be performed using the front engine 130, and it is not necessary to use the main engine 140. On the other hand, when recording the image data, the main engine 140 is used in addition to the front engine 130.

Figure 7:
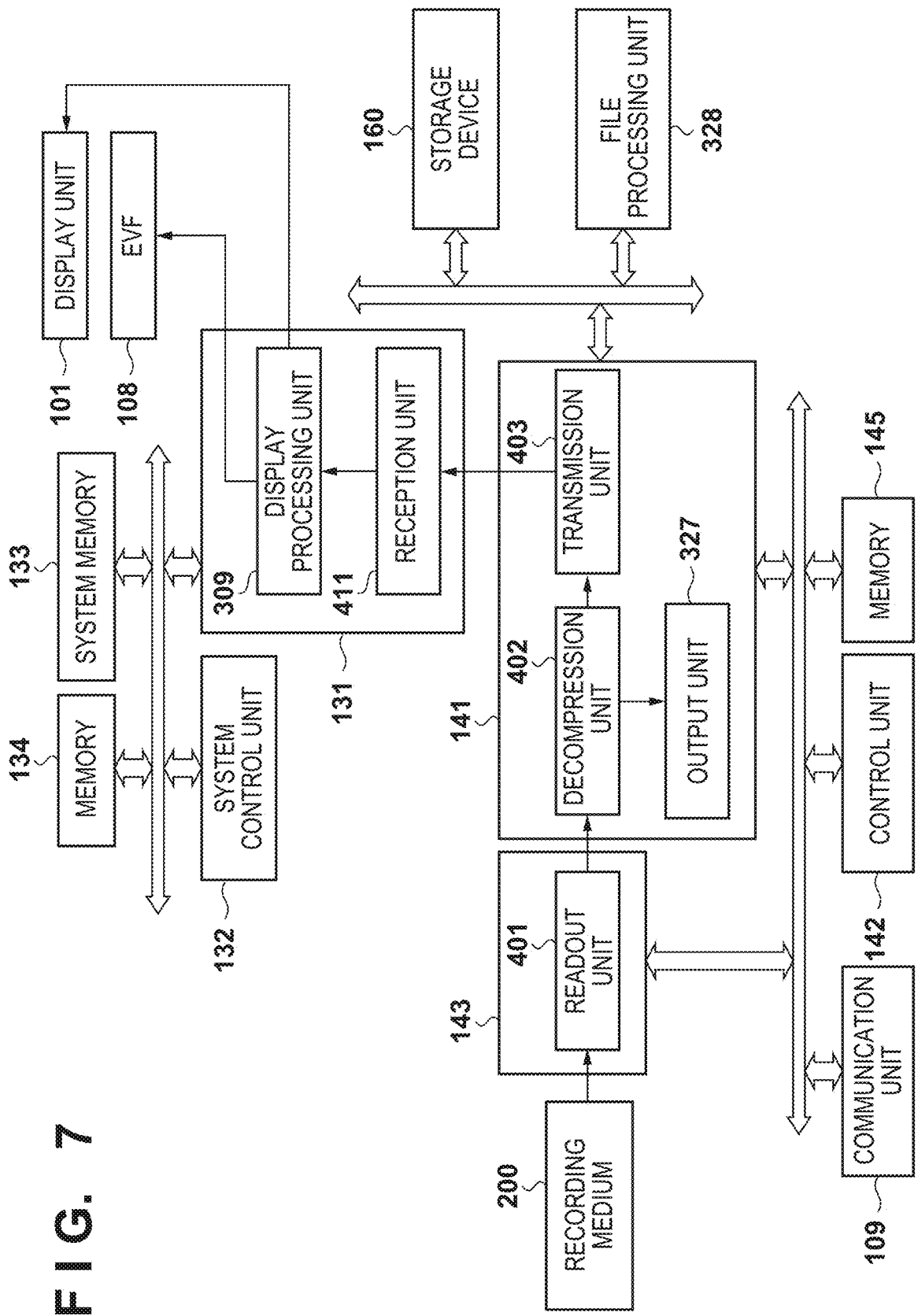
FIG. 7 is a block diagram illustrating an example of the functional configurations of the front engine and the main engine according to an embodiment.

FIG. 7 is a block diagram illustrating an example of the functional configurations of the front engine 130 and the main engine 140 when the digital camera 100 operates in the playback mode. In FIG. 7, function blocks already described with reference to the still image shooting mode are given the same reference signs as in FIGS. 6A and 6B.

When the digital camera 100 is operating in the playback mode, both the front engine 130 and the main engine 140 operate in a normal state. The normal state is a state in which image processing can be executed. In contrast to the normal state, a restricted state is a state in which at least the power consumption is limited to a lower level than in the normal state, and for example, some or all of the image processing that can be executed in the normal state cannot be executed in the restricted state. However, even in the restricted state, each engine can receive instructions pertaining to engine startup from the exterior, and can execute startup control. In other words, the restricted state can also be called a "standby state".

For example, in the normal state, the front engine 130 can execute image processing for generating display image data, to be displayed in the display unit 101 and/or the EVF 108, from the RAW data input from the sensor unit 106. Additionally, if both the front engine 130 and the main engine 140 are in the normal state, the front engine 130 can execute processing for compressing the RAW data input from the sensor unit 106 and outputting that data to the main engine 140. Furthermore, the front engine 130 can execute image processing for generating the display image data from the image data supplied from the main engine 140 and displaying that data in the display unit 101.

The front engine 130 includes the system control unit 132, which controls the operations of the digital camera 100. As such, basically, the front engine 130 will not operate in the restricted state when the power of the digital camera 100 is turned on. Exceptions to this include a case where no operations have been made for a predetermined amount of time and the camera has gone into a sleep mode.

In the normal state, the main engine 140 can execute recording control processing of generating the recording image data from the compressed RAW data input from the front engine 130 and recording that data into the storage device 160, the recording medium 200, or the like. Additionally, in the normal state, the main engine 140 can execute playback display control processing of reading out the image data stored in the recording medium 200 and outputting that data to the front engine 130. Furthermore, in the normal state, the main engine 140 can execute output control processing of outputting the display image data input from the front engine 130 to an external device via the communication unit 109. On the other hand, in the restricted state, the main engine 140 cannot execute one or more of the above-described recording control processing, playback display control processing, and output control processing.

As operations performed by the digital camera 100 in the playback mode, the following will describe operations in which an image file containing developed image data is read out from the recording medium 200, display image data is generated from the image data, and the display image data is displayed in the display unit 101. However, an image file recorded in the storage device 160 may be used for the playback instead. In this case, the file processing unit 328 reads out the image file from the storage device 160 and inputs the file into a decompression unit 402 of the main engine 140. When the file processing unit 328 of the main engine 140 reads out data from the storage device 160, the isolator 161 of the storage device 160 cuts off the electrical connection with the front engine 130. Meanwhile, the isolator 162 establishes an electrical connection with the main engine 140.

In the playback mode, the system control unit 132 controls a readout unit 401 of the recording/playback unit 143 to read out an image file recorded in the recording medium

200. The readout unit 401 extracts the image data from the read-out image file and outputs the extracted data to the image processing circuit 141. Developed image data is stored in the image file in a coded state. When the image file contains both recording image data and display image data, the readout unit 401 outputs the display image data to the image processing circuit 141.

In the image processing circuit 141, the decompression unit 402 decompresses the input image data. The decompression unit 402 outputs the decompressed image data to a transmission unit 403 and the output unit 327. The transmission unit 403 transmits the image data to the front engine 130. Note that the decompression unit 402 may be the same function block as the compression unit 325, and the transmission unit 403 may be the same function block as the reception unit 321.

A reception unit 411 of the front engine 130 receives the image data output from the main engine 140 and outputs that data to the display processing unit 309. The reception unit 411 may be the same function block as the transmission unit 313.

The display processing unit 309 generates the display image data on the basis of the image data, and displays the display image data in the display unit 101 or the EVF 108.

When the user operates the operation unit 110 to instruct thumbnails to be displayed, the system control unit 132 controls the main engine 140 to read out a plurality of image files from the recording medium 200 or the storage device 160 to be used for a thumbnail display. The main engine 140 then outputs the plurality of pieces of image data to the front engine 130. The system control unit 132 then generates a thumbnail image for each of the plurality of pieces of image data, and controls the display processing unit 309 to generate a list display screen. The display processing unit 309 may use the reduction processing function of the LV correction unit 307 to generate the thumbnail images.

The image data output by the decompression unit 402 may be supplied to the output unit 327 via the effect processing unit 324 as necessary. The output unit 327 generates the display image data from the received image data and outputs the display image data to the external device via the communication unit 109. The output unit 327 performs scaling, input/output correction, gamma correction, white balance correction, and the like on the image data output from the decompression unit 402. Additionally, the output unit 327 performs processing for combining the image data with images indicated by the assist information (GUI elements such as icons), which are to be displayed along with the display image data. The output unit 327 can generate thumbnail images for the thumbnail display. The output unit 327 outputs the display image data to the external device via the communication unit 109.

Operations performed by the digital camera 100 in the "non-development mode" and the "development mode" will be described next. The non-development mode is an operation mode in which RAW data is recorded into the storage device 160 without performing the development processing in order to achieve a high continuous shooting speed. The development mode is an operation mode in which the main engine 140 automatically executes the development processing on RAW data recorded in the non-development mode. Because the development mode basically applies the development processing to the undeveloped RAW data continuously without any selection operations by the user, the development mode may be called a "batch development processing mode".

Data in the storage device 160 can be accessed both from the front engine 130, and from the main engine 140. The storage device 160 is accessed from the front engine 130 via the file processing unit 314, and from the main engine 140 via the file processing unit 328. The storage device 160 is managed by a basic system (OS) running on the digital camera 100. As such, access to the storage device 160 through the file processing units 314 and 328 can be realized by processors constituting the respective engines and the OS running on the digital camera 100. Accordingly, the file processing unit 314 is realized by the system control unit 132, and the file processing unit 328 is realized by the control unit 142.

To enable access by a plurality of processors, FAT information of the storage device 160 may be held in the storage device 160 as a conversion table between LBAs (Logical Block Addresses) recognized by the OS and physical addresses of the storage device 160.

Figure 8:
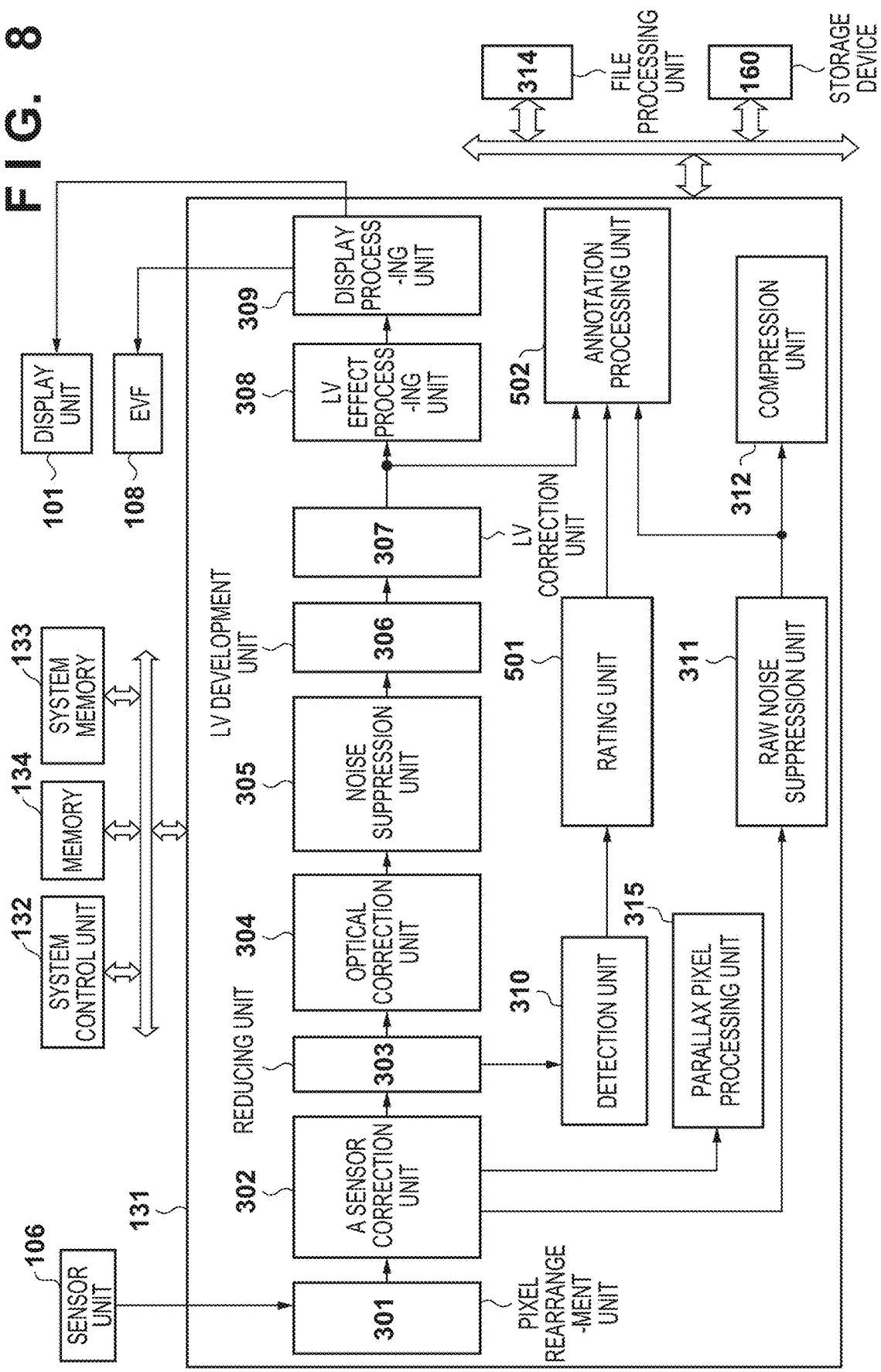
FIG. 8 is a block diagram illustrating an example of the functional configuration of the front engine according to an embodiment.

FIG. 8 is a block diagram illustrating an example of the functional configuration of the front engine 130 when the digital camera 100 operates in the non-development mode. In FIG. 8, function blocks already described with reference to the still image shooting mode are given the same reference signs as in FIGS. 6A and 6B. The main engine 140 is not used in the non-development mode, and thus the power supply control unit 107 stops the supply of power to the second power supply domain 221.

When the live view display is enabled in the non-development mode, the operations with respect to the live view display are the same as in the still image mode, and thus the function blocks 301 to 309, which pertain to the generation of the display image data, will not be described here.

In the non-development mode, the system control unit 132 continuously executes still image shooting while shooting instructions are being continuously input using the shutter button 102. The continuous shooting speed in the non-development mode is faster than the normal still image continuous shooting speed used in the development processing. Note that while shooting in the non-development mode, the exposure conditions, the focal distance of the lens 151, and the like may be fixed, or the exposure conditions, the focal distance, or the like may be adjusted every time a predetermined number of images have been shot.

The following will describe operations from the shooting to the recording of a single still image. The system control unit 132 controls a charge accumulation time of the image sensor according to the exposure conditions, reads out the RAW data from the sensor unit 106, and supplies the RAW data to the image processing circuit 131 of the front engine 130. The RAW data is converted into compressed RAW data by the pixel rearrangement unit 301, the sensor correction unit 302, the RAW noise suppression unit 311, and the compression unit 312. The file processing unit 314 records an image file of a predetermined format, which contains the compressed RAW data corresponding to a single still image, in the storage device 160.

As in the still image mode, the live view display may be performed on the basis of the RAW data output from the sensor correction unit 302. Note that when the continuous shooting speed in the non-development mode is faster than the framerate of the live view display, the display image data may be generated by thinning out the RAW data output from the sensor correction unit 302 at the frame level.

Additionally, the generated display image data may be recorded into the storage device 160. Until the development processing is complete for the RAW data recorded in the non-development mode, this display image data can be used as developed image data for confirming the shooting details of the RAW data. For example, by using the display image data, the user can confirm the shooting range (angle of view), the image quality, the state of the subject (blown-out highlights/blocked-up shadows, camera shake, whether or not a person's eyes are closed, and the like) without performing the development processing on the RAW data.

Although compressed RAW data and display image data obtained from the same RAW data can be recorded in the same image file, the present embodiment assumes that these are recorded as individual image files. This is because it takes longer to generate compressed RAW data for recording than it does to generate the display image data. Note that when display image data is recorded for each piece of compressed RAW data, the display image data is generated for all still image frames, even if the continuous shooting speed is faster than the framerate of the live view display.

The operations of the detection unit 310, the RAW noise suppression unit 311, the compression unit 312, and the parallax pixel processing unit 315 are the same as in the still image mode and will therefore not be described here.

A rating unit 501 rates the RAW data obtained from shooting in the non-development mode by using evaluation values detected by the detection unit 310, and outputs a rating result to an annotation processing unit 502. "Rating" is processing for ranking (rating) the RAW data on the basis of given conditions. As one example, in the present embodiment, the rating result is used as a basis for determining whether or not to apply the development processing.

The rating performed by the rating unit 501 is "auto-rating", which is executed by the digital camera 100 automatically. Whether or not to execute auto-rating may be settable by the user. In the present embodiment, by recording the rating result in association with the RAW data, image files recorded in the storage device 160 can be searched for using rating results. In the present embodiment, the evaluation values calculated by the detection unit 310 are used by the rating unit 501. Note that the rating unit 501 may improve the accuracy of the auto-rating by accumulating auto-rating results to, for example, train a neural network.

Although the conditions used for the rating are not particularly limited, typical conditions which can be used are as follows:
  detection results of feature regions such as faces or organs
  pixel values and computation results thereof, such as pixel values and/or integrated values thereof in a predetermined region, histograms of luminance and/or color levels, and the like
  feature amounts obtained through machine learning, including deep learning. Note that information of the feature region may be obtained using these feature amounts. Note also that a learning model for extracting feature amounts through machine learning may be stored in the storage device 160. The newly-obtained feature amount may be fed back into the learning model.
  presence, absence, and degree of blown-out highlights, blocked-up shadows, camera shake, and a person's eyes being closed FIGS. 9A and 9B are schematic diagrams illustrating an example of setting screens pertaining to the non-development mode and the development mode.

FIG. 9A is an example of a setting screen pertaining to the non-development mode, and includes a setting item for setting whether or not to execute auto-rating. When auto-rating is set to "off", auto-rating will not be executed.

"Rating determination basis" is an item for setting the auto-rating conditions. For example, conditions to be used may be selected from the conditions mentioned above or other conditions, or the details of each condition to be used may be settable.

FIG. 9B is an example of the setting screen pertaining to the development mode, and includes a setting item pertaining to how the rating result is to be used in the development mode. If a rating result associated with the image file in question is not recorded, the setting screen may be hidden, or the item may be displayed in a non-selectable manner.

When rating-based development is set to "on", the development processing is applied in order starting with the image file having the highest rank assigned through the rating. When the image files to which the development processing is applied include an image file for which no rating information is recorded, that image file is treated as having been assigned the lowest rank. Alternatively, when rating-based development is set to "on", image files for which no rating information is recorded may be excluded from development.

"Lower limit rate for development" is a setting item for narrowing down the image files to be developed, and the image files that are assigned a rank greater than or equal to the lower limit will be developed. An example in which 10 levels of ranks, from 1 to 10 (10 being the highest rank) are assigned through auto-rating, and 8 is set as the lower limit, is given here. Accordingly, image files having a rank of 8, 9, or 10 are subject to development.

"Upper limit of the number for batch development" is an item that sets an upper limit for the number of image files to be subjected to rating-based development. Although 999 is set as an example here, a lower or higher upper limit value may be settable in accordance with the apparatus. Note that the upper limit number being set to 0 may be treated as unlimited.

"Rating-based development during power off" is an item that specifies operations performed when the power switch 103 is turned off while development processing is being executed in the development mode. When rating-based development during power off is set to "on", the system control unit 132 continues the rating-based development and executes shutdown processing for the digital camera 100 when the rating-based development ends. In the rating-based development after the power switch 103 has been turned off, the lower limit rate during power off is applied instead of the lower limit rate for development, and an upper limit for the number of images to be developed during power off is applied instead of the upper limit of the number for batch development. The setting values of the lower limit rate for rating-based development and the upper limit on the number of images to be developed when the power is turned off may be limited to values that reduce the number of images to be developed compared to the setting values when the power is turned on.

If, when rating-based development during power off is set to "off", the power switch 103 is turned off during rating-based development, the system control unit 132 ends the rating-based development and executes the shutdown processing.

The RAW data during the development processing is recorded into the storage device 160. Accordingly, immediately stopping the development processing and executing the shutdown processing in response to the power switch 103 being turned off poses no problem.

The rating-based development during power off is a function that prioritizes reducing the number of pieces of undeveloped RAW data remaining in the storage device 160 over the delay between when an instruction to turn the power off is made and when the shutdown processing is executed. Continuing the rating-based development to a certain extent even after receiving an instruction to turn the power off makes it possible to increase the number of pieces of RAW data for which results of the development processing can be provided.

In the present embodiment, the rank or rating value assigned to individual pieces of RAW data by the rating unit 501 is used to determine whether or not the RAW data is to be subjected to the development processing. The rank or rating may also be used to determine the order in which the development processing is applied. For example, the development processing may be applied in order from RAW data to which a higher rank or rating is assigned. For RAW data that has been assigned the same rank or rating, the order in which the development processing is applied may be determined according to the oldest shooting date/time, the newest shooting date/time, the largest file size, the highest recording quality, or the like, or the development processing may be applied in a random order.

Returning to FIG. 8, the rank assigned by the rating unit 501 is forwarded to the annotation processing unit 502. The annotation processing unit 502 generates an annotation (supplementary information that serves as an annotation), which is information unique to each piece of RAW data.

The annotation processing unit 502 generates unique information (e.g., a hash value) for each piece of RAW data and display image data (if any). For example, a message digest value obtained by applying a publicly-known hash function, such as MD5 or SHA-512, to the image data can be used as the unique information. The message digest value of the image data may be obtained by computing a desired image region as stream data.

The annotation processing unit 502 merges the generated unique information with the rank assigned by the rating unit 501, and generates the supplementary information for the image file that contains the RAW data. The annotation processing unit 502 sequentially appends the supplementary information of the image file to files to be searched, which are recorded in the storage device 160, for example.

In a single file to be searched, the message digest value and the rank of each piece of display image data corresponding to the RAW data are recorded, as the supplementary information, for each image file recorded in the non-development mode. Additionally, recording and updating status information of the image data (undeveloped, developed, deleted, and so on) in association with the message digest values makes it easier to recover from suspended processing, to inform the user of the file status, and so on. The supplementary information may be deleted after the development processing for the corresponding image data is complete.

An image file recorded in the non-development mode also contains the message digest value of the stored image data (RAW data and/or display image data). The message digest value can be stored in any location, such as the header or the end of the image file. The ranks assigned to the RAW data through the auto-rating processing are recorded in the files to be searched in association with the message digest values, and therefore may or may not be included in the image file.

When the shooting instruction in the non-development mode is input through the shutter button 102 rather than being input from an external device via the communication unit 109, the main engine 140 is not used during shooting and recording operations in the non-development mode. As such, the system control unit 132 may control the isolator 162 to cut off the second power supply domain 221 side, and stop the power supply control unit 107 from supplying power to the second power supply domain 221. Even when a shooting instruction is input from an external device, the main engine 140 will not access the storage device 160, and thus the isolator 162 is controlled to cut off the second power supply domain 221.

When shooting and recording is started in the non-development mode, the system control unit 132 displays, in the display unit 101 and/or the EVF 108, information indicating that an image file, which contains RAW data not subjected to the development processing, is present in the storage device 160. This information may be an icon, a number, or the like, for example. The number of image files present in the storage device 160 that contain RAW data not yet subjected to the development processing (i.e., undeveloped) can be recorded in the storage device 160 and managed by the system control unit 132, for example.

FIGS. 10A and 10B illustrate examples of the display of the assist information in the EVF 108. FIG. 10A illustrates an example of the display of the assist information in the EVF 108 as a whole. FIG. 10B illustrates an example of icons indicating the number of image files present in the storage device 160 that contain RAW data not yet subjected to the development processing (i.e., undeveloped). FIG. 10B is an enlargement of part of FIG. 10A.

In the examples illustrated in FIGS. 10A and 10B, the assist information is displayed in a region on a black frame surrounding a live view image display region 1001. However, at least part of the assist information may be displayed superimposed on the live view image region.

As illustrated in FIG. 10B, the icons indicating the number of image files present in the storage device 160 that contain RAW data not yet subjected to the development processing (i.e., undeveloped) include a folder icon 1002 and a number icon 1003. "Dev", indicating "development", is displayed by the folder icon 1002, and together with a value "999" indicated by the number icon 1003, indicates that there are 999 undeveloped RAW image files in the storage device 160.

Figure 11:
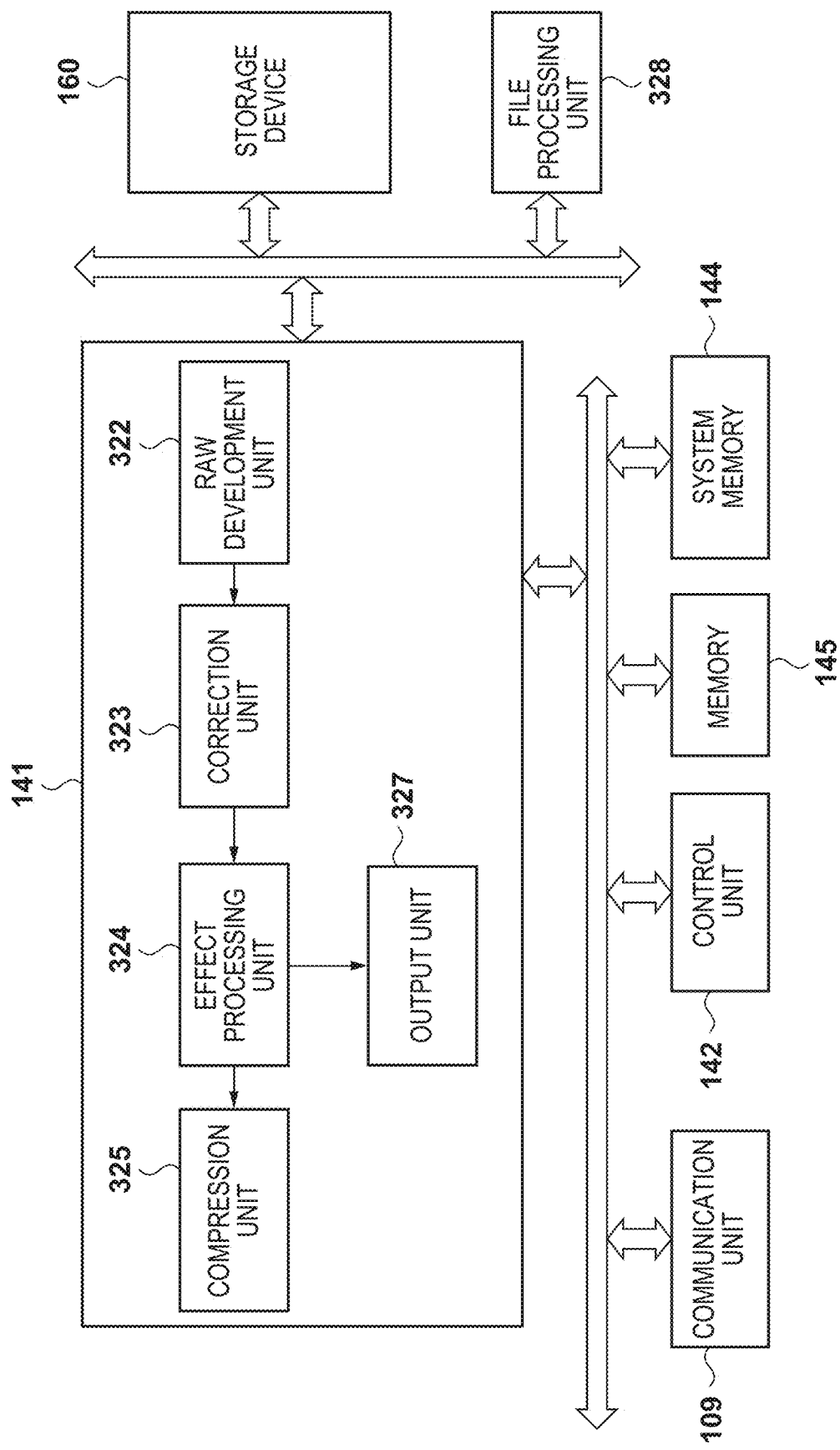
FIG. 11 is a block diagram illustrating an example of the functional configuration of the main engine according to an embodiment.

FIG. 11 is a block diagram illustrating an example of the functional configuration of the main engine 140 when the digital camera 100 operates in the development mode. In FIG. 11, function blocks already described are given the same reference signs as in FIGS. 6A and 6B. Development processing for a RAW image file determined to be developed will be described here.

When operating in the development mode, the digital camera 100 applies the development processing to a RAW image file, among RAW image files recorded in the storage device 160 during operation in the non-development mode, that is to be developed. The digital camera 100 then records the image file containing the image data subjected to the development processing into the storage device 160.

The operations of the digital camera 100 in the development mode are controlled by the control unit 142 of the main engine 140 loading a program stored in the system memory 144 into the memory 145 and executing the program.

Note that in the development mode, the electrical connection between the isolator 161 of the storage device 160 and the front engine 130 is cut off. This control of the isolator 161 may be performed by the system control unit 132.

The control unit 142 reads out the RAW image file to be developed from the storage device 160 through the file processing unit 328 and supplies that RAW image file to the image processing circuit 141.

The RAW development unit 322 extracts the RAW data stored in the RAW image file and applies the development processing to the RAW data in the same manner as when in the still image mode. Note that the extraction of the RAW data from the RAW image file may be performed by the file processing unit 328.

The correction unit 323 executes the same correction processing as that executed in the still image mode on the image data subjected to the development processing. Note that when displaying a development processing result in the development mode, the correction unit 323 generates the display image data on the basis of the corrected image data.

The development mode is an operation mode for the purpose of developing a large amount of RAW data at once, and there is therefore little need to display the development result for confirmation. Displaying the result will also consume power. As such, it is acceptable to avoid displaying the development result in the development mode, make it possible to set whether or not to display the result, and so on.

For example, when operating in the development mode due to the power switch 103 being operated, as in the example illustrated in FIG. 5B, the configuration can be such that the development result image is not displayed. Note that even when the development result image is not displayed, the notifying unit 123 may make a notification.

The effect processing unit 324 applies the effect processing to the corrected image data and outputs the resulting data to the output unit 327. Note that when the correction unit 323 generates the display image data, recording image data to which the effect processing has been applied by the effect processing unit 324 may be processed by the correction unit 323 to generate the display image data. Alternatively, the effect processing unit 324 may generate the display image data from recording image data to which the effect processing has been applied. Whether or not to apply the effect processing to the image data output to the compression unit 325 may be configured to be selectable or not selectable.

The order in which the above-described development processing by the RAW development unit 322, the correction processing by the correction unit 323, and the effect processing by the effect processing unit 324 are applied can be changed as appropriate.

The compression unit 325 applies the same data compression processing as in the still image mode to the recording image data to which the development processing, the correction processing, and, if necessary, the effect processing have been applied.

A recording unit 326 of the recording/playback unit 143 records a data file, which contains the coded image data generated by the compression unit 325, in the recording medium 200. Note that the RAW image file for which the development processing is complete may be deleted in order to free up space in the storage device 160. The configuration may be such that whether or not to delete RAW image files for which the development processing is complete in the development mode is set by the user.

Note that the digital camera 100 may accept a request to execute the development mode from an external device via the communication unit 109. When executing the development mode in response to a request from the external device, non-image data, such as a number of files for which the development processing is complete, may be transmitted instead of transmitting the display image data to the external device. This makes it possible to focus the resources of the digital camera 100 on the development processing.

Additionally, a certain number of reduced images may be transferred to an external device via the communication unit 109 before starting the development processing or after the development processing is complete. If this is performed before starting the development processing, the display image data generated by the LV correction unit 307 is transferred to the external device, whereas if this is performed after the development processing is complete, the display image data generated by the correction unit 323 (or a reduced image thereof) is transferred to the external device.

The external device can display the received reduced images as thumbnails, and select the image file to be developed, if before starting the development processing, or select the post-development processing image file to be downloaded from the digital camera 100, if after the development processing is complete.

When transmitting image data to the external device, if the properties of a display device of the external device are already known, the output unit 327 can apply gamma correction, white balance correction, color gamut correction, and the like to the image data in accordance with the properties of the display device of the external device.

When the system control unit 132 detects the power switch 103 being operated while in the development mode, the control unit 142 is notified. The control unit 142 refers to a management status (described later), and if the status is "processing", the development processing is stopped or continued according to the "rating-based development during power off" setting indicated in FIG. 9B.

Specifically, if "rating-based development during power off" is set to "off", the control unit 142 suspends the development processing and transmits, to the power supply control unit 107, a request to shut down the second power supply domain 221. The suspended development processing can be redone using the RAW data recorded in the storage device 160. Accordingly, the development processing can be suspended by discarding intermediate files being processed. Note that the status of the image file containing the RAW data for which the development processing has been suspended is not changed, and the management status is updated to "suspended".

When "rating-based development during power off" is set to "on", the control unit 142 causes the image processing circuit 141 to continue applying the development processing to the image file to be developed, in accordance with the setting for rating-based development during power off, indicated in FIG. 5B. When the development processing is complete for all or the upper limit number of the image files to be developed, the control unit 142 transmits, to the power supply control unit 107, a request to shut down the second power supply domain 221. The control unit 142 updates the management status to "suspended" if undeveloped image files remain, and to "complete" if no undeveloped image files remain.

Overall operations of the digital camera 100 will be described next with reference to the flowcharts in FIGS. 12A and 12B. The operations described here are started in response to the power switch 103 of the digital camera 100 being turned from "off" to "on".

When the power switch 103 is turned from "off" to "on", the power supply control unit 107 supplies power to the first power supply domain 220 in the front engine 130. On the other hand, the power supply control unit 107 limits the supply of power to the main engine 140. Specifically, the power supply control unit 107 does not supply power to the second power supply domain 221.

Additionally, the power supply control unit 107 also starts the supply of power to the third power supply domain 222 along with the supply of power to the first power supply domain 220. The power supply control unit 107 also controls the isolator 161 to establish an electrical connection with the front engine 130, and controls the isolator 162 to cut off the electrical connection with the main engine 140.

The control of establishing and cutting off the electrical connections between the isolator 161 and the front engine 130, and isolator 162 and the main engine 140, is assumed to be carried out through startup processing and shutdown processing of the main engine 140. This may be performed when switching the operation mode of the digital camera 100, however.

In step S1001, the system control unit 132 of the front engine 130 reads out a startup program and parameters from the system memory 133, and executes front engine (FE) startup processing.

In step S1002, the system control unit 132 refers to setting data stored in the system memory 133, and determines whether or not the external output function of the digital camera 100 is set to be enabled. The external output function is a function for outputting the display image data, for example, to an external device via the communication unit 109. The user may be able to change settings pertaining to the external output function through the menu screen. It is assumed that the external output function is disabled in an initial state.

FIGS. 13A and 13B illustrate examples of an external output function setting screen displayed in the display unit 101. Here, HDMI is used as the interface for connecting to the external device, and thus the external output is HDMI output. FIG. 13A illustrates an "off" state, in which the HDMI output is set to be disabled, and FIG. 13B illustrates an "on" state, in which the HDMI output is set to be enabled. The user can change the setting for HDMI output by operating the operation unit 110 (e.g., the directional key 114 and the set button 115).

Step S1020 is executed when the system control unit 132 determines in step S1002 that the external output function is set to be enabled, and step S1003 is executed when the system control unit 132 does not determine that the external output function is set to be enabled. In the present specification, if a condition B is always satisfied when a condition A is not satisfied, a determination that the condition A is not satisfied may be replaced by a determination that the condition B is satisfied. For example, in step S1002, instead of determining that the condition "external output function set to be enabled" is not satisfied, the condition "external output function set to be disabled" may be determined to be satisfied.

In step S1003, the system control unit 132 refers to setting data stored in the system memory 133 (or read out from the memory 134), and determines whether the operation mode of the digital camera 100 is an operation mode for shooting, or is a different operation mode. Alternatively, the system control unit 132 may make this determination on the basis of an operation mode set using the mode change switch 121. Operation modes for shooting include the still image shooting mode and the non-development mode. Other operation modes include the development mode and the playback mode.

The system control unit 132 executes step S1006 when it is determined that the operation mode of the digital camera 100 is a mode for shooting, and executes step S1016 when it is not determined that the operation mode of the digital camera 100 is a mode for shooting. Although a case where the operation mode for shooting is an operation mode for shooting a still image will be described here, an operation mode for shooting a moving image may be included as well.

In step S1006, the system control unit 132 confirms that the lens 151 is in an in-focus state. It is assumed here that autofocus is set. Step S1006 may be skipped if manual focus is set.

Focus control through autofocus is executed in LV processing, performed in step S1004. Here, when the in-focus state is used as a condition for executing still image shooting, it is determined whether or not the condition for executing still image shooting is satisfied at the point in time of step S1006. The system control unit 132 executes step S1008 when it is determined that the lens 151 is in the in-focus state, and executes step S1004 when it is not determined that the lens 151 is in the in-focus state.

In step S1008, the system control unit 132 determines whether or not a shooting instruction has been input, executes step S1009 when it is determined that a shooting instruction has been input, and executes step S1004 when it is not determined that a shooting instruction has been input.

In step S1004, the system control unit 132 executes the live view processing. The live view processing is processing in which the sensor unit 106 continuously shoots a moving image and displays the obtained moving image.

Figure 14:
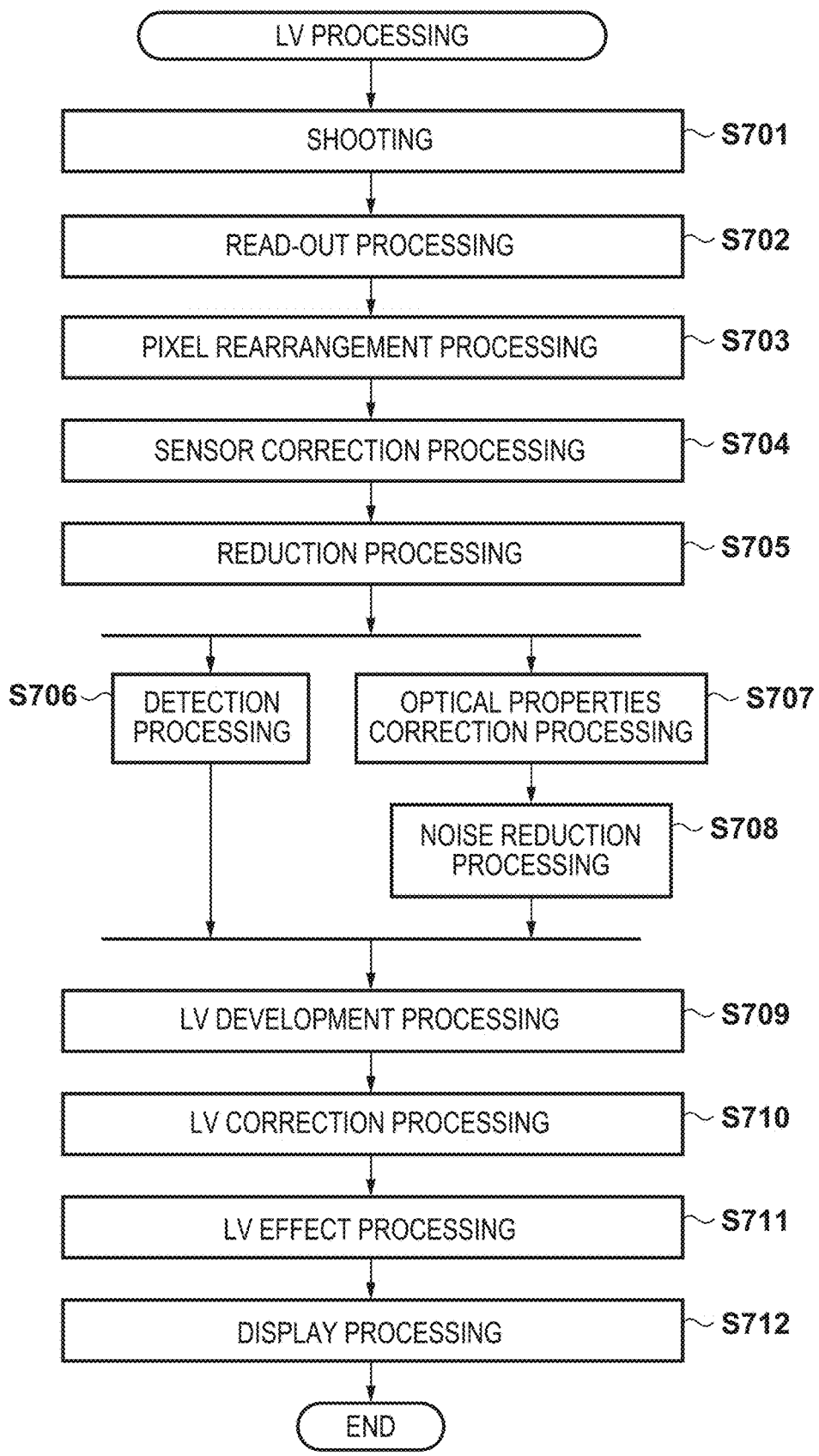
FIG. 14 is a flowchart illustrating live view processing according to the first embodiment.

FIG. 14 is a flowchart illustrating details of the live view processing in step S1004. One frame's worth of live view processing will be described here.

In step S701, the system control unit 132 controls the lens unit 150 to form an optical image on an image forming surface of the image sensor. The system control unit 132 also controls the sensor unit 106 to perform charge accumulation operations for converting the optical image into a group of electrical signals. It is assumed here that there is no mechanical shutter and that shooting is performed using what is known as an electronic shutter.

The system control unit 132 may start the charge accumulation operations of the sensor unit 106 after executing AF processing and controlling the position of the focusing lens of the lens 151. For example, if the LV processing is performed while a shooting preparation instruction is being input, the system control unit 132 can control the position of the focusing lens using a result of the AF processing executed in the shooting preparation operations. In this case, the AF may be one-shot AF, which fixes the position of the focusing lens adjusted one time, or servo AF, which continuously adjusts the position of the focusing lens while the shooting preparation instruction is being input. Alternatively, the AF may be continuous AF, which adjusts the position of the focusing lens to continually focus on a predetermined part of the shooting range, even when the shooting preparation instruction is not being input.

The LV image is displayed regardless of whether or not the lens is in the in-focus state. If the image sensor is configured to support image plane phase-detection AF, the defocus amount may be calculated by processing the RAW data using the parallax pixel processing unit 315 and supplying the resulting data to the system control unit 132. The system control unit 132 can control the position of the focusing lens by converting the defocus amount into a drive amount and a drive direction of the focusing lens.

In step S702, the system control unit 132 executes processing for readout from the sensor unit 106. The readout can be performed, for example, in units of pixel lines. In the present embodiment, the image sensor includes an A/D converter, and thus RAW data in digital format is read out. The RAW data read out from the sensor unit 106 is supplied to the image processing circuit 131. To reduce the amount of processed data, pixel lines may be thinned out before readout, processing for adding data may be performed, and so on.

Steps S703 and on correspond to the processing of the first path of the image processing circuit 131 described with reference to FIGS. 6A and 6B, and will therefore be described only briefly hereinafter. In step S703, the pixel rearrangement unit 301 rearranges the RAW data input in raster scan order from the sensor unit 106 into a two-dimensional matrix so that the arrangement of pixel data corresponds to the pixel arrangement of the image sensor.

In step S704, the sensor correction unit 302 performs correction processing (sensor correction processing), based on the properties of the image sensor, on the RAW data.

In step S705, the RAW data (the resolution of the RAW data) is reduced and reduced RAW data is generated in order to efficiently perform the display image data generation processing, the detection processing, and the like.

The processing of step S706, and the processing of steps S707 and S708, are executed in parallel.

In step S706, the detection unit 310 applies predetermined processing to the reduced RAW data, calculates various evaluation values for shooting control, and notifies the system control unit 132 of the evaluation values. For example, the evaluation values are used for white balance adjustment by the LV development unit 306.

In step S707, the optical correction unit 304 applies image correction processing pertaining to the optical properties of the lens 151 and the like (optical correction processing) to the reduced RAW data.

In step S708, the noise suppression unit 305 applies noise reduction processing to the reduced RAW data output from the optical correction unit 304.

In step S709, the LV development unit 306 generates the display image data by applying development processing (LV development processing) to the reduced RAW data output from the noise suppression unit 305.

In step S710, the LV correction unit 307 applies correction processing such as distortion correction, enlargement processing, and reduction processing to the display image data.

In step S711, the LV effect processing unit 308 applies effect processing, which provides a predetermined display effect, to the corrected display image data.

In step S712, the display processing unit 309 displays the display image data output by the LV effect processing unit 308 in the display unit 101 and the EVF 108. This completes the LV processing for one frame.

Returning to FIG. 12A, in step S1009, the system control unit 132 determines whether or not the operation mode of the digital camera 100 is the non-development mode, executes step S1010 if the operation mode is determined to be the non-development mode, and executes step S1013 if the operation mode is not determined to be the non-development mode.

In step S1010, the system control unit 132 executes the non-development mode processing. The non-development mode is an operation mode that implements continuous high-speed continuous shooting by recording the RAW data obtained from shooting into the storage device 160 without applying any development processing. The development processing for RAW data recorded in the storage device 160 in the non-development mode is applied when the digital camera 100 operates in the development mode.

Figure 15A:
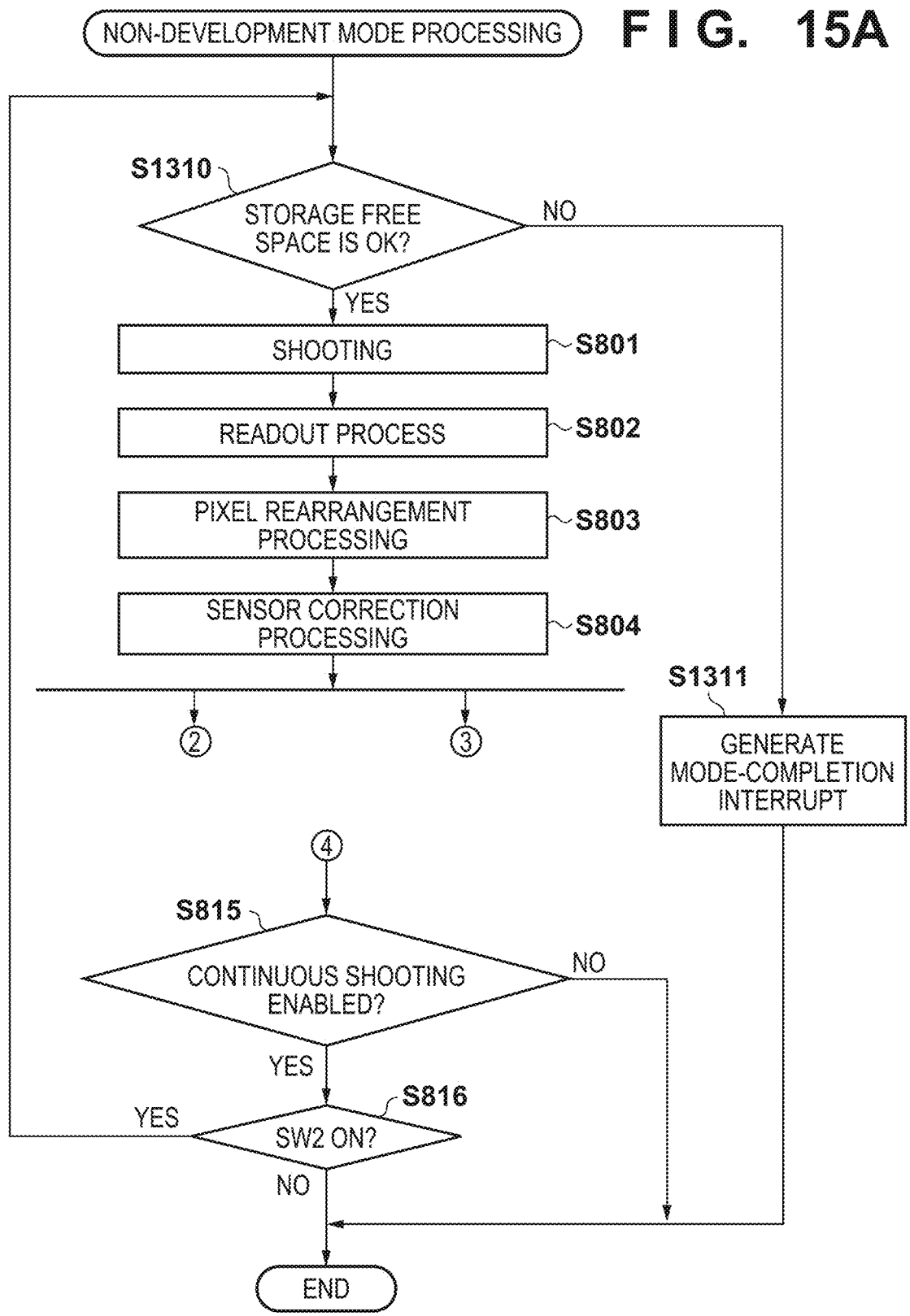
FIGS. 15A and 15B are flowcharts illustrating non-development mode processing according to the first embodiment.
Figure 15B:
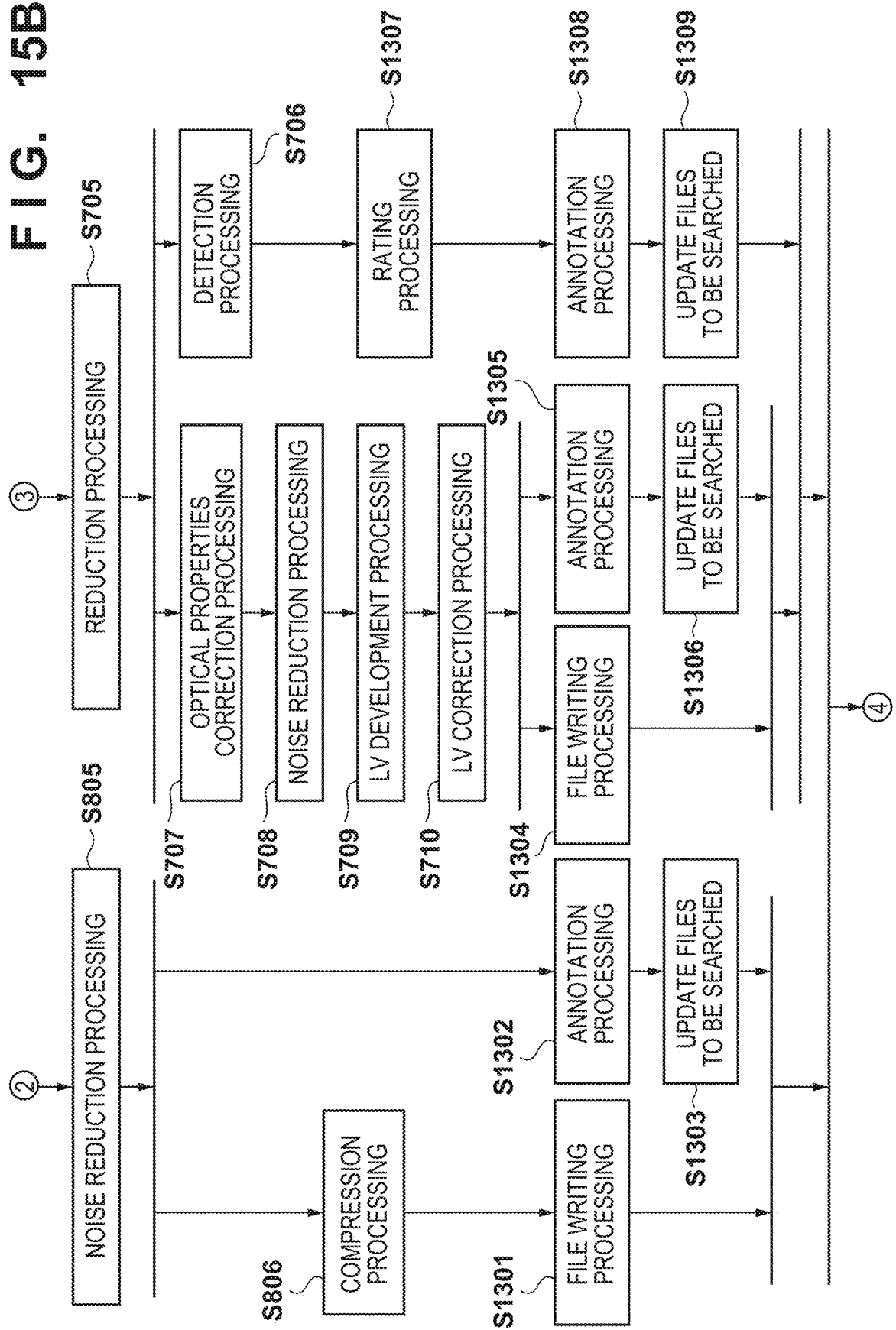

FIGS. 15A and 15B are flowcharts illustrating details of the non-development mode processing executed in step S1010.

In step S1310, the system control unit 132 determines whether or not there is sufficient free space in the storage device 160. Specifically, the system control unit 132 obtains free space information of the storage device 160 from the file processing unit 314 and determines whether or not the free space is greater than or equal to a pre-set threshold. The system control unit 132 executes step S801 if the free space in the storage device 160 is determined to be greater than or equal to the threshold, and executes step S1311 if the free space of the storage device 160 is not determined to be greater than or equal to the threshold.

In step S1311, the system control unit 132 generates a non-development mode completion interrupt and terminates the non-development mode processing.

In step S801, the system control unit 132 controls the operations of the lens 151 and the sensor unit 106 for shooting. If the AF mode is one-shot AF, the position of the focusing lens is fixed to the position resulting from the adjustment in the shooting preparation operations. The system control unit 132 determines the exposure conditions, such as aperture value and shutter speed (charge accumulation time), on the basis of the evaluation values obtained by the detection unit in the immediately-preceding LV processing, and controls the aperture stop 152 according to the determined exposure conditions. The system control unit 132 executes shooting using the electronic shutter by starting the charge accumulation of the sensor unit 106 and finishes the charge accumulation according to the determined exposure conditions.

In step S802, the system control unit 132 executes processing for readout from the sensor unit 106. As a result, RAW data is supplied from the sensor unit 106 to the image processing circuit 131 in units of pixel lines, for example.

In step S803, the pixel rearrangement unit 301 rearranges the RAW data input in raster scan order from the sensor unit 106 into a two-dimensional matrix so that the arrangement of pixel data corresponds to the pixel arrangement of the image sensor.

In step S804, the sensor correction unit 302 performs correction processing (sensor correction processing), based on the properties of the image sensor, on the RAW data. The RAW data output by the sensor correction unit 302 is processed in parallel with the processing from step S705 on, which is the display image data generation and detection processing (the first path), and the processing from step S805 on, which is for generating the recording image data (the second path), as described with reference to FIGS. 6A and 6B.

The processing of the second path will be described first.

In step S805, the RAW noise suppression unit 311 applies noise reduction processing to the RAW data processed by the sensor correction unit 302.

The processing from steps S806 to S1301 and the processing from steps S1302 to S1303 are performed in parallel.

In step S806, the compression unit 312 applies compression processing to the RAW data output by the RAW noise suppression unit 311.

In step S1301, the file processing unit 314 records the image file containing the RAW data output by the compression unit 312 (the RAW image file) into the storage device 160. A FAT (File Allocation Table) in the storage device 160 is updated as a result.

In step S1302, the annotation processing unit 502 generates a message digest as an annotation of the image data by applying a hash function to the RAW data output by the RAW noise suppression unit 311.

In step S1303, the annotation processing unit 502 adds the generated message digest to the RAW image file, and adds the file to the files to be searched.

The first path will be described next.

The processing of steps S705 to S710 is the same as the processing described with reference to FIG. 14 and will therefore not be described. However, rather than the display image data, the reduced image data of a still image for recording is generated in step S709 and processed in step S710. Additionally, although not described here, steps S711 and S712 may be executed after step S710 if LV display is to be performed.

After step S710, the processing of S1304, and the processing of steps S1305 and S1306, are performed in parallel.

In step S1304, the file processing unit 314 records, into the storage device 160, the image file containing the reduced image data output by the LV correction unit 307 (the reduced image file). The FAT in the storage device 160 is updated as a result.

In step S1305, the annotation processing unit 502 generates a message digest by applying a hash function to the reduced image data output by the LV correction unit 307.

In step S1306, the annotation processing unit 502 adds the generated message digest to the reduced image file, and adds the file to the files to be searched.

The processing from step S706 on (a rating path) will be described next.

In step S706, the detection unit 310 applies predetermined processing to the reduced RAW data, calculates various evaluation values for shooting control, and notifies the system control unit 132 and the rating unit 501 of the evaluation values.

In step S1307, the rating unit 501 applies rating processing (auto-rating) to the RAW data using the evaluation values calculated by the detection unit 310. A rank is assigned to the RAW data as a result.

In step S1308, the annotation processing unit 502 associates the result of the rating processing (the rank) with the message digest (annotation) generated in steps S1302 and S1305. This makes it possible to identify which RAW data the rating result is for.

In step S1309, the annotation processing unit 502 associates the rating result with the corresponding message digest and adds those items to the files to be searched. At this time, the rating result may be added to the corresponding RAW image file and reduced image file by the file processing unit 314. The rating result may be added to the header or the end of the image file.

In step S815, the system control unit 132 determines whether or not the continuous shooting function is enabled. Whether the continuous shooting function is enabled or disabled can be set by the user through the menu screen. The system control unit 132 executes step S816 when the continuous shooting function is determined to be enabled, and ends the non-development mode processing when the continuous shooting function is not determined to be enabled.

In step S816, the system control unit 132 determines whether or not the switch SW2 is on, i.e., whether or not a state in which the shutter button 102 is being kept fully depressed. The system control unit 132 repeats the processing from step S1310 when it is determined that switch SW2 is on. However, the system control unit 132 ends the non-development mode processing if it is not determined that the switch SW2 is on.

If, rather than one-shot AF, AF operations are to be executed even during continuous shooting, the defocus amount calculation processing by the parallax pixel processing unit 315 may be executed in parallel with the processing from step S805 on and the processing from step S705 on. Alternatively, the focusing lens may be driven in accordance with in a contrast evaluation value obtained by the detection unit 310.

The main engine 140 is not used during the non-development mode processing, and thus the supply of power to the second power supply domain 221 may be stopped. In this case, the power supply control unit 107 cuts off the electrical connection between the isolator 162 and the second power supply domain 221 in response to an instruction from the system control unit 132.

Returning to FIG. 12A, when the mode is not determined to be the non-development mode in step S1009, the mode is, in the present embodiment, the still image shooting mode. In this case, the system control unit 132 executes step S1013.

In step S1013, the system control unit 132 executes the startup processing of the main engine 140. The system control unit 132 instructs the power supply control unit 107 to start the supply of power to the main engine 140 (the second power supply domain 221). In response, the power supply control unit 107 starts the supply of power so that the main engine 140 changes from the restricted state to the normal state. Additionally, the system control unit 132 causes the control unit 142 to execute startup operations of the main engine 140. The startup operations will be described in detail later with reference to FIG. 21A.

The system control unit 132 causes the power supply control unit 107 to cut off the electrical connection between the isolator 161 and the first power supply domain 220, and establish an electrical connection between the isolator 162 and the second power supply domain 221. As a result, of the front engine 130 and the main engine 140, the main engine 140 can access the storage device 160.

When the startup processing of the main engine 140 is complete, the shooting/recording processing is executed in step S1014. The shooting/recording processing is a series of processes in which the main engine 140 applies the development processing to RAW data obtained from the sensor unit 106 through still image shooting and records the data into a recording medium. The post-development processing recording image data may be recorded into the storage device 160 in the same manner as in the non-development mode, but is assumed here to be recorded into the recording medium 200.

Figure 16A:
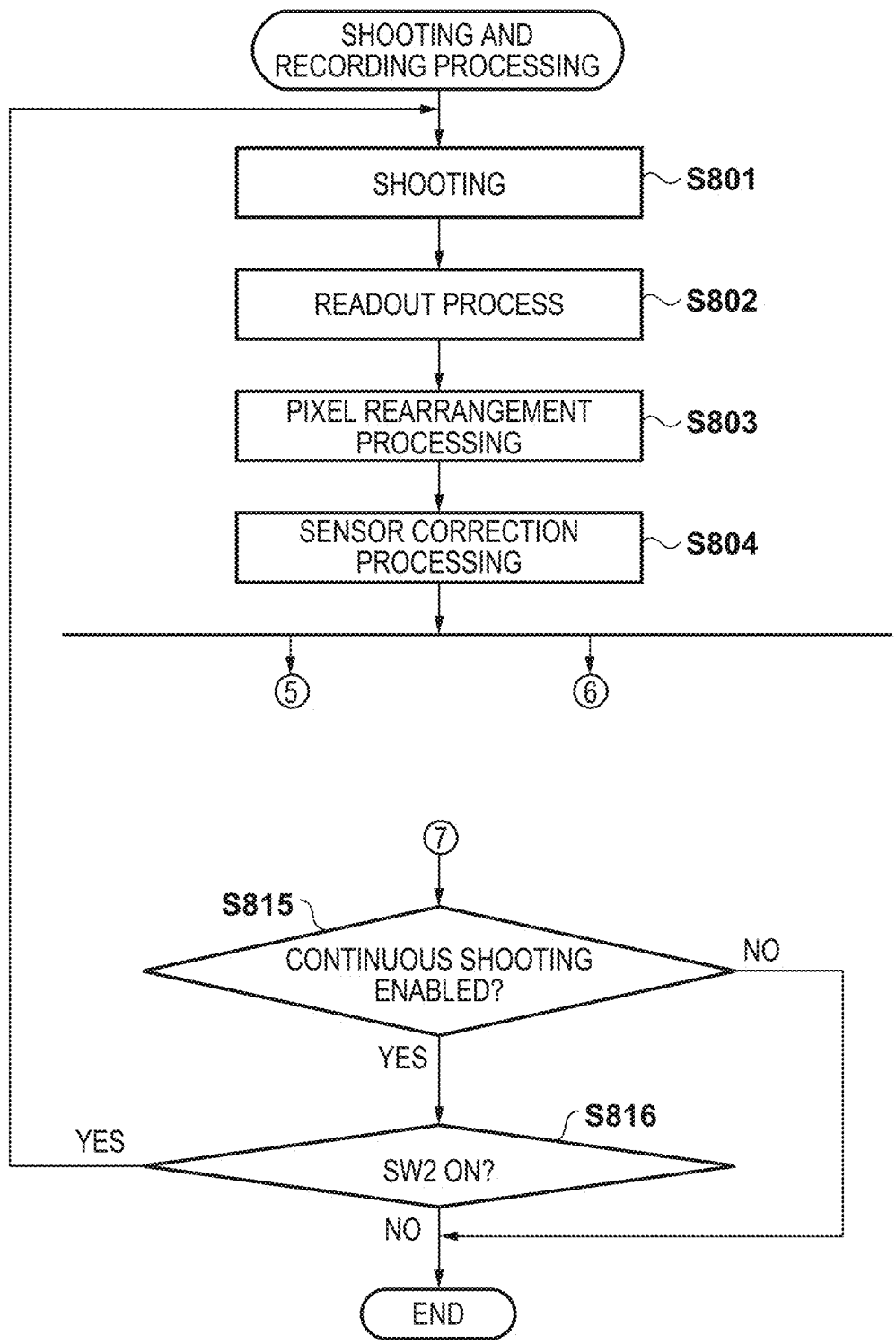
FIGS. 16A and 16B are flowcharts illustrating shooting/recording processing according to the first embodiment.
Figure 16B:
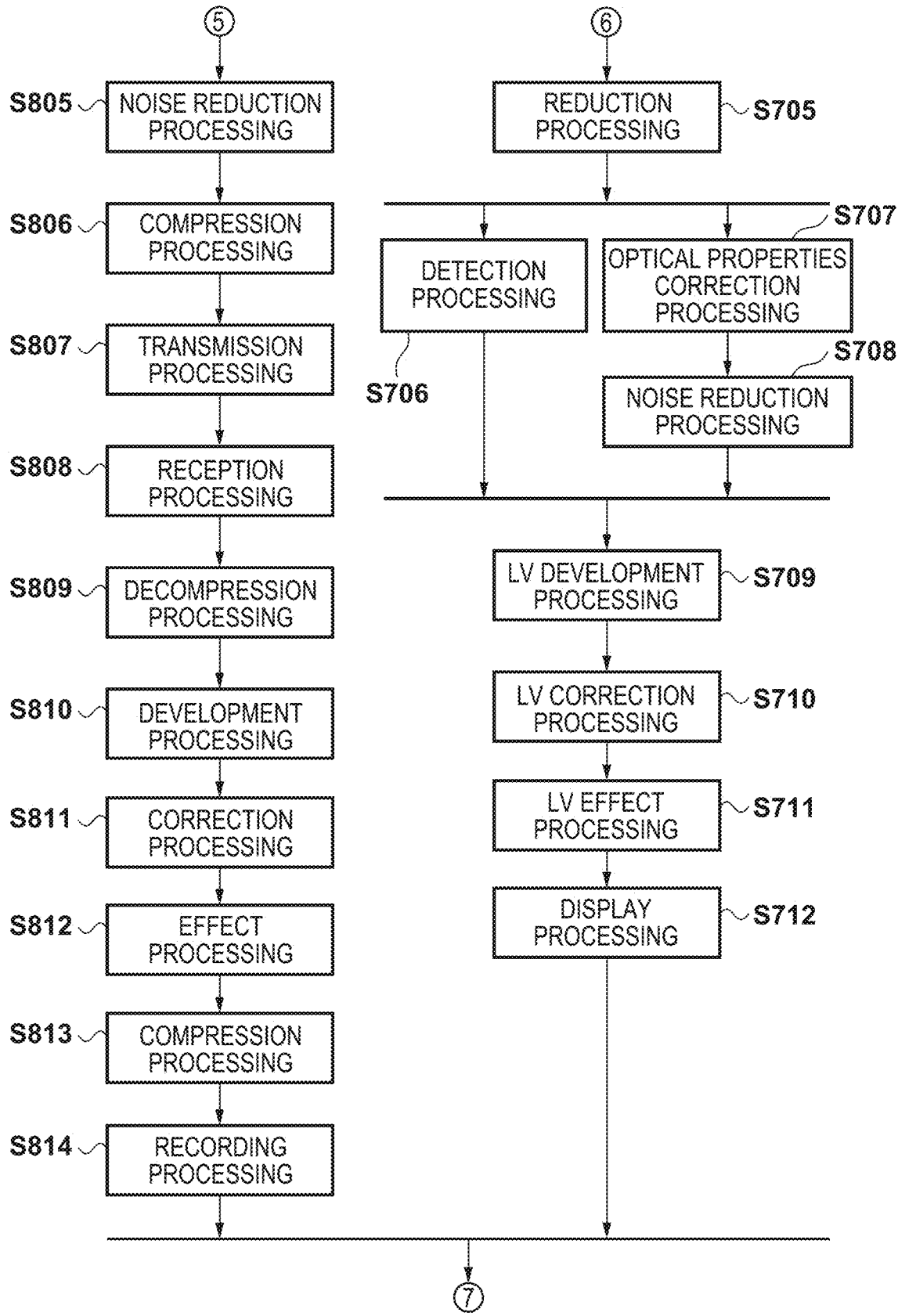

The shooting/recording processing of step S1014 will be described in detail with reference to the flowcharts in FIGS. 16A and 16B. In FIGS. 16A and 16B, the same reference signs are used for processes that are the same as in the live view processing in FIG. 14 and processes that are the same as in the non-development mode processing in FIGS. 15A and 15B.

Steps S801 to S804 are the same processes as in the non-development mode, and will therefore not be described.

In step S804, the RAW data output by the sensor correction unit 302 is processed in parallel through the processing from step S705 on, i.e., for the display image data generation and detection processing (the first path), and the processing from step S805 on, i.e., for the recording image data generation (the second path).

Note that moving images for LV display cannot be shot while still images are being shot. As such, the present embodiment assumes that the RAW data of still images shot for recording are used to generate the display image data. Any publicly-known method can be used for LV display during the period when moving images for LV display cannot be shot. For example, the previous frame may be displayed repeatedly. A reduced image of the recording image data may also be used as the LV image as well.

The processing of the second path will be described first.

In step S805, the RAW noise suppression unit 311 applies noise reduction processing to the RAW data processed by the sensor correction unit 302.

In step S806, the compression unit 312 applies data compression (coding) processing to the RAW data output by the RAW noise suppression unit 311.

In step S807, the transmission unit 313 transmits the compressed RAW data to the reception unit 321 of the main engine 140.

In step S808, the reception unit 321 receives the compressed RAW data transmitted from the transmission unit 313.

In step S809, the reception unit 321 receives the compressed RAW data from the transmission unit 313 and decompresses the RAW data.

In step S810, the RAW development unit 322 generates the recording image data by applying the development processing to the decompressed RAW data.

In step S811, the correction unit 323 executes correction processing such as distortion correction, enlargement processing, reduction processing, noise suppression processing, and the like on the recording image data.

In step S812, the effect processing unit 324 applies effect processing (black and white conversion, color adjustment, and the like) as necessary to the corrected recording image data to obtain a predetermined display effect, and outputs the resulting data to the compression unit 325 and the output unit 327.

In step S813, the compression unit 325 applies the compression processing to the recording image data output from the effect processing unit 324.

In step S814, the recording unit 326 of the recording/playback unit 143 records the image file containing the compressed recording image data into the recording medium 200.

The processing of the first path will be described.

The processing of steps S705 to S712 is the same as the processing described with reference to FIG. 14 and will therefore not be described. However, rather than the display image data, the reduced image data of a still image for recording is generated in step S709 and processed in steps S710 and S711.

The processing of steps S815 and S816 is the same as the processing described with reference to FIG. 15A and will therefore not be described.

In the flowchart shown in FIGS. 16A and 16B, the main engine 140 records the recording image data, generated by applying decompression (decoding) processing and development processing to the compressed RAW data received from the front engine 130, into the recording medium 200. However, the main engine 140 may record the compressed RAW data into the recording medium 200. In this case, the series of processes from steps S809 to S813 is not executed. Then, the recording unit 326 of the recording/playback unit 143 records the image file containing the compressed RAW data into the recording medium 200.

Note that the main engine 140 may record the image file into the storage device 160. In this case, the system control unit 132 controls the isolators 161 and 162 through the power supply control unit 107 so that the storage device 160 establishes an electrical connection with the main engine 140 and cuts off the electrical connection with the front engine 130.

Returning to FIG. 12A, in step S1015, the system control unit 132 instructs the control unit 142 of the main engine 140 to execute the shutdown processing of the main engine 140. The system control unit 132 then controls the power supply control unit 107 and instructs the supply of power to the second power supply domain 221 to stop. The main engine shutdown processing will be described in detail later with reference to FIG. 21B.

In step S1011, the system control unit 132 determines whether or not the operation of the operation unit 110 has not been detected for a set amount of time. When it is determined that the operation of the operation unit 110 has not been detected for the set amount of time, the system control unit 132 handles the operations as the input of an instruction to terminate camera operations. Note that the operation of turning the power switch 103 off is assumed to be handled as interrupt processing separate from the series of processes illustrated in FIG. 12A.

The system control unit 132 executes step S1012 when it is determined that the operation of the operation unit 110 has not been detected for the set amount of time, and executes step S1002 when it is not determined that the operation of the operation unit 110 has not been detected for the set amount of time.

In step S1012, the system control unit 132 executes the shutdown processing for the front engine 130. The shutdown processing is also executed for other units of the digital camera 100. This stops the overall operations of the digital camera 100.

On the other hand, when it is determined in step S1003 that the operation mode is not a mode for shooting (in the present embodiment, the development mode or the playback mode), the system control unit 132 executes step S1016.

In step S1016, the system control unit 132 executes the startup processing of the main engine 140, in the same manner as in step S1013.

In step S1017, the system control unit 132 determines whether or not the current operation mode is the development mode, executes step S1018 when it is determined that the current mode is the development mode, and executes step S1019 when it is determined that the current mode is the development mode.

Figure 17A:
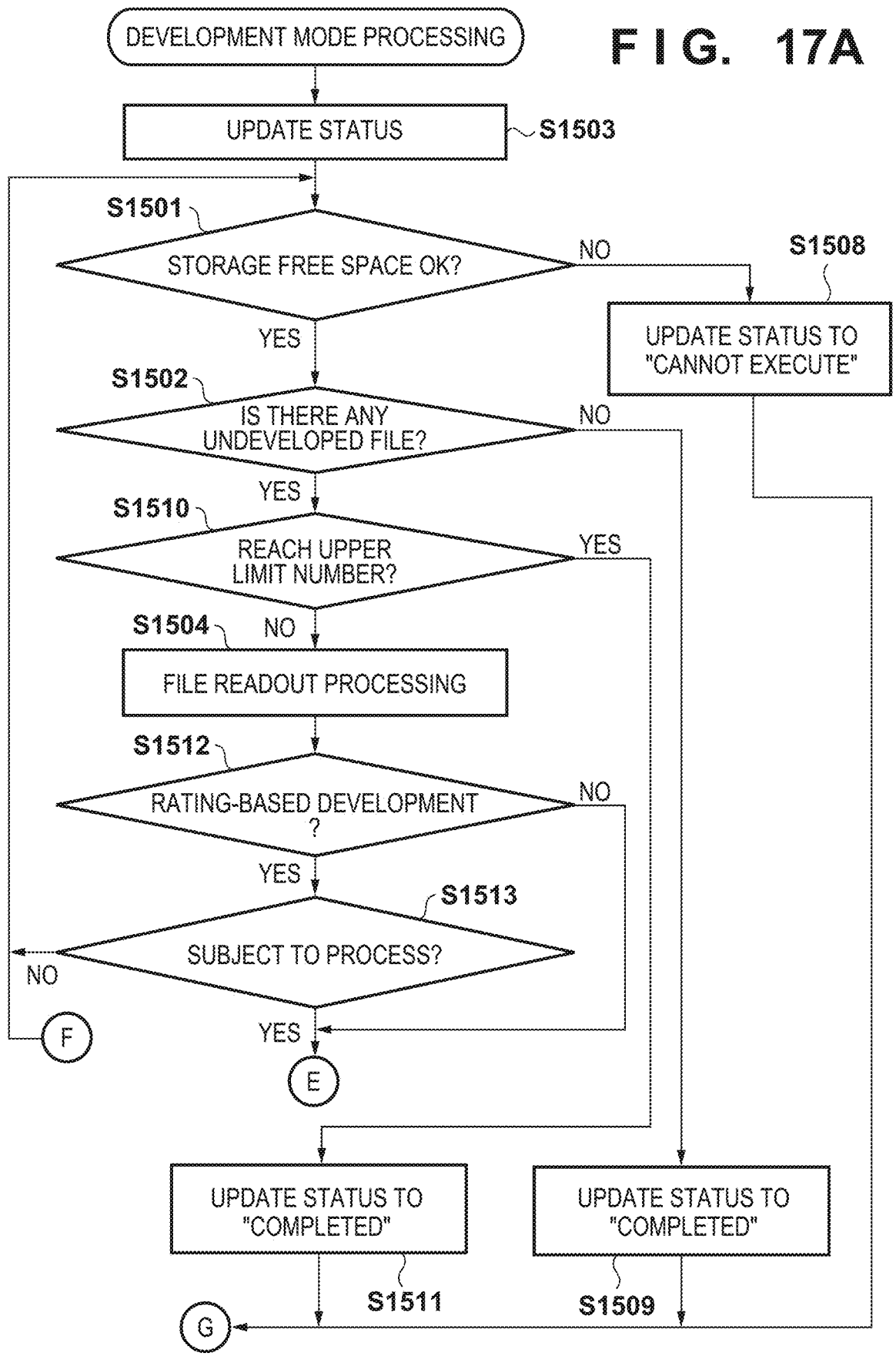
FIGS. 17A and 17B are flowcharts illustrating-based development mode processing according to the first embodiment.
Figure 17B:
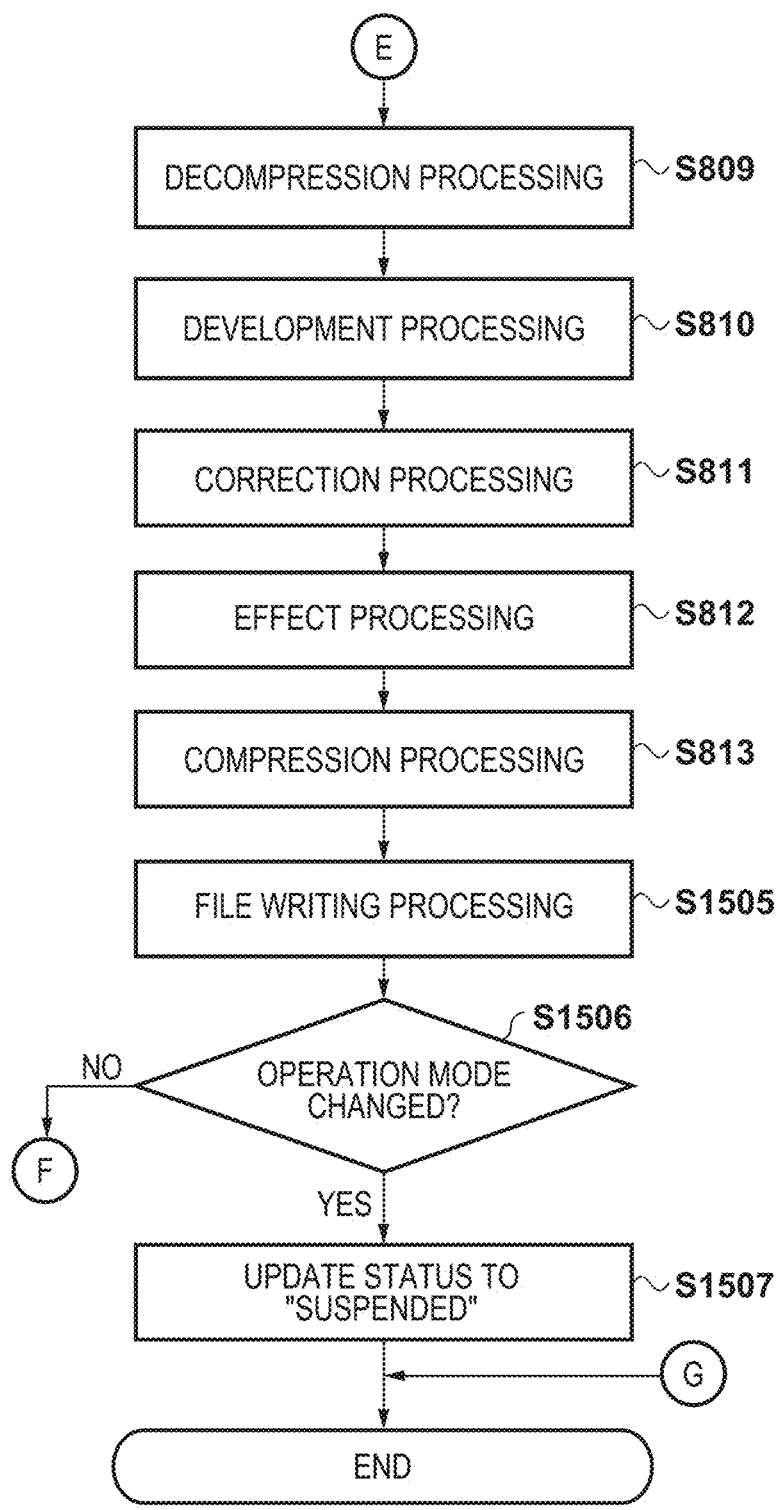

The development mode processing in step S1018 will be described in detail with reference to the flowchart in FIGS. 17A and 17B.

The development mode is an operation mode that automatically applies development processing to RAW data recorded into the storage device 160 in the non-development mode. It is assumed here that the image data obtained through the development processing is recorded into the storage device 160. Access of the storage device 160 by the main engine 140 is performed by the file processing unit 328, under the control of the control unit 142. In the development mode, the storage device 160 is controlled to establish an electrical connection with the main engine 140 and to cut off an electrical connection with the front engine 130.

In step S1503, the control unit 142 updates the management status to "processing". The management status is information for the control unit 142 to manage the progress of the development mode processing, and may be a value stored in non-volatile memory of the system memory 144, for example. Alternatively, the management status may be held in the storage device 160. The management status is used in processing routines such as interrupt handlers. For example, when the power switch 103 is turned off, the management status is used to determine whether or not it is necessary to execute the "rating-based development during power off" (see FIG. 9B).

In step S1501, the control unit 142 confirms whether the free space in the storage device 160 is sufficient, in the same manner as in step S1310 of the non-development mode processing. Specifically, the control unit 142 executes step S1502 if the free space in the storage device 160 is determined to be greater than or equal to a threshold, and executes step S1508 if the free space in the storage device 160 is not determined to be greater than or equal to the threshold. The threshold for the free space used here may be lower than the threshold used in step S1310.

In step S1502, the control unit 142 determines whether or not an image file containing RAW data not yet subjected to the development processing (an undeveloped file) is present in the storage device 160. The control unit 142 executes step S1510 if it is determined that there is an undeveloped file, and executes step S1509 if it is not determined that there is an undeveloped file.

In step S1510, the control unit 142 determines whether or not the number of undeveloped files to which the development processing has been applied in the current development mode operations has reached an upper limit number set in the setting screen illustrated in FIG. 9B. The control unit 142 executes step S1511 if it is determined that the number of undeveloped files to which the development processing has been applied has reached the upper limit number, and executes step S1504 if not. If the upper limit number has not been set, the control unit 142 executes step S1504.

In step S1504, the control unit 142 instructs the file processing unit 328 to read out one undeveloped file from the storage device 160. The file processing unit 328 reads out the undeveloped file from the storage device 160 in response to the instruction. The undeveloped file to be read out here can be determined on the basis of some kind of criteria. For example, the file may be the image file, among the undeveloped files, having the oldest (or newest) shooting date/time or recording date/time. The file processing unit 328 stores the data of the read-out file in the memory 145.

In step S1512, the control unit 142 determines whether or not rating-based development is enabled. Whether or not to perform rating-based development in the development mode is set, for example, through the setting screen illustrated in FIG. 9B. The control unit 142 executes step S1513 if it is determined that rating-based development is enabled, and executes step S809 if not.

In step S1513, the control unit 142 determines whether or not the image file read out from the storage device 160 matches the conditions for rating-based development (whether the file is to be developed). For example, the control unit 142 determines that the image is to be developed if the rank included in the image file is greater than or equal to the rank set as the lower limit rate for development. When the lower limit rate is set to 8 as in the setting screen illustrated in FIG. 9B, any undeveloped file with a rank of 8 or higher is to be developed.

The control unit 142 executes step S809 if the read-out image file is judged to be subject to development, and executes step S1501 if not.

The processing of steps S809 to S813 has already been explained will reference to FIG. 16B, and will therefore not be described again.

Note that in the correction processing of step S811, the still image data for recording may be reduced using the correction unit 323 to generate reduced image data.

In step S1505, the control unit 142 controls the file processing unit 328 to record, into the storage device 160, an image file containing the recording image data obtained by applying the development processing and an image file containing the reduced image data. The FAT information in the storage device 160 is updated as a result of this recording. Additionally, of the information, contained in the image files to be searched, that pertains to the RAW data to which the development processing has been applied, the control unit 142 updates the status information to "developed". The annotation (message digest) of the image file containing the original RAW data may be added to the image file containing the post-development processing image data. Adding the annotation makes it easier to search for the corresponding RAW file. When the recording of the file is completed, the remaining number of undeveloped files is decremented by one.

In step S1506, the control unit 142 determines whether or not an operation for switching from the development mode to another mode has been detected. The control unit 142 executes step S1507 if it is determined that the switching operation has been detected, and executes step S1501 again if not. An operation for turning the power switch 103 off is processed as an interrupt, and thus the operation of the power switch 103 is not taken into account in the process of step S1506.

In step S1507, the control unit 142 updates the management status to "suspended" and ends the development mode processing. Note that the RAW data for which the development processing has been suspended is recorded in the storage device 160. As such, there is no need to perform processing such as saving intermediate files, and the development mode processing may be ended immediately. The processing of steps S1506 and S1507 may therefore be interrupt processing.

In step S1508, the control unit 142 updates the management status to "cannot execute" and ends the development mode processing. Insufficient free space in the storage device 160 is communicated to the system control unit 132, and the system control unit 132 notifies the user by displaying a message in the display unit 101 or the like.

In step S1509, the control unit 142 updates the management status to "complete" and ends the development mode processing.

In step S1511, the control unit 142 updates the management status to "complete" and ends the development mode processing.

Note that the management status is not limited to the examples described here. The initial value of the management status may be "complete" as well. Note also that there may be undeveloped files even if the management status is "complete". Therefore, the remaining number of unprocessed files in order to notify the user of the presence of undeveloped files is to be confirmed.

In one embodiment, the system control unit 132 is to increase the number of undeveloped files when executing the non-development mode, and for the control unit 142 is to decreased the number of undeveloped files when executing the development mode. As such, it is convenient to record the number of undeveloped files in the storage device 160, which can be accessed by both control units.

Returning to FIG. 12A, if it is determined in step S1017 that the operation mode is the development mode, the system control unit 132 executes the playback mode processing in step S1019. The playback mode processing is processing for reading out developed image data recorded in the recording medium 200 or the storage device 160 and displaying that image data in the display unit 101 or the EVF 108.

Figure 18:
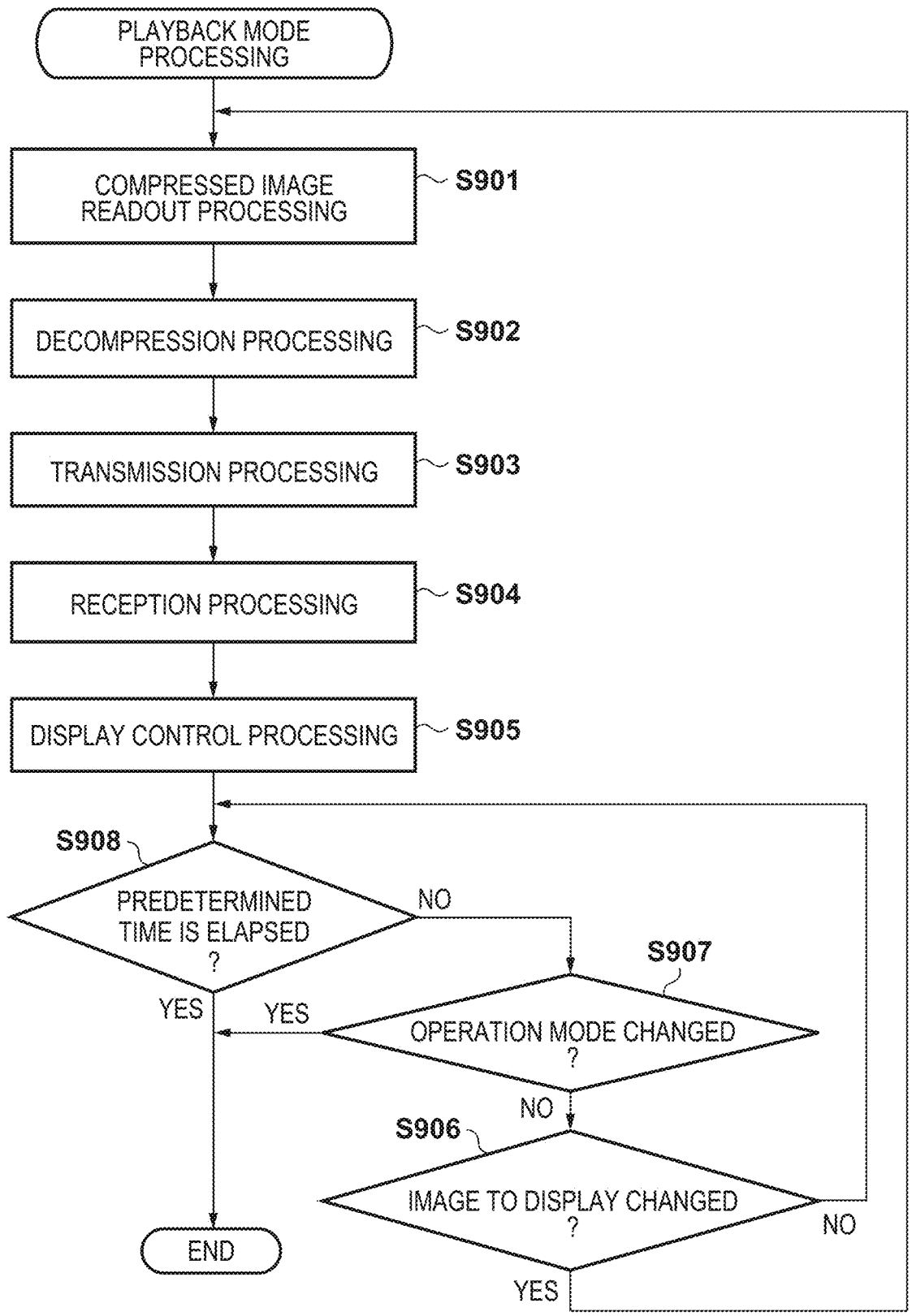
FIG. 18 is a flowchart illustrating playback mode processing according to the first embodiment.

The playback mode processing will be described in detail with reference to the flowchart in FIG. 18. It is assumed here that image data recorded in the recording medium 200 is displayed.

In step S901, the system control unit 132 instructs the recording/playback unit 143 to read out an image file from the recording medium 200. The image file read out here may be determined by the system control unit 132 according to a predetermined condition, for example. The readout unit 401 of the recording/playback unit 143 reads out the image file from the recording medium 200 in response to the instruction from the system control unit 132. The readout unit 401 extracts image data, which is both developed and compressed, from the image file, and outputs the image data to the image processing circuit 141.

In step S902, the decompression unit 402 of the image processing circuit 141 decompresses the input image data.

In step S903, the transmission unit 403 of the image processing circuit 141 transmits the decompressed image data to the image processing circuit 131 of the front engine 130.

In step S904, the reception unit 411 of the image processing circuit 131 receives the image data transmitted from the main engine 140. The reception unit 411 outputs the received image data to the display processing unit 309.

In step S905, the display processing unit 309 of the image processing circuit 131 generates display image data on the basis of the input image data, and causes the display image data to be displayed in the display unit 101 and/or the EVF 108.

In step S908, the system control unit 132 determines whether or not a set amount of time has passed since the start of the display. The system control unit 132 ends the playback mode processing if it is determined that a set amount of time has passed since the start of the display, and executes step S907 if not. The determination in step S908 is made to place a limit on the display time for the purpose of saving energy.

Once the playback mode processing ends, the system control unit 132 executes step S1015 (the shutdown processing of the main engine 140).

In step S907, the system control unit 132 determines whether or not an instruction to change the operation mode has been input. The instruction to change the operation mode may be, for example, the mode change switch 121, the shutter button 102, or the like being operated. The system control unit 132 ends the playback mode processing if it is determined that an instruction to change the operation mode has been input, and executes step S906 if not.

In step S906, the system control unit 132 determines whether or not an instruction to change the display image has been input. The instruction to change the display image may be, for example, an operation for cycling forward or backward through images using the directional key 114, an instruction to change to a thumbnail display made using the enlarge button 118, or the like. The system control unit 132 executes step S901, after determining the next image file to be displayed, if it is determined that an instruction to change the display image has been input, and executes step S908 if not.

When displaying display image data recorded into the storage device 160 in the non-development mode, the system control unit 132 controls the isolators 161 and 162 through the power supply control unit 107 so that the storage device 160 can be accessed by the front engine 130. In this case, the storage device 160 is made inaccessible for the main engine 140. The system control unit 132 then instructs the file processing unit 314 to read out the image file containing the display image data.

If the display image data is not coded, the processing of steps S902 to S904 is not necessary, and the read-out display image data may be input to the display processing unit 309.

The foregoing has described operations performed when the external output function of the digital camera 100 is disabled (step S1002, "no").

In this manner, by having the "non-development mode", in which no development processing is performed by the main engine 140, the digital camera 100 according to the present embodiment can realize high-speed continuous shooting which does not depend on the processing capabilities of the main engine 140, the buffer capacity of the front engine 130, and so on. Additionally, the supply of power to the main engine 140 can be stopped in the non-development mode. This makes it possible to suppress consumption of the power supply 210, a rise in the temperature within the housing of the camera, and so on, which in turn makes it possible to increase the number of images that can be shot, avoid a situation in which operations stop due to heat, and so on.

Additionally, the development mode for automatically developing undeveloped RAW data recorded in the non-development mode is provided as well, and thus the user need not select image files to be developed. Operating the digital camera 100 in the development mode makes it possible to immediately development results. This makes it possible to suppress a drop in the usability caused by not executing development processing in the non-development mode.

Operations performed when the external output function of the digital camera 100 is enabled (step S1002, "yes") will be described next with reference to FIG. 12B. In the present embodiment, an LV image, a thumbnail of recording image data, or the like is displayed in an external device such as an external monitor or the like.

In step S1020, the system control unit 132 determines whether or not an external device is connected to the communication unit 109. It is assumed that the communication unit 109 includes a detection unit for detecting a connection with an external device, and that the system control unit 132 determines whether or not an external device is connected to the communication unit 109 on the basis of a signal indicating a connection detection result, output from the detection unit. Note that when detecting the connection with an external device requires communication, in one embodiment, the main engine 140 is started up, and as such, step S1021 is executed before step S1020. In this case, the shutdown processing of the main engine 140 is executed if it is determined that an external device is connected.

The system control unit 132 executes step S1021 if it is determined in step S1020 that an external device is connected to the communication unit 109, and executes step S1003 (FIG. 12A) if not.

In step S1021, the system control unit 132 executes the startup processing of the main engine 140, in the same manner as in steps S1013, S1016, and so on.

In step S1022, the system control unit 132 determines the operation mode of the digital camera 100, in the same manner as in step S1003. Step S1025 is executed if it is determined that the operation mode of the digital camera 100 is a mode for shooting, and step S1033 is executed if it is not determined that the operation mode of the digital camera 100 is a mode for shooting.

In step S1025, the system control unit 132 confirms that the lens 151 is in an in-focus state. It is assumed here that autofocus is set. Step S1025 may be skipped if manual focus is set.

Focus control through autofocus is executed in parallel with LV output processing, performed in step S1023. Here, when the in-focus state is used as a condition for executing still image shooting, it is determined whether or not the condition for executing still image shooting is satisfied at the point in time of step S1025. The system control unit 132 executes step S1027 when it is determined that the lens 151 is in the in-focus state, and executes step S1023 when it is not determined that the lens 151 is in the in-focus state.

In step S1027, the system control unit 132 determines whether or not a shooting instruction has been input, executes step S1028 when it is determined that a shooting instruction has been input, and executes step S1023 when it is not determined that a shooting instruction has been input.

In step S1023, the system control unit 132 executes the live view output processing. The live view output processing is processing for outputting live view image data to the external device connected through the communication unit 109.

Figure 19:
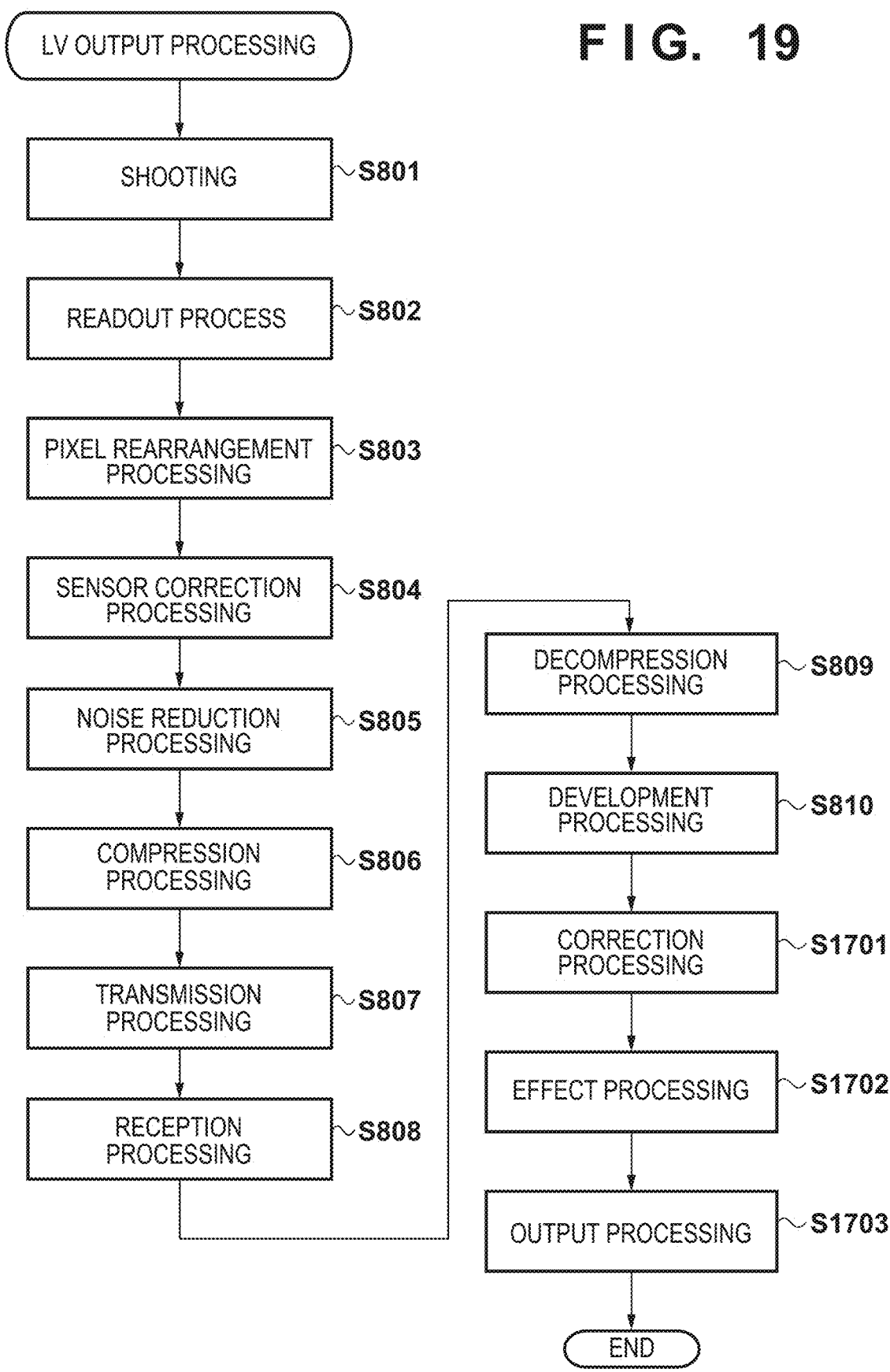
FIG. 19 is a flowchart illustrating live view output processing according to the first embodiment.

FIG. 19 is a flowchart illustrating details of the live view output processing.

The live view output processing is processing for outputting display image data based on recording image data generated by the main engine 140 to the external device through the communication unit 109.

In FIG. 19, the processing of steps S801 to S810 is the same as the processing pertaining to the shooting/recording processing, described with reference to FIGS. 16A and 16B, and will therefore not be described. Focusing processing for the lens 151 will also not be described.

In step S1701, the correction unit 323 applies distortion correction, noise suppression processing, and scaling processing to the recording image data generated by the RAW development unit 322 applying high-quality development processing.

In step S1702, the effect processing unit 324 applies effect processing (black and white conversion, color adjustment, and the like) as necessary to the image data output from the correction unit 323 to obtain a predetermined display effect, and outputs the resulting data.

In step S1703, the output unit 327 applies gamma correction and the like to the image data output by the effect processing unit 324, and generates the display image data. The output unit 327 then outputs the display image data to the external device via the communication unit 109.

Returning to FIG. 12B, in step S1028, the system control unit 132 determines whether or not the operation mode of the digital camera 100 is the non-development mode, executes step S1029 if the operation mode is determined to be the non-development mode, and executes step S1032 if the operation mode is not determined to be the non-development mode.

In step S1029, the non-development mode processing is executed, in the same manner as in step S1010.

In step S1032, the shooting/recording processing is executed, in the same manner as in step S1014.

In step S1030, the shutdown processing of the main engine 140 is executed, in the same manner as in step S1015.

In step S1031, the system control unit 132 executes step S1012 when it is determined that an operation of the operation unit 110 has not been detected for a set amount of time, and executes step S1002 when it is not determined that an operation of the operation unit 110 has not been detected for the set amount of time.

On the other hand, when it is determined in step S1022 that the operation mode is not a mode for shooting, the system control unit 132 executes step S1033.

In step S1033, the system control unit 132 determines whether or not the current operation mode is the development mode, executes step S1034 the current operation mode is determined to be the development mode, and executes step S1035 if the current operation mode is not determined to be the development mode.

In step S1034, the development mode processing is executed, in the same manner as in step S1018.

In step S1035, the system control unit 132 executes the playback output processing. This is processing for outputting the display image data, which is based on the recorded and developed image data, to the external device via the communication unit 109.

FIG. 20 is a flowchart illustrating details of the playback output processing. An example in which the playback output processing is executed on an image file recorded in the recording medium 200 will be described here.

Steps S901 and S902 are the same as in the playback mode processing (FIG. 18), and will therefore not be described.

In step S1801, the output unit 327 performs scaling, input/output correction, gamma correction, white balance correction, and the like on the image data output from the decompression unit 402, and generates the display image data. The output unit 327 can generate thumbnail images for displaying a list of a plurality of image files. Then, the output unit 327 outputs the display image data to the external device via the communication unit 109.

The processing of steps S906 to S908 are the same as in the playback mode processing (FIG. 18), and will therefore not be described.

Although operations for outputting display image data based on image data recorded in the recording medium 200 to the external device are described here, display image data based on image data recorded in the storage device 160 may be output to the external device. In this case, the image data may be read out from the storage device 160 through the file processing unit 328 in step S901. The processing from step S902 on is the same.

When the external output function is enabled, in the still image shooting mode, display image data based on a high-quality image to which the development processing of the main engine 140 has been applied is can be output to the external device. Additionally, in the non-development mode, outputting the LV image generated by the image processing circuit 131 of the front engine 130 to the external device makes it possible to stop the supply of power to the main engine 140. Additionally, in the development mode and the playback mode, the communication with the external device is performed by the main engine 140, and thus the supply of power to the front engine 130 can be limited. Thus, the effects of realizing continuous high-speed continuous shooting in the non-development mode, and suppressing a drop in usability in the development mode, remain the same even when outputting an LV image and/or a playback image to the external device.

Note that the use of the external device is not limited to displaying image data. For example, the external device may provide instructions to switch the operation mode, shooting instructions, and the like to the digital camera 100. The digital camera 100 handles instructions from the external device in the same manner as instructions from the operation unit 110. Note that the digital camera 100 may notify the external device, via the communication unit 109, of the state of operations being executed in response to instructions from the external device.

The startup processing of the main engine 140, and the shutdown processing of the main engine 140, will be described in detail next. The startup processing of the main engine 140 is executed through steps S1013 and S1016 in FIG. 12A and step S1021 in FIG. 12B. The shutdown processing of the main engine 140 is executed through step S1015 in FIG. 12A and step S1030 in FIG. 12B.

Figure 21A:
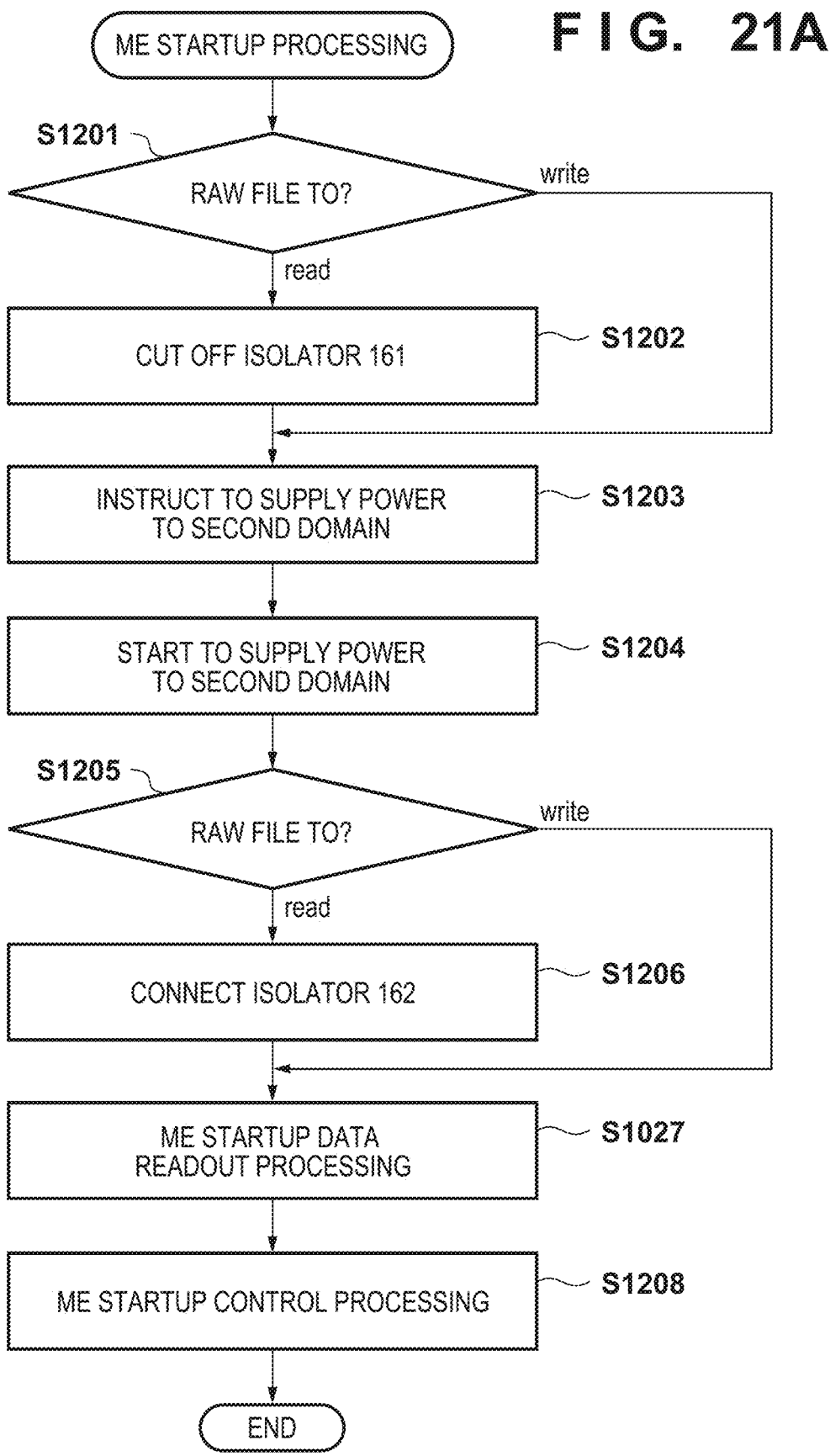
FIGS. 21A and 21B are flowcharts illustrating startup/shutdown processing of the main engine according to the first embodiment.
Figure 21B:
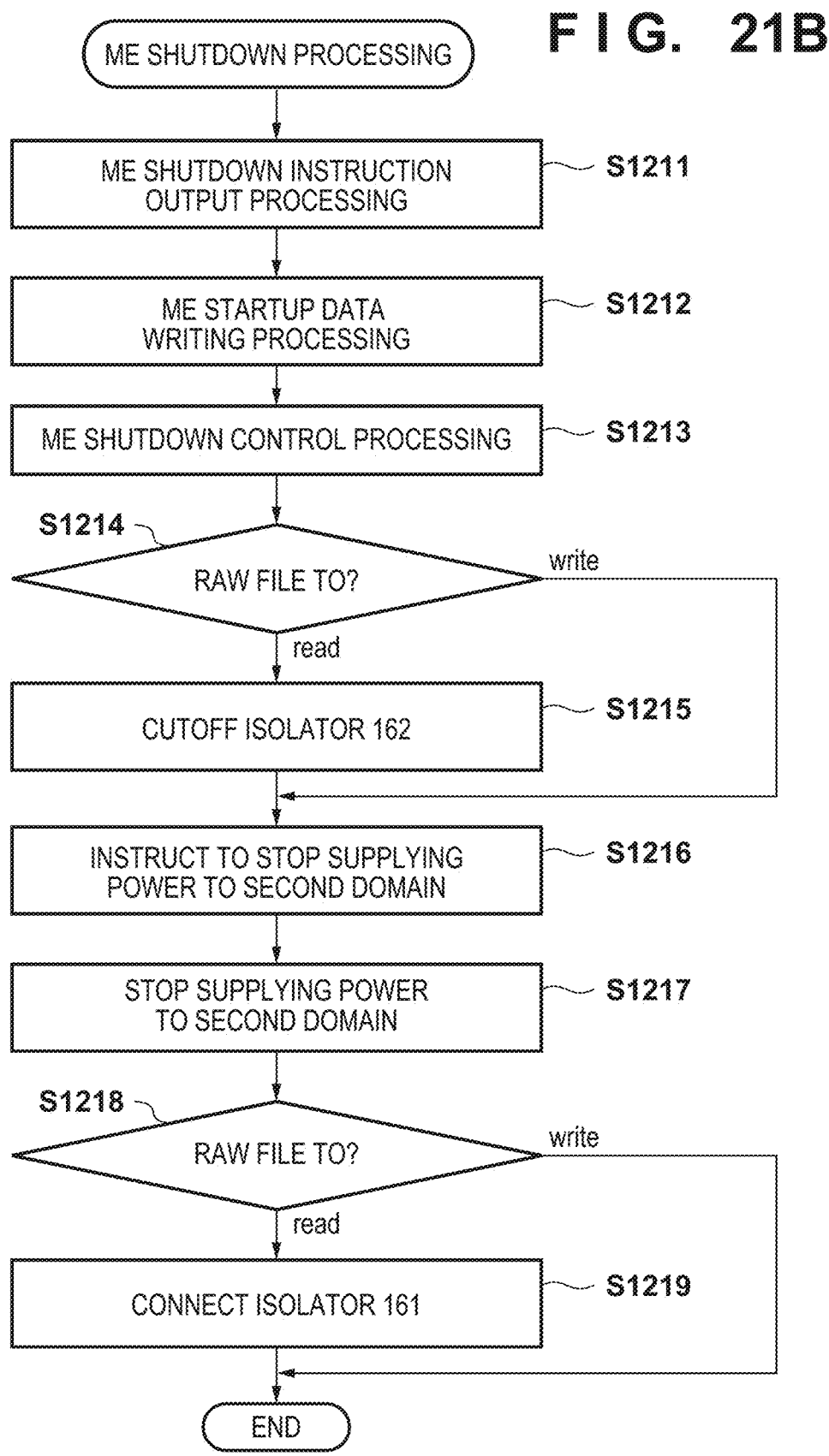

FIG. 21A is a flowchart illustrating the startup processing of the main engine 140 in detail. FIG. 21B is a flowchart illustrating the shutdown processing of the main engine 140 in detail.

The startup processing of the main engine 140 will be described first with reference to FIG. 21A.

In step S1201, the system control unit 132 determines whether or not the current operation mode is an operation mode that writes RAW files into the storage device 160 (i.e., the non-development mode). The system control unit 132 executes step S1203 if it is determined that the current operation mode is the non-development mode, and executes step S1202 if not. Step S1201 may be a determination as to whether or not the operation mode is a mode in which the main engine 140 accesses the storage device 160.

In step S1202, the system control unit 132 instructs the power supply control unit 107 to cut off the electrical connection between the isolator 161 and the front engine 130. The power supply control unit 107 controls the isolator 161 in response to the instruction.

In step S1203, the system control unit 132 instructs the power supply control unit 107 to start the supply of power to the second power supply domain 221 including the main engine 140.

In step S1204, the power supply control unit 107 starts the supply of power to the second power supply domain 221 including the main engine 140 (i.e., lifts the restricted state on the main engine 140).

In step S1205, the system control unit 132 makes the same determination as in step S1201, executes step S1207 if it is determined that the current operation mode is the non-development mode, and executes step S1206 if not.

In step S1206, the system control unit 132 instructs the power supply control unit 107 to establish an electrical connection between the isolator 162 and the main engine 140. The power supply control unit 107 controls the isolator 162 in response to the instruction.

Note that the control unit 142 of the main engine 140 may execute step S1206. In this case, steps S1205 and S1206 may be executed after the main engine 140 is started up, i.e., after step S1208.

In step S1207, the control unit 142 reads out programs and parameters for starting up the main engine 140 from the system memory 144.

In step S1208, the control unit 142 controls the startup of the main engine 140 by executing the read-out programs.

The main engine 140 transitions from the restricted state to the normal state as a result of the processing of steps S1201 to S1208. The destination to which the storage device 160 is connected may be switched as necessary as well.

The shutdown processing of the main engine 140 will be described next with reference to FIG. 21B.

In step S1211, the system control unit 132 instructs the control unit 142 of the main engine 140 to stop operations.

In step S1212, the control unit 142 updates data such as parameters for starting up the main engine 140 (startup data), which is stored in the system memory 144, as necessary. Note that the startup data may be stored in the storage device 160.

In step S1213, the control unit 142 executes processing for stopping the operations of the main engine 140. The control unit 142 then notifies the system control unit 132 that the operations of the main engine 140 have been stopped.

In step S1214, the system control unit 132 makes the same determination as in step S1201 of the startup processing, executes step S1216 if it is determined that the current operation mode is the non-development mode, and executes step S1215 if not.

In step S1215, the system control unit 132 instructs the power supply control unit 107 to cut off the electrical connection between the isolator 162 and the main engine 140. The power supply control unit 107 controls the isolator 162 in response to the instruction.

In step S1216, the system control unit 132 instructs the power supply control unit 107 to stop the supply of power to the second power supply domain 221 including the main engine 140.

In step S1217, the power supply control unit 107 stops the supply of power to the second power supply domain 221 including the main engine 140.

In step S1218, the system control unit 132 makes the same determination as in step S1201 of the startup processing, ends the shutdown processing of the main engine 140 if it is determined that the current operation mode is the non-development mode, and executes step S1219 if not.

In step S1219, the system control unit 132 instructs the power supply control unit 107 to establish an electrical connection between the isolator 161 and the front engine 130. The power supply control unit 107 controls the isolator 161 in response to the instruction. The shutdown processing of the main engine 140 is then ended.

The main engine 140 transitions from the normal state to the restricted state as a result of the processing of steps S1211 to S1219.

By transitioning the main engine 140 to the restricted state, the power consumption of the digital camera 100 can be suppressed, and in operations which consume a large amount of power, such as the non-development mode, a situation where the operations stop due to a rise in temperature within the housing can be suppressed. This extends the amount of time for which the digital camera 100 can operate continuously, and suppresses situations where shooting opportunities are lost.

The rating-based development processing performed when the power switch 103 is turned off during operations in the development mode will be described next. As described above, in the digital camera 100 according to the present embodiment, if, when the power switch 103 is turned off while in the development mode, undeveloped RAW data remains and the setting is enables, the power is turned off after continuing to execute the development processing. This makes it possible to quickly provide a development result for the undeveloped RAW data recorded in the non-development mode. In particular, targeting image files with high ranks for the development processing that continues after the power switch 103 is turned off makes it possible to quickly provide development results for images thought to be of high interest to the user.

Figure 22B:
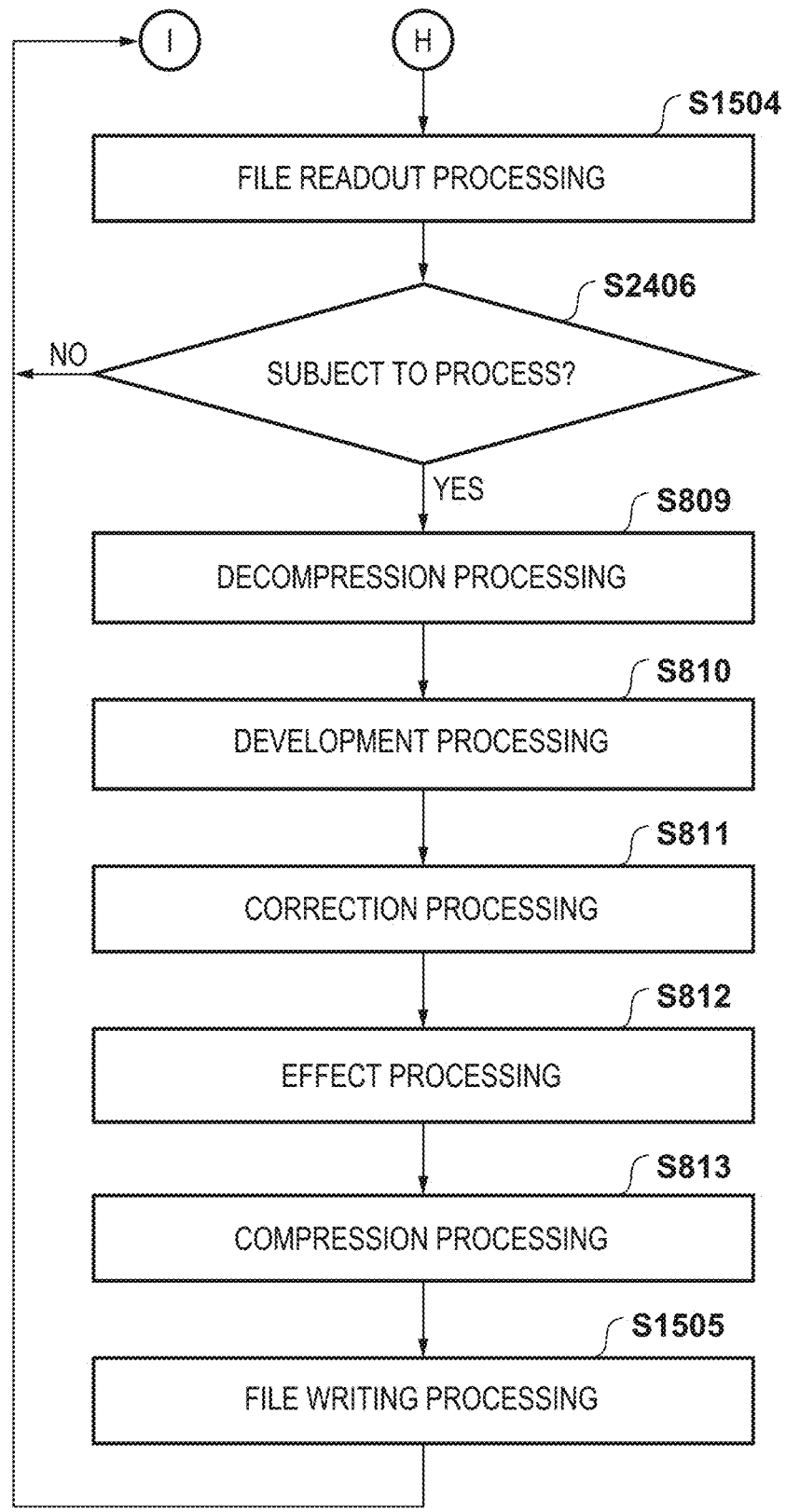

FIGS. 22A and 22B are flowcharts illustrating details of the rating-based development processing executed when the power switch 103 is turned off during operations in the development mode. The development processing executed after the power off instruction are executed with the front engine 130 in the restricted state, in which the supply of power to the first power supply domain 220 is reduced, in order to reduce the power consumption.

In step S2401, the control unit 142 determines whether or not the management status is "processing", executes step S2402 if it is determined that the management status is "processing", and executes step S2407 if not.

In step S2402, the control unit 142 determines whether or not "rating-based development during power off" is enabled, executes step S2403 if that setting is determined to be enabled, and executes step S2408 if that setting is not determined to be enabled. Enabling and disabling rating-based development during power off can be set and changed through the setting screen illustrated in FIG. 9B.

In step S2403, the control unit 142 determines whether or not there is sufficient free space in the storage device 160. Specifically, the control unit 142 executes step S2404 if it is determined that the free space in the storage device 160 is greater than or equal to a threshold, and executes step S2409 if it is not determined that the free space in the storage device 160 is greater than or equal to the threshold.

In step S2404, the control unit 142 determines whether or not an undeveloped file is present in the storage device 160. The control unit 142 executes step S2405 if it is determined that there is an undeveloped file, and executes step S2410 if it is not determined that there is an undeveloped file.

In step S2405, the control unit 142 determines whether or not the number of undeveloped files subjected to development processing through the rating-based development during power off has reached a set upper limit number. The upper limit number corresponds to the setting value for "upper limit for the number of images to be developed when the power is turned off" in the setting screen illustrated in FIG. 9B. Thus, in the rating-based development during power off, an upper limit number different from the upper limit number applied in the development mode operations when the power switch 103 is turned on (the setting value for "upper limit of the number for batch development" in the setting screen illustrated in FIG. 9B) is applied. This makes it possible to adjust a time difference between the operation for turning the power switch 103 off and the state in which the power of the digital camera 100 is actually turned off.

The control unit 142 executes step S2411 if it is determined that the number of undeveloped files subjected to development processing in the rating-based development during power off has reached the upper limit number, and executes step S1504 if not.

In step S1504, the control unit 142 instructs the file processing unit 328 to read out one undeveloped file from the storage device 160. The file processing unit 328 reads out the undeveloped file from the storage device 160 in response to the instruction and stores the file in the memory 145.

In step S2406, the control unit 142 determines whether or not the read-out undeveloped file is to be developed. Specifically, the control unit 142 determines whether or not the rank included in the undeveloped file (the rating result) satisfies the rank set for the lower limit rate during power off in the setting screen illustrated in FIG. 9B. Note that when the undeveloped file does not include a rank (a rating result), the rank can be obtained by searching the files to be searched on the basis of the annotation (message digest value) contained in the undeveloped file.

The control unit 142 executes step S809 if it is determined that the undeveloped file is to be developed, and executes step S2403 if not. Note that step S1504 may be executed without executing steps S2403 to S2405 when it is not determined that the undeveloped file is to be developed.

The processing of steps S809 to S813 and S1505 are the same as in the development mode processing (FIGS. 17A and 17B), and will therefore not be described. When the recording of the developed image data in step S1505 is complete, the control unit 142 increments the number of files processed in the rating-based development during power off by 1, decrements the number of undeveloped files by 1, and then executes step S2403. These file numbers can be recorded in the storage device 160, for example.

In step S2407, the control unit 142 updates the management status to "complete" and then proceeds with the shutdown processing.

In steps S2408, S2410, and S2411, the control unit 142 updates the management status to "complete", ends the processing for the rating-based development during power off, and then proceeds with the shutdown processing.

In step S2409, the control unit 142 updates the management status to "cannot execute" and ends the processing for the rating-based development during power off. The control unit 142 is notified that there is insufficient free space in the storage device 160, and the control unit 142 notifies the user by causing the notifying unit 123 to flash, for example. Note that the system control unit 132 may notify the user that there is insufficient free space in the storage device 160, that the management status is "cannot execute", and so on during startup.

As described thus far, the image capture apparatus according to the present embodiment has the non-development mode, in which RAW data obtained from shooting is recorded without being subjected to development processing. As such, a difference in speed between the data readout from the image sensor and the development processing for generating recording image data does not limit the continuous shooting speed, the number of consecutive shots that can be taken, and so on. This makes it possible to continuously perform high-speed continuous shooting. This is particularly effective when a storage device capable of high-speed writing and having a large capacity is used as the recording destination for RAW data. Furthermore, limiting the power to circuit blocks used for development processing in the non-development mode makes it possible to further concentrate the capabilities of the image capture apparatus on shooting and recording operations.

The image capture apparatus according to the present embodiment also has a development mode for automatically developing undeveloped RAW data recorded in the non-development mode. Therefore, there is no need for the user to select the image file to be developed, and the user can view the development results simply by operating the image capture apparatus in the development mode. This makes it possible to suppress a drop in the usability caused by not executing development processing in the non-development mode.

Additionally, rating processing is applied to rank the RAW data to be recorded in the non-development mode, and the rank is recorded in association with the RAW data. Automatically selecting the image files subject to the development processing in the development mode on the basis of the ranks makes it possible, for example, to prioritize RAW data having a high rank for development. This makes it possible to shorten the time required to provide a development result for an image thought to be of interest to the user.

Second Embodiment

A second embodiment of the aspect of the embodiments will be described next. The present embodiment can be implemented using a digital camera 100 having the same configuration as in the first embodiment, configurations described in the first embodiment are assumed to apply as-is.

The sub dial 113 and the power switch 103 are illustrated in FIGS. 5A and 5B as examples of operation means for changing the operation mode of the digital camera 100 to the development mode. Both of these may be provided, or only one may be provided. Although the first embodiment assumes that the sub dial 113 is used, the present embodiment will describe a case where the power switch 103 is used.

The example illustrated in FIG. 5B is a power switch that normally selects one of "ON" and "OFF", with "DEV", which designates operations in the development mode, being selectable as well. When "DEV" is selected by the power switch 103, power is supplied to the second power supply domain 221 and the third power supply domain 222, which are applied for operations in the development mode. When operating in the development mode, no power is supplied to the display unit 101, the EVF 108, and so on, which belong to the first power supply domain 220. Accordingly, the control unit 142 notifies the user that the camera is operating in the development mode by, for example, lighting the notifying unit 123 included in the second power supply domain 221. The notifying unit 123 may be a red LED, for example.

If there are no undeveloped files in the storage device 160 when "DEV" is selected by the power switch 103, the control unit 142 controls the power supply control unit 107 to enter a state equivalent to the power switch 103 being set to an "OFF" position. Specifically, control unit 142 instructs the power supply control unit 107 to stop the supply of power to the second power supply domain 221 and the third power supply domain 222. In this case, the control unit 142 may notify the user that there are no undeveloped files to develop in the development mode, by, for example, causing the notifying unit 123 to flash for several seconds. Note that the form of the power switch 103 illustrated in FIG. 5B, as well as the arrangements of "ON", "OFF", and "DEV", are merely examples.

The development mode is an operation mode in which RAW data recorded in the non-development mode is automatically developed. To prioritize the development processing, the development processing result are not displayed in the display unit 101, the EVF 108, or the like, but notifications of the progress and so on are made by the notifying unit 123, which is an LED element or the like.

The following will describe operations of the digital camera 100 when the development mode is selected by operating the power switch 103, focusing on the points that differ from the first embodiment.

Figure 12A:
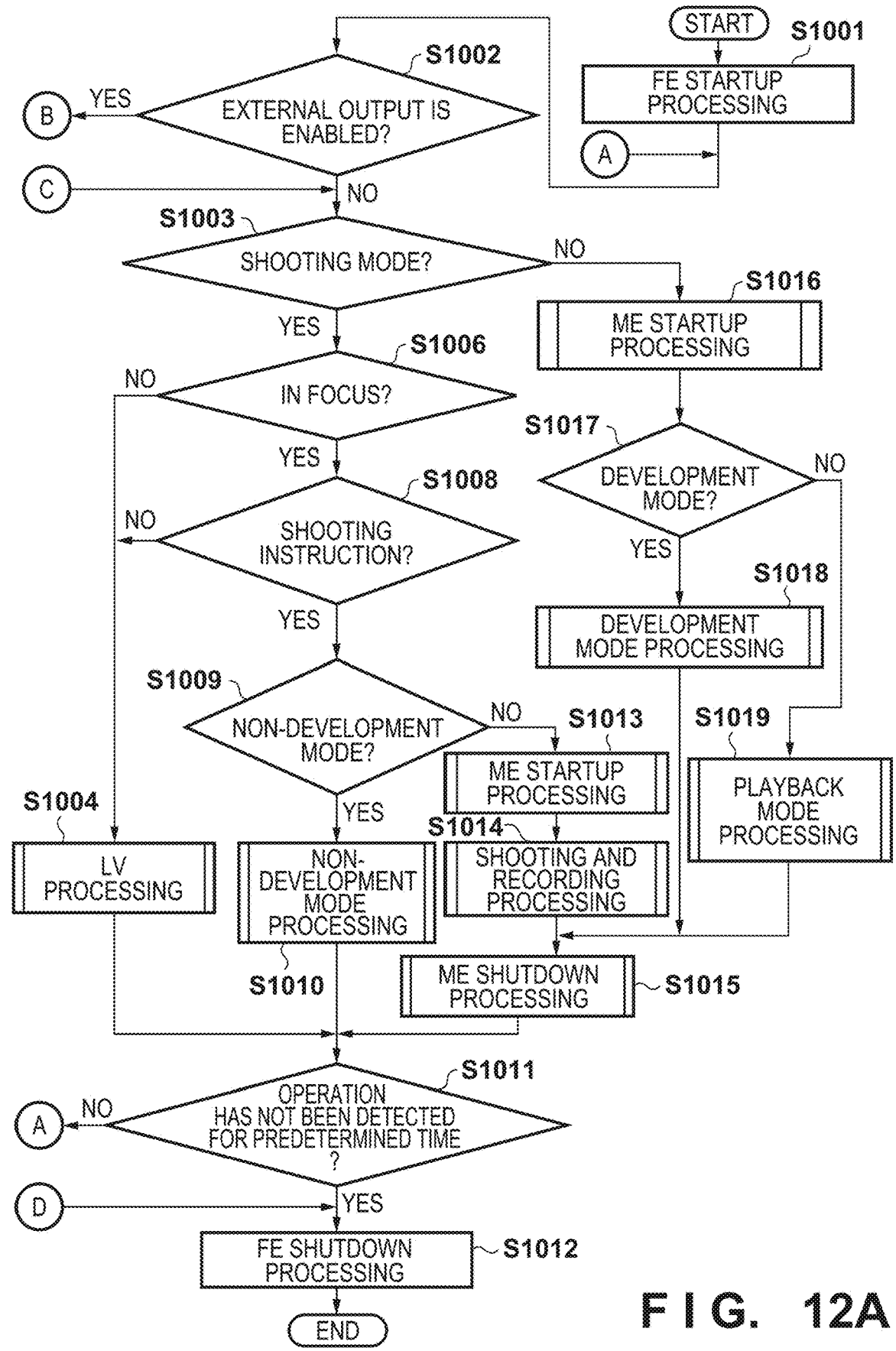
FIG. 12A is a flowchart pertaining to overall operations of the digital camera according to a first embodiment.
Figure 12B:
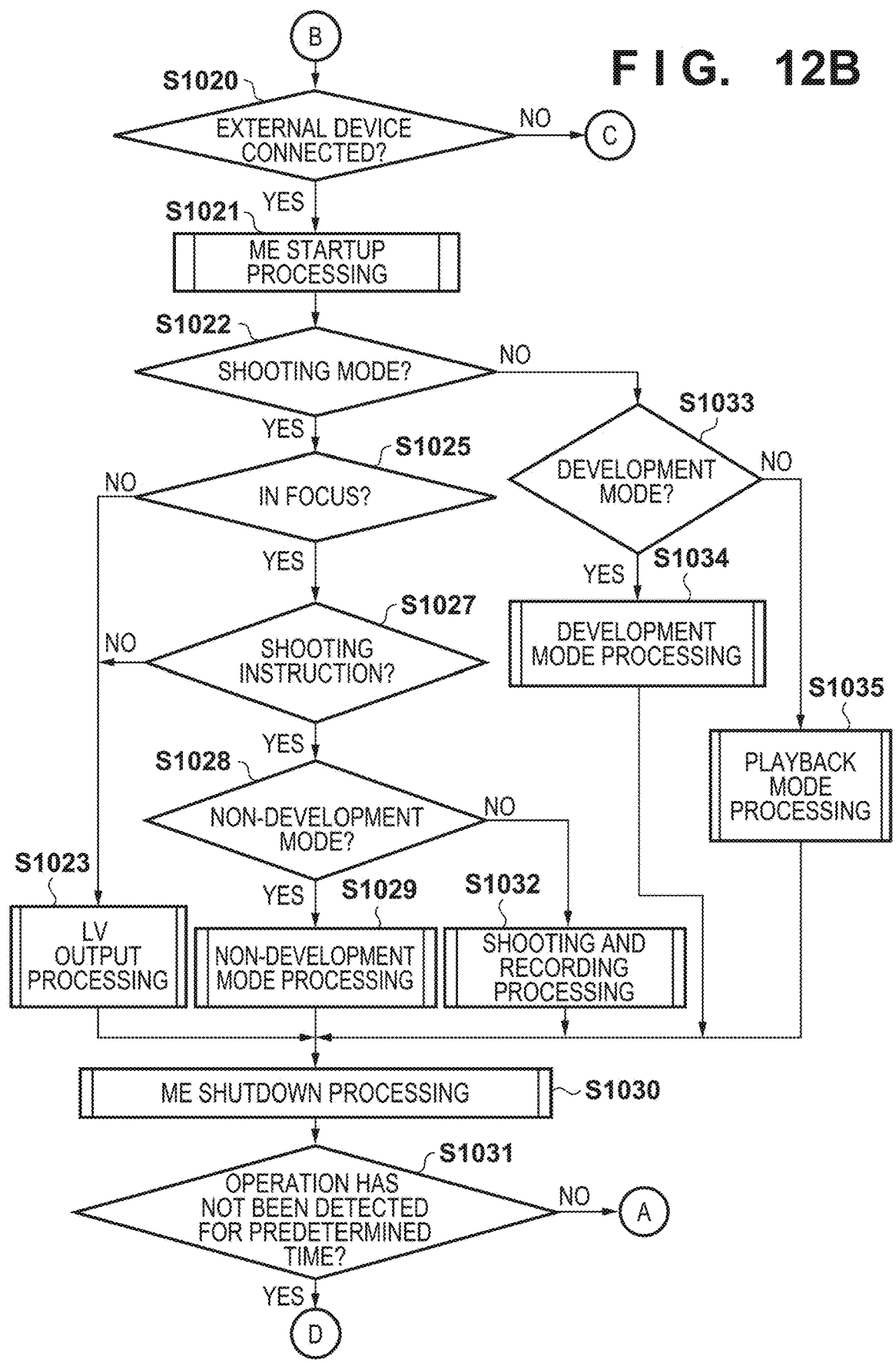
FIG. 12B is a flowchart pertaining to overall operations of the digital camera according to the first embodiment.

The overall operations described in the first embodiment with reference to FIGS. 12A and 12B correspond to a configuration in which the system control unit 132 of the front engine 130 controls the overall operations of the digital camera 100. In this case, the operations performed after the power switch 103 is turned on are constant, and thus operations for turning the power of the digital camera 100 on (and off) were not described.

In the present embodiment, however, power supply selection (FIG. 23A), apparatus control by the system control unit 132 of the first power supply domain 220 (FIG. 23B), and apparatus control by the control unit 142 of the second power supply domain 221 (FIG. 23C), are performed in accordance with the state of the power switch 103.

First, event processing operations performed when the power switch 103 is operated will be described with reference to the flowchart in FIG. 23A.

The state of the power switch 103 (whether "on", "off", or "DEV" is selected) is monitored by the power supply control unit 107, independent of the state of power supply to each power supply domain. The power supply control unit 107 is configured so that power is supplied to the first power supply domain 220 but is not supplied to the second power supply domain 221 when the power switch 103 is at "ON". Additionally, the power supply control unit 107 is configured so that power is supplied to the second power supply domain 221 but is not supplied to the first power supply domain 220 when the power switch 103 is "DEV". Note that the power supply control unit 107 is configured to supply power to the third power supply domain 222 both when the state of the power switch 103 is "ON" and "DEV".

Upon detecting a startup event from the power switch 103, the power supply control unit 107 immediately starts supplying power in accordance with the event. The startup event is the power switch 103 changing from the "OFF" state to a state other than "OFF". However, when a shutdown event from the power switch 103 is detected, the power supply control unit 107 does not immediately stop supplying power, because the shutdown processing is executed. The shutdown event is the power switch 103 changing from a state other than "OFF" to the "OFF" state. The shutdown event of the power switch 103 is detected by the system control unit 132 and/or the control unit 142, which then executes the shutdown processing.

Note that the transition of the power switch 103 from the "ON" state to the "DEV" state and from the "DEV" state to the "ON" state requires a change in the power domain to which power is supplied, but this change cannot be made immediately. As such, the power supply control unit 107 issues a request to perform processing for stopping the operation being performed, and switches the power supply domain to which power is supplied after confirming a response indicating that the stopping processing is complete.

Figure 23A:
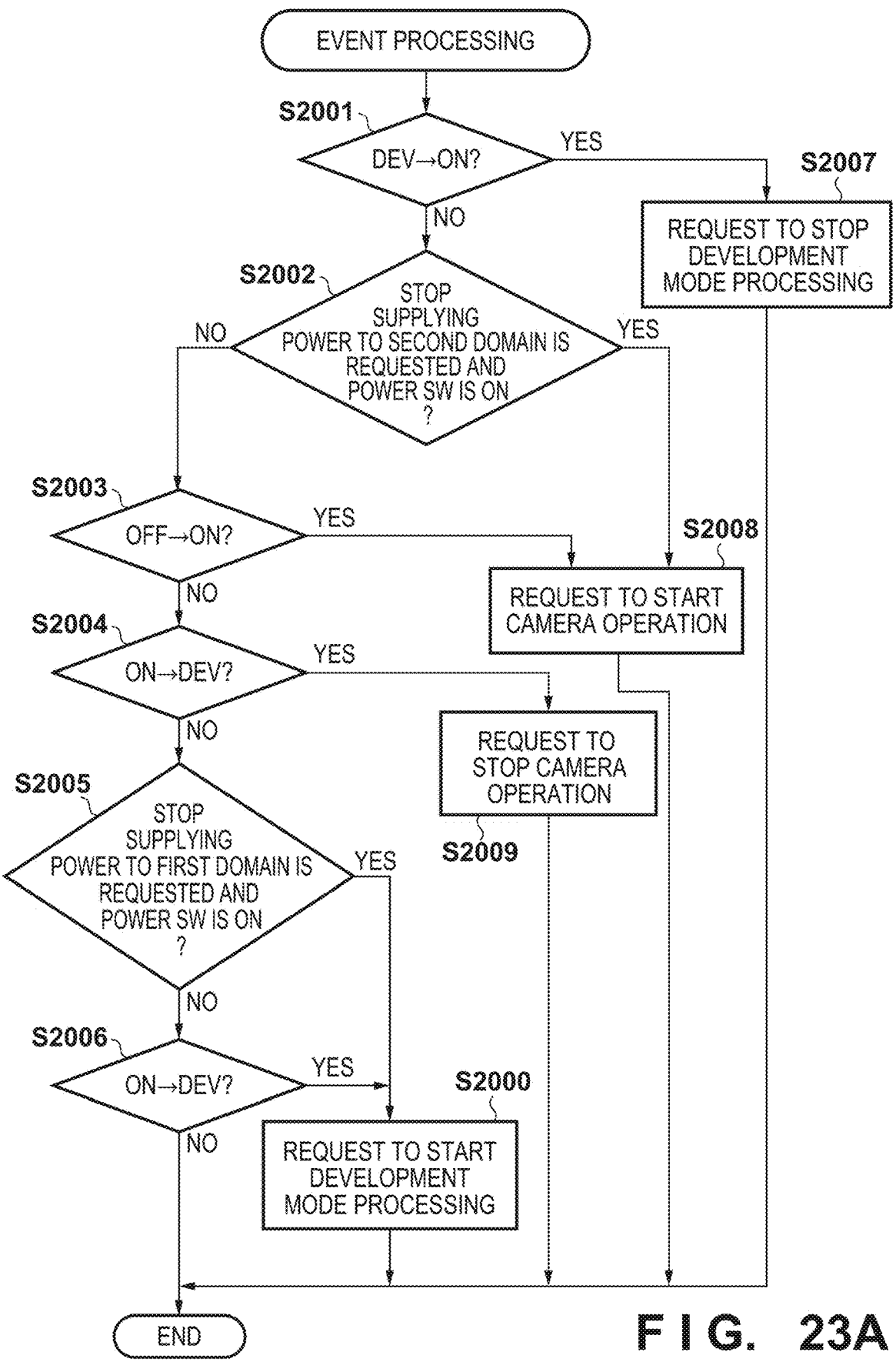
FIG. 23A is a flowchart pertaining to event processing in the digital camera according to a second embodiment.

When the power supply control unit 107 receives an event such as a change in the state of the power switch 103, the operations illustrated in FIG. 23A are executed.

In step S2001, the power supply control unit 107 executes step S2007 if the event is the power switch 103 being changed from "DEV" state to "ON" (step S2001, "yes"), and executes step S2002 if the event is a different event.

In step S2002, the power supply control unit 107 determines whether or not the event is a request from the control unit 142 to stop the supply of power to the second power supply domain 221 and whether or not the power switch 103 is in the "ON" state. The power supply control unit 107 executes step S2008 if it is determined that both conditions are satisfied, and executes step S2003 if not.

In step S2003, the power supply control unit 107 determines whether or not the event is the power switch 103 being changed from the "OFF" state to the "ON" state. The power supply control unit 107 executes step S2008 if it is determined that the event is the power switch 103 being changed from the "OFF" state to the "ON" state, and executes step S2004 if not.

In step S2004, the power supply control unit 107 determines whether or not the event is the power switch 103 being changed from the "ON" state to the "DEV" state. The power supply control unit 107 executes step S2009 if it is determined that the event is the power switch 103 being changed from the "ON" state to the "DEV" state, and executes step S2005 if not.

In step S2005, the power supply control unit 107 determines whether or not the event is a request from the system control unit 132 to stop the supply of power to the first power supply domain 220 and whether or not the power switch 103 is in the "DEV" state. The power supply control unit 107 executes step S2000 if it is determined that both conditions are satisfied, and executes step S2006 if not.

In step S2006, the power supply control unit 107 determines whether or not the event is the power switch 103 being changed from the "OFF" state to the "DEV" state. The power supply control unit 107 executes step S2000 if it is determined that the event is the power switch 103 being changed from the "OFF" state to the "DEV" state, and ends the event processing if not.

In step S2007, the power supply control unit 107 issues a request to stop the development mode operations (an interrupt) to the control unit 142, and ends the event processing. In response to the request, the control unit 142 suspends the development processing being executed and discards the intermediate file. In addition, the control unit 142 updates the management status to "suspended" and then executes the main engine shutdown processing (described later). The control unit 142 issues a request to stop the supply of power to the second power supply domain 221 in the main engine shutdown processing. This request is used in the processing of the above-described step S2002.

In step S2008, the power supply control unit 107 controls the isolators 161 and 162 so that power is supplied to the first and third power supply domains 220 and 222, but is not supplied to the second power supply domain 221. The power supply control unit 107 then issues a camera operation start request to the front engine 130 and ends the event processing. The system control unit 132 starts the camera operations in response to the request.

In step S2009, the power supply control unit 107 issues a request to stop the camera operations to the system control unit 132, and ends the event processing. In response to this request, the system control unit 132 suspends the camera operations being executed, and executes the front engine shutdown processing. The system control unit 132 issues a request to stop the supply of power to the first power supply domain 220 in the front engine shutdown processing. This request is used in the processing of the above-described step S2005.

In step S2000, the power supply control unit 107 controls the isolators 161 and 162 so that power is supplied to the second and third power supply domains 221 and 222, but is not supplied to the first power supply domain 220. The power supply control unit 107 then issues a request to start development mode operations to the main engine 140 and ends the event processing. In response to this request, the control unit 142 executes the development mode operations.

Camera operations executed when the power switch 103 is in the "ON" state will be described next with reference to FIG. 23B. These operations correspond to the operations illustrated in FIG. 12A, with the exception of the processing related to external output (step S1002) and the development mode processing (step S1018). The processes not described below are the same as those having the same reference signs in FIG. 12A.

In step S2010, the system control unit 132 of the front engine 130 executes the front engine startup processing in response to the camera operation start request from the power supply control unit 107.

Figure 24A:
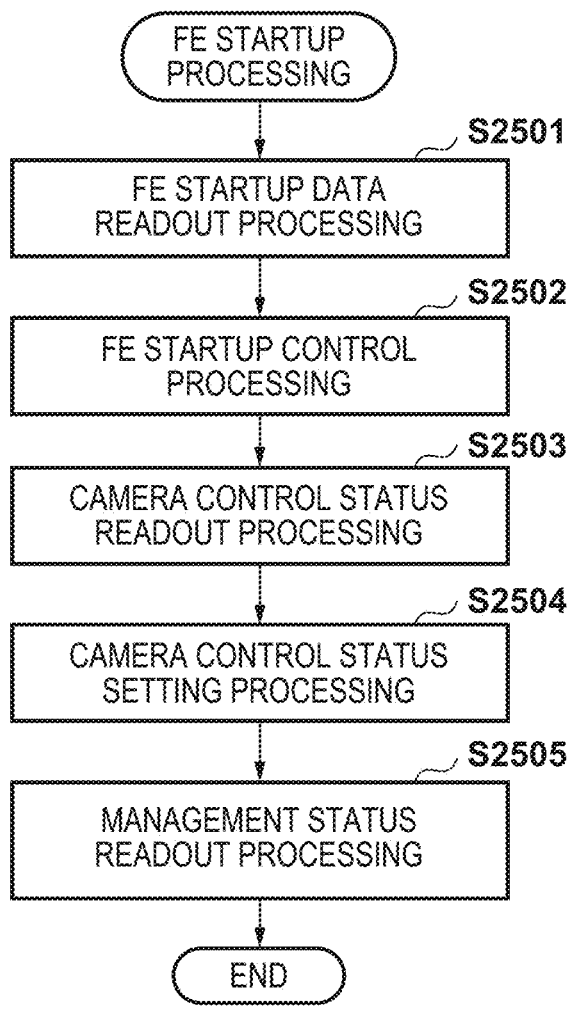
FIGS. 24A and 24B are a flowchart illustrating startup/shutdown processing for the front engine according to the second embodiment.

FIG. 24A is a flowchart illustrating the front engine startup processing in detail.

In step S2501, the system control unit 132 reads out programs and parameters used in the startup of the front engine 130 from the system memory 133.

In step S2502, the system control unit 132 executes startup processing for the front engine 130 and peripheral circuitry by executing the programs read out in step S2501. Note that a program may be loaded from the system memory 133 into the memory 134 after the memory 134 has become usable, and the program may then be executed.

In step S2503, the system control unit 132 reads out, from the system memory 133, a camera control state stored during the previous operations. The camera control state is the state of various setting values, such as states which can be set by the user (shooting conditions such as ISO sensitivity and the like, display formats of in the display unit 101 (the selected state of displayed information, such as histograms or the like), and so on. Note that the system control unit 132 may read a predetermined state (a preset state).

In step S2504, the system control unit 132 applies the camera control state obtained in step S2503 to the corresponding setting value.

In step S2505, the system control unit 132 refers to the management status recorded in the storage device 160. Then, if the management status is "cannot execute", the system control unit 132 notifies the user that there is insufficient free space in the storage device 160. If the management status is "complete" or "suspended", the system control unit 132 confirms the number of undeveloped files, and notifies the user using icons such as those illustrated in FIGS. 10A and 10B, for example.

Figure 23B:
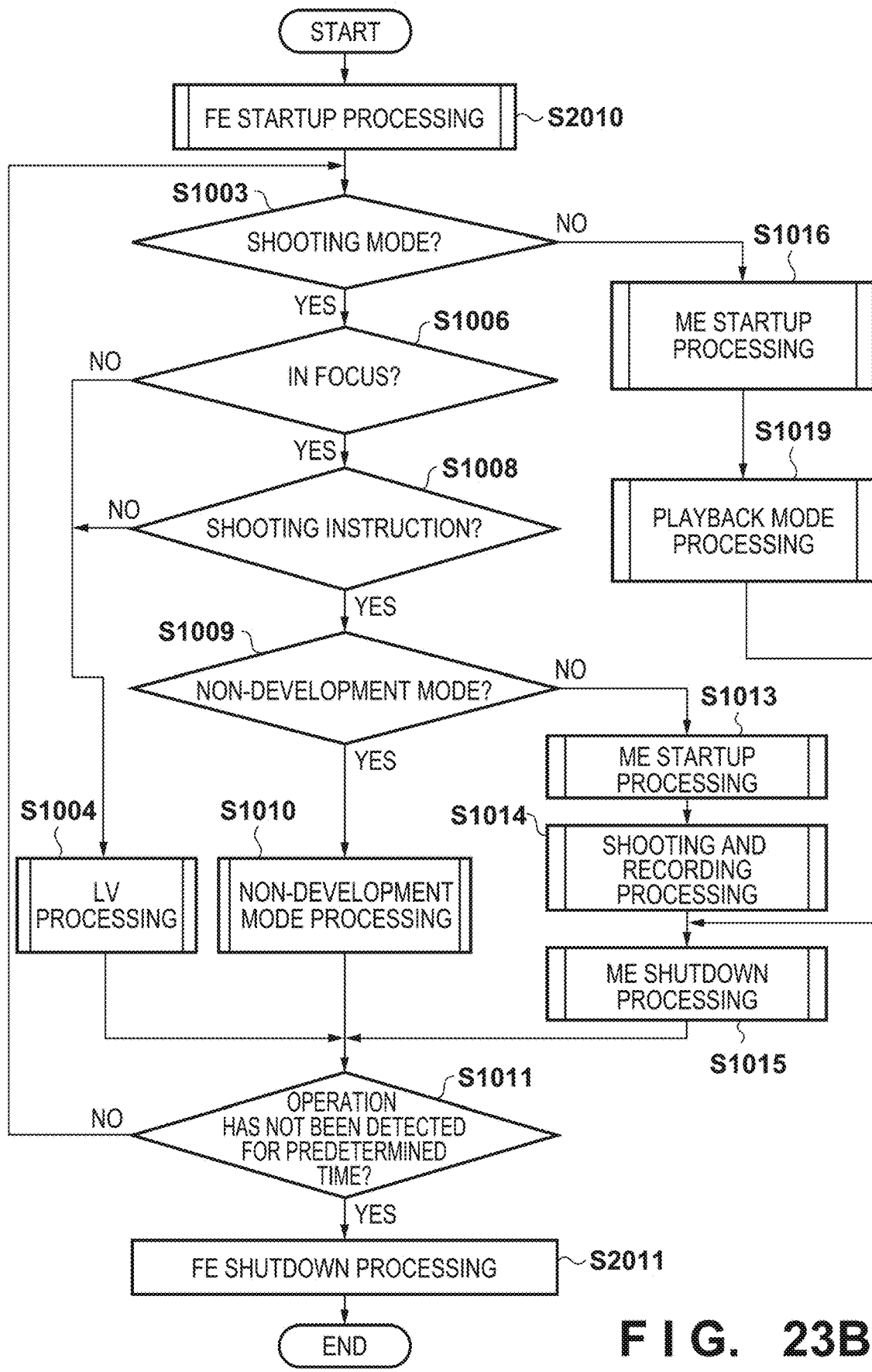
FIG. 23B is a flowchart pertaining to overall operations of the digital camera according to the second embodiment.

In FIG. 23B, the processing from step S1003 on is the same as the processing illustrated in FIG. 12A, aside from the shutdown processing of the front engine 130 performed in step S2011. However, in the present embodiment, the configuration is such that the development mode is selected using the power switch 103, and thus the development mode processing (step S1017) is not included as part of the camera operations.

The main engine startup processing and shutdown processing in steps S1013 and S1015 of FIG. 23B are different from the processing illustrated in FIGS. 21A and 21B, and are the same as the front engine startup processing and shutdown processing illustrated in FIG. 24. This is because the processing illustrated in FIGS. 21A and 21B includes the operations of the control unit 142 and the operations of the power supply control unit 107, but the startup processing and the shutdown processing of the present embodiment include the operations of the control unit 142.

The flowchart of the camera operations illustrated in FIG. 23B does not include processing when the power switch 103 has entered the "OFF" state during operations. When the power switch 103 has entered the "OFF" state, the front engine shutdown processing (described later) is executed through interrupt processing.

If the power switch 103 is in the "OFF" state when the request to stop the supply of power to the first power supply domain 220 has been received from the front engine 130, the power supply control unit 107 stops the supply of power to all the power supply domains and shuts the apparatus down. The front engine shutdown processing is also executed when a camera operation shutdown request has been issued from the power supply control unit 107 in step S2009 in response to the power switch 103 changing from the "ON" state to the "DEV" state. However, the request to stop the supply of power to the first power supply domain 220 issued in this front engine shutdown processing is taken into account in step S2005 of the event processing.

Figure 24B:
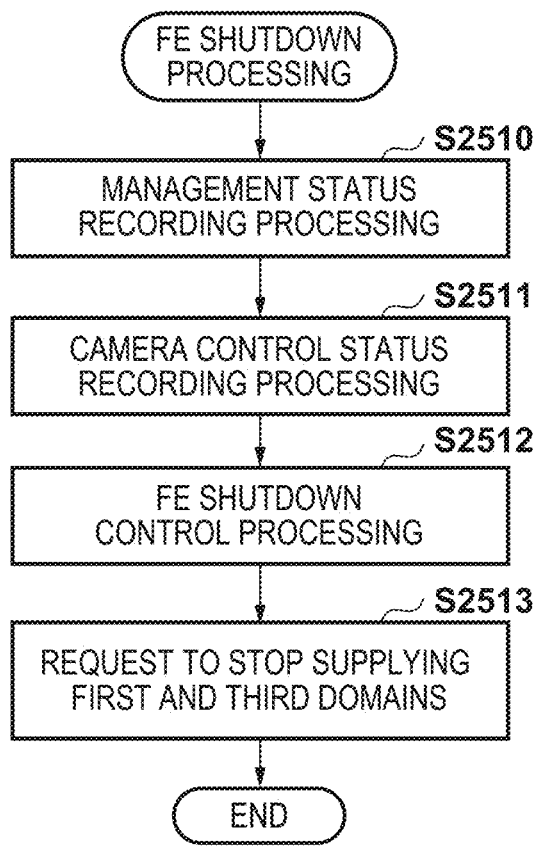

The front engine shutdown processing will be described next with reference to FIG. 24B.

In step S2510, the system control unit 132 records the management status. Specifically, the system control unit 132 records a value expressing the management status into the storage device 160.

If the management status is recorded in the storage device 160 during the camera operations too, step S2510 may be skipped. For example, if the management status is held and updated in memory in the front engine 130 or in the memory 134 during camera operations, the final management status is recorded into the storage device 160. Recording the management status into the storage device 160 makes it possible to refer to the management status from the main engine 140 as well.

In step S2511, the system control unit 132 records the camera control state into non-volatile memory of the system memory 133 or into the storage device 160.

In step S2512, the system control unit 132 executes shutdown control processing for the front engine 130. For example, the system control unit 132 disables elements in the peripheral circuitry, sets the processing pins of the interface connectors to a high-impedance state, or the like. Additionally, if there is information aside from the camera control state that is to be recorded (e.g., a processing state of the front engine 130), the system control unit 132 records that information into the non-volatile memory (the system memory 133 or the storage device 160).

In step S2513, the system control unit 132 issues, to the power supply control unit 107, a request to stop the supply of power to the first power supply domain 220 and the third power supply domain 222. If the state of the power switch 103 is "DEV", the request to stop the supply of power is taken into account in step S2005 of the event processing. If the power switch 103 is in the "OFF" state, the power supply control unit 107 stops the supply of power to all the power supply domains and shuts down the apparatus, as described earlier.

Figure 23C:
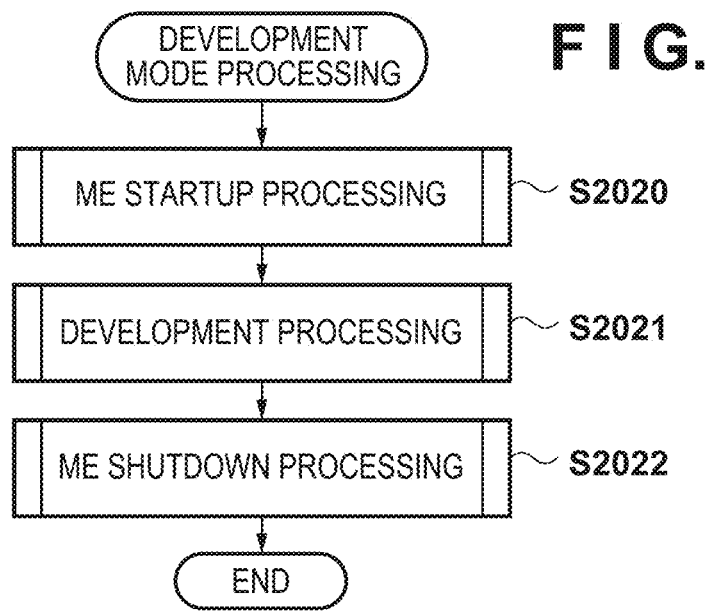
FIG. 23C is a flowchart pertaining to development mode processing in the digital camera according to the second embodiment.

Development mode operations executed when the power switch 103 is in the "DEV" state will be described next with reference to FIG. 23C.

In step S2020, the control unit 142 executes the main engine startup processing in response to a request to start the development mode from the power supply control unit 107.

Figure 25A:
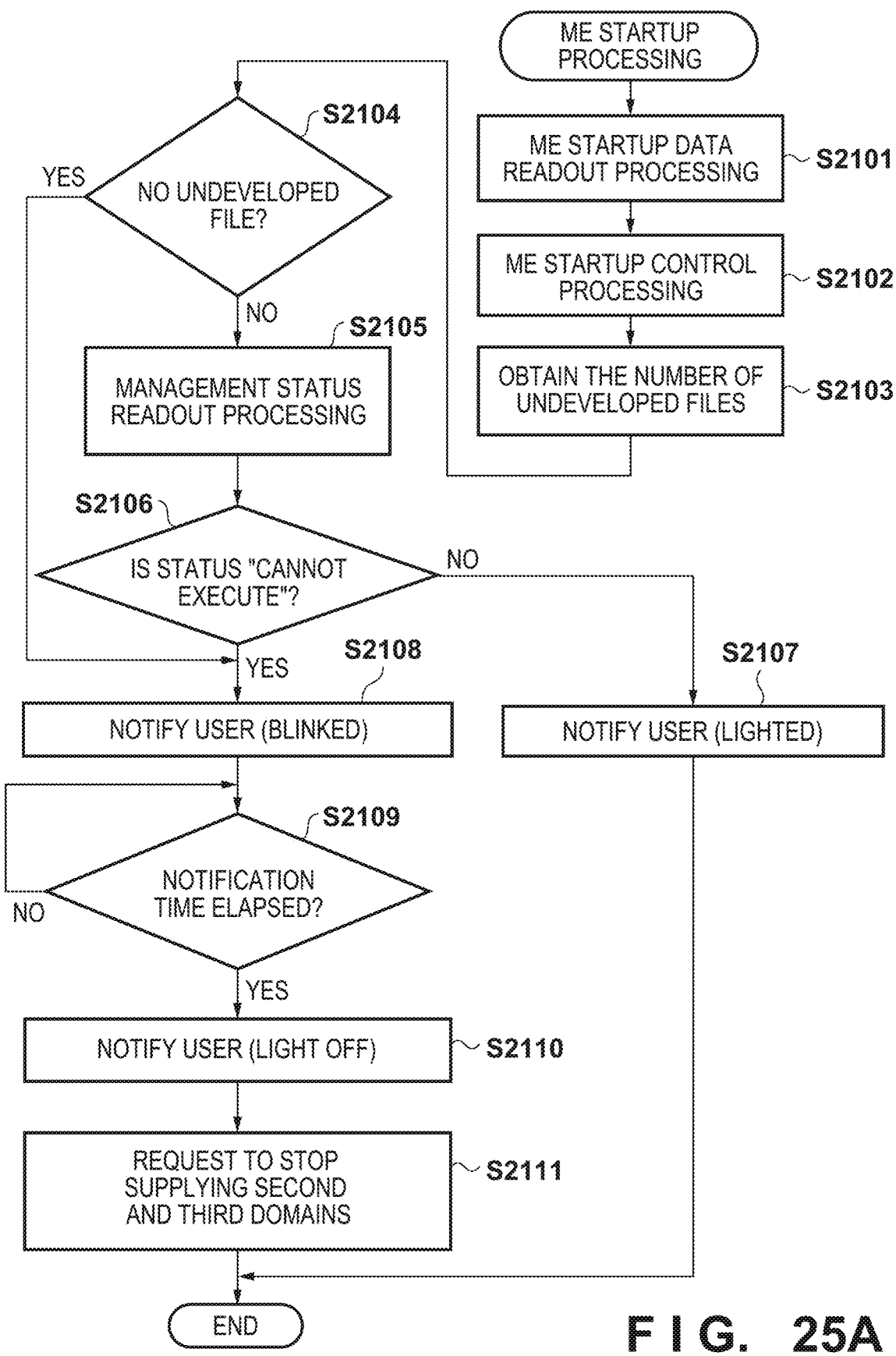
FIGS. 25A and 25B are flowcharts illustrating startup/shutdown processing of the main engine according to the second embodiment.

FIG. 25A is a flowchart illustrating the main engine startup processing in detail. The startup processing also includes processing of notifying the user and requesting shutdown when the conditions for starting the development mode operations are not satisfied. The development mode operations are started when the free space in the storage device 160 is greater than or equal to a threshold and an unprocessed file that satisfies a condition is present in the storage device 160.

In step S2101, the control unit 142 reads out programs and parameters used to start up the main engine 140 from the system memory 144.

In step S2102, the control unit 142 executes startup processing for the main engine 140 and peripheral circuitry by executing the programs read out in step S2101. Note that a program may be loaded from the system memory 144 into the memory 145 after the memory 145 has become usable, and the program may then be executed.

In step S2103, the control unit 142 obtains the number of undeveloped files from the storage device 160. The holding and management of the number of undeveloped files is as described with reference to FIGS. 17A and 17B.

In step S2104, the control unit 142 determines whether or not there is an undeveloped file to be subjected to the development processing, executes step S2108 if it is determined that there is no undeveloped file, and executes step S2105 if it is not determined that there is no undeveloped file (i.e., if it is determined that there is an undeveloped file).

In step S2105, the control unit 142 reads out the management status from the storage device 160 and temporarily stores the management status in the memory 145 of the main engine 140.

In step S2106, the control unit 142 determines whether or not the management status is "cannot execute", executes step S2108 if it is determined that the management status is "cannot execute", and executes step S2107 if not.

In step S2107, the control unit 142 puts the notifying unit 123 into a lighted state and ends the system startup processing of the main engine 140.

In step S2108, the control unit 142 puts the notifying unit 123 into a flashing state and executes step S2109. The flashing state of the notifying unit 123 is continued until an instruction to stop the lighting is issued in step S2110. It is assumed here that the control unit 142 starts a timer for flashing (not shown) and a timer for measuring the time that has elapsed from the start of the flashing (not shown).

In step S2109, the control unit 142 determines whether or not the amount of time elapsed from the start of the flashing has reached a set amount of time, executes step S2110 if it is determined that the set amount of time has been reached, and executes step S2109 if not.

In step S2110, the control unit 142 causes the notifying unit 123 to turn off and executes step S2111.

In step S2111, the control unit 142 issues, to the power supply control unit 107, a request to stop the supply of power to the second power supply domain 221 and the third power supply domain 222.

Steps S2108 to S2111 are processing performed when the conditions for starting development mode operations are not satisfied.

Returning to FIG. 23C, in step S2021, the control unit 142 executes the development mode processing. This processing is the same as the processing performed in step S1018 of FIG. 12A and step S1034 of FIG. 12B and is as described with reference to FIGS. 17A and 17B, and will therefore not be described here.

Additionally, if the power switch 103 has been put into the "OFF" state during the execution of the development mode processing, the control unit 142 executes the processing for the rating-based development during power off (FIGS. 22A and 22B) immediately, without changing the management status to "processing". When a request to stop the development mode is received in response to executing step S2007 of the event processing, the control unit 142 updates the management status to "suspended" and immediately executes the main engine shutdown processing illustrated in FIG. 25B.

In step S2022, the control unit 142 executes the main engine shutdown processing.

Figure 25B:
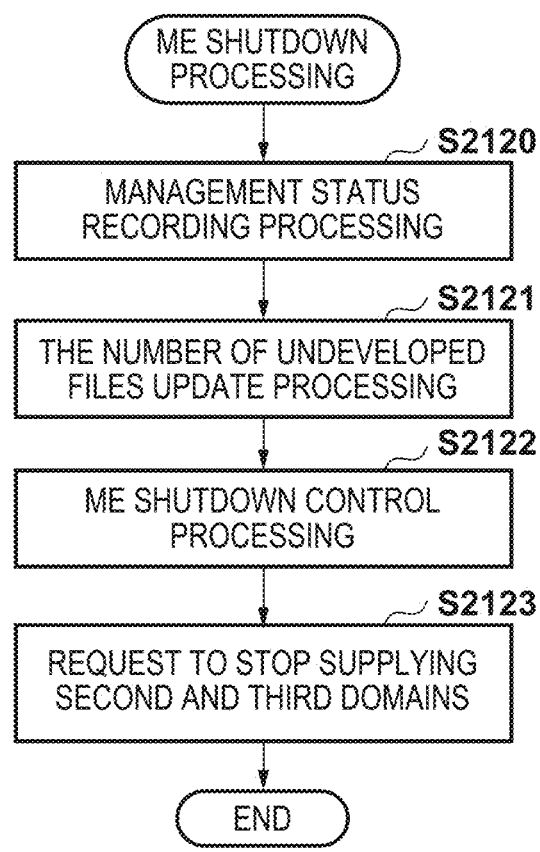

FIG. 25B is a flowchart illustrating the main engine shutdown processing in detail.

In step S2120, the control unit 142 records the management status.

Specifically, the control unit 142 records a value expressing the management status into the storage device 160. Recording the management status into the storage device 160 makes it possible to refer to the management status from the front engine 130 as well.

In step S2121, the control unit 142 updates the information indicating the number of undeveloped files, recorded in the storage device 160, to the newest value.

In step S2122, the control unit 142 executes the shutdown control processing of the main engine 140. If there is information to be recorded in the system memory 144, that information is recorded here.

In step S2123, the control unit 142 issues, to the power supply control unit 107, a request to stop the supply of power to the second power supply domain 221 and the third power supply domain 222. If the power switch 103 is in the "ON" state, this request is taken into account in step S2002 of the event processing.

Operations of the digital camera 100 when the development mode is selected by the power switch 103 are as described above.

The same effects as those of the first embodiment are achieved by the present embodiment as well. Furthermore, in the present embodiment, operations in the development mode can instructed by using the power switch. This makes it possible, for example, to quickly switch to the development mode during periods when the digital camera 100 is not in use. When a mode selection dial is used to instruct operations in the development mode, the user turns on the power switch, waits for the digital camera 100 to start up, and then operates the mode selection dial to specify the development mode.

OTHER EMBODIMENTS

The disclosure describes P220, P221, and P222 in FIG. 2 as representative examples of the values of voltages supplied from the power supply control unit 107 to the first to third power supply domains, but each may include a plurality of values as well.

Figure 26:
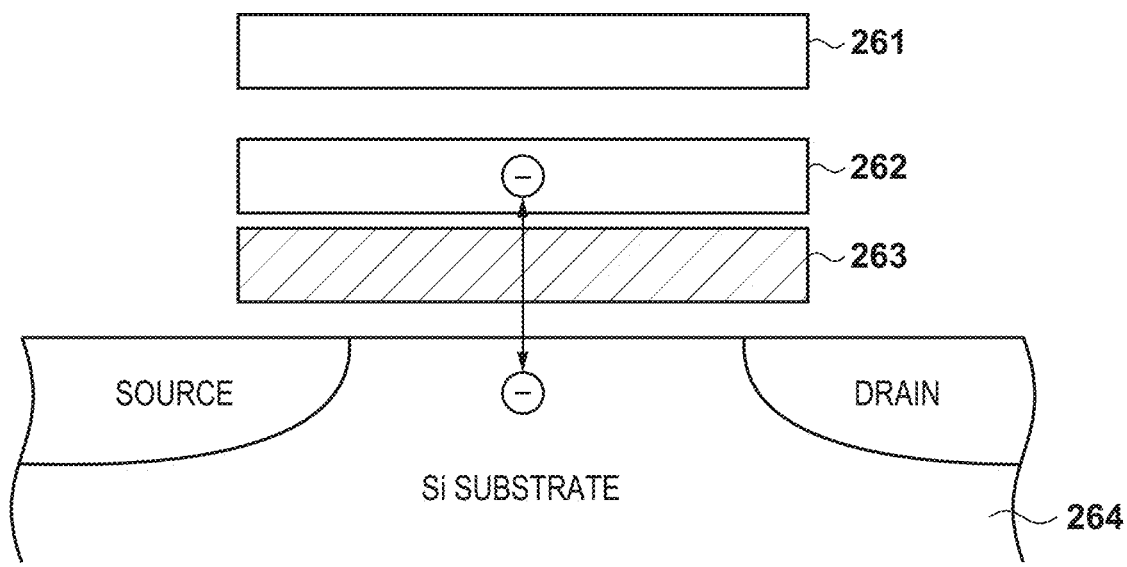
FIG. 26 is a diagram illustrating an example of the structure of a memory cell in a storage device used in an embodiment.

Additionally, the recording medium 200 and the storage device 160 are semiconductor storage devices which use NAND memory cells, for example. FIG. 26 is an exemplary cross-sectional view of a NAND memory cell.

The NAND memory cell is constituted by a P-type semiconductor on a silicon substrate 264 and two N-type semiconductors, namely a source and a drain, on either side of the P-type semiconductor. A structure constituted by a thin layer of tunnel oxide film 263, a floating gate 262 formed from polysilicon, and a control gate 261 layered in sequence, is formed on the P-type semiconductor. A state in which electrons are injected into the floating gate 262 is a "0" state (a state in which current does not flow easily between the source and drain), and a state in which no electrons present is a "1" state (in which current flows relatively easily between the source and drain). The electrons injected into the floating gate 262 are held by the tunnel oxide film 263 even when power is no longer supplied. However, repeated injection and removal of electrons into and out of the floating gate 262 degrades the tunnel oxide film 263, which ultimately will be unable to retain the electrons injected into the floating gate 262.

As such, the storage device 160 can be configured to be replaceable, such as by using an SSD with a PCIe (registered trademark) interface compliant with the NVMe (trademark) protocol. Instead of the storage device 160, another storage device such as the memory 134 or the memory 145 may be used to hold the intermediate data, which suppresses degradation of the storage device 160.

A memory card compliant with the CFexpress (trademark) standard may be used as the recording medium 200. A memory card compliant with the CFexpress standard also has a PCIe (registered trademark) interface compliant with the NVMe protocol. Although the storage device 160 and the recording medium 200 are described as separate storage devices in the present embodiment, these may be realized by a single storage device.

When a storage device compliant with the CFexpress standard is used as one storage device, the recording medium 200 is used instead of the storage device 160, and is configured to be accessible through the file processing units 314 and 328. In this case, the recording/playback unit 143 is not necessary. When the operation mode of the digital camera 100 is the still image shooting mode and the playback mode, the electrical connection between the recording medium 200 and the front engine 130 is cut off using the isolator 161. Additionally, an electrical connection between the recording medium 200 and the main engine 140 is established using the isolator 162.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2020-087607, filed on May 19, 2020, and No. 2021-022047, filed on Feb. 15, 2021, which are hereby incorporated by reference herein in their entirety.

What is claimed is:
1. An apparatus comprising:
a sensor;
an image processing circuit capable of applying development processing to RAW data obtained by the sensor; and
one or more processors that execute a program stored in a memory and thereby function as a control unit configured to control operation of the apparatus,
wherein the apparatus has a non-development mode and a development mode as operation modes, the non- development mode being a mode in which the apparatus records the RAW data into a storage device without applying the development processing to the RAW data, and the development mode being a mode in which the apparatus applies the development processing to a plurality of the RAW data recorded into the storage device during when the apparatus operated in the non-development mode, wherein the control unit causes the apparatus to operate in the non-development mode or the development mode in accordance with which operation mode is set to the apparatus, wherein the one or more processors further function as a rating unit that applies rating processing to RAW data recorded into the storage device during when the apparatus operated in the non-development mode, and wherein the control unit controls the apparatus so that a result of the rating processing is stored in the storage device in association with the RAW data to which the rating processing is applied.

2. The apparatus according to claim 1, wherein:
the apparatus further has a plurality of shooting modes as the operation modes;
the apparatus further comprises a user interface for enabling a user to select one of the operation modes; and
in the user interface, a plurality of user interface elements corresponding to the plurality of shooting modes and a user interface element corresponding to the non-development mode are arranged.

3. The apparatus according to claim 2,
wherein the user interface is a graphical user interface (GUI) displayed in a display unit, and a plurality of GUI elements corresponding to the plurality of shooting modes and a GUI element corresponding to the non-development mode are arranged and displayed in the GUI.

4. The apparatus according to claim 2,
wherein the user interface is a movable member, and one operating mode can be selected from among the plurality of shooting modes and the non-development mode by moving the movable member.

5. The apparatus according to claim 2,
wherein user interface elements corresponding to respective ones of the plurality of shooting modes, the non-development mode, and the development mode are arranged in the user interface.

6. The apparatus according to claim 1,
wherein the rating processing is based on at least one of a result of detecting a feature region, a pixel value in a predetermined region or a result of performing a calculation on the pixel value, a feature amount obtained through machine learning, and the presence, absence, or degree of blown-out highlights, blocked-up shadows, camera shake, and eyes being closed.

7. The apparatus according to claim 1,
wherein the apparatus can be set regarding whether to continue execution of operations in the development mode if a power switch is turned off while the apparatus is operating in the development mode.

8. The apparatus according to claim 7,
wherein an upper limit number of the RAW data to which the development processing is applied after the power switch is turned off can be set.

9. The apparatus according to claim 1, further comprising:
a display device,
wherein the control unit causes the display device to display a number of RAW data in the storage device to which the development processing has not been applied.

10. The apparatus according to claim 1,
wherein the control unit controls power supply so that power is not supplied to the image processing circuit while the apparatus is operating in the non-development mode.

11. The apparatus according to claim 1,
wherein the development mode can be selected using a power switch.

12. An apparatus comprising:
a sensor;
an image processing circuit capable of applying development processing to RAW data obtained by the sensor; and
one or more processors that execute a program stored in a memory and thereby function as a control unit configured to control operation of the apparatus,
wherein the apparatus has a non-development mode and a development mode as operation modes, the non-development mode being a mode in which the apparatus records the RAW data into a storage device without applying the development processing to the RAW data, and the development mode being a mode in which the apparatus applies the development processing to a plurality of the RAW data recorded into the storage device during when the apparatus operated in the non-development mode,
wherein the control unit causes the apparatus to operate in the non-development mode or the development mode in accordance with which operation mode is set to the apparatus,
wherein the one or more processors further function as a rating unit that applies rating processing to RAW data recorded in the storage device, and
wherein the control unit controls the apparatus so that a result of the rating processing is stored in the storage device in association with the RAW data to which the rating processing is applied.

13. An apparatus comprising:
a sensor;
an image processing circuit capable of applying development processing to RAW data obtained by the sensor; and
one or more processors that execute a program stored in a memory and thereby function as a control unit configured to control operation of the apparatus,
wherein the apparatus has a non-development mode and a development mode as operation modes, the non-development mode being a mode in which the apparatus records the RAW data into a storage device without applying the development processing to the RAW data, and the development mode being a mode in which the apparatus applies the development processing to a plurality of the RAW data recorded into the storage device during when the apparatus operated in the non-development mode,
wherein the control unit causes the apparatus to operate in the non-development mode or the development mode in accordance with which operation mode is set to the apparatus,
wherein the one or more processors further function as a rating unit that applies rating processing to RAW data recorded in the storage device, and wherein the image processing circuit selects the RAW data to which the development processing is applied in the development mode based on a result of the rating processing.

14. The apparatus according to claim 13,
wherein the result of the rating processing is a rank, and the image processing circuit applies the development processing to RAW data having a rank that is greater than or equal to a pre-set rank.

15. An apparatus comprising:
a sensor;
an image processing circuit capable of applying development processing to RAW data obtained by the sensor; and
one or more processors that execute a program stored in a memory and thereby function as a control unit configured to control operation of the apparatus,
wherein the apparatus has a non-development mode and a development mode as operation modes, the non-development mode being a mode in which the apparatus records the RAW data into a storage device without applying the development processing to the RAW data, and the development mode being a mode in which the apparatus applies the development processing to a plurality of the RAW data recorded into the storage device during when the apparatus operated in the non-development mode,
wherein the control unit causes the apparatus to operate in the non-development mode or the development mode in accordance with which operation mode is set to the apparatus,
wherein the one or more processors further function as a rating unit that applies rating processing to RAW data recorded in the storage device,
wherein the image processing circuit continues execution of operations in the development mode when a power switch is turned off while the apparatus is operating in the development mode, and
wherein a condition of the result of the rating processing used to select the RAW data to which the development processing is to be applied differs between before and after the power switch is turned off.

16. An apparatus comprising:
a sensor;
an image processing circuit capable of applying development processing to RAW data obtained by the sensor; and
one or more processors that execute a program stored in a memory and thereby function as a control unit configured to control operation of the apparatus,
wherein the apparatus has a non-development mode and a development mode as operation modes, the non-development mode being a mode in which the apparatus records the RAW data into a storage device without applying the development processing to the RAW data, and the development mode being a mode in which the apparatus applies the development processing to a plurality of the RAW data recorded into the storage device during when the apparatus operated in the non-development mode,
wherein the control unit causes the apparatus to operate in the non-development mode or the development mode in accordance with which operation mode is set to the apparatus, and
wherein the control unit controls power supply so that power is not supplied to a display device used for a live view display in the apparatus while the apparatus is operating in the development mode.

17. A method for an apparatus, the apparatus including a sensor and an image processing circuit capable of applying development processing to RAW data obtained by the sensor, the method comprising:
causing, in accordance with which operation mode is set to the apparatus, the apparatus to operate either in:
a non-development mode in which the apparatus records the RAW data into a storage device without applying the development processing to the RAW data, or
a development mode in which the apparatus applies the development processing to a plurality of the RAW data recorded into the storage device during when the apparatus operated in the non-development mode;
applying rating processing to RAW data recorded into the storage device during when the apparatus operated in the non-development mode; and
controlling the apparatus so that a result of the rating processing is stored in the storage device in association with the RAW data to which the rating processing is applied.

18. A non-transitory computer-readable medium storing a program for causing a computer of an apparatus to execute a method for an apparatus, the apparatus including a sensor and an image processing circuit capable of applying development processing to RAW data obtained by the sensor, the method comprising:
causing, in accordance with which operation mode is set to the apparatus, the apparatus to operate either in:
a non-development mode in which the apparatus records the RAW data into a storage device without applying the development processing to the RAW data, or
a development mode in which the apparatus applies the development processing to a plurality of the RAW data recorded into the storage device during when the apparatus operated in the non-development mode;
applying rating processing to RAW data recorded into the storage device during when the apparatus operated in the non-development mode; and
controlling the apparatus so that a result of the rating processing is stored in the storage device in association with the RAW data to which the rating processing is applied.

* * * * *